United States Patent
Peng

(10) Patent No.: US 11,086,478 B2
(45) Date of Patent: Aug. 10, 2021

(54) ICON DISPLAY METHOD AND TERMINAL DEVICE

(71) Applicant: HUAWEI TECHNOLOGIES CO., LTD., Shenzhen (CN)

(72) Inventor: Jun Peng, Xi'an (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/493,403

(22) PCT Filed: Apr. 12, 2017

(86) PCT No.: PCT/CN2017/080298
§ 371 (c)(1),
(2) Date: Sep. 12, 2019

(87) PCT Pub. No.: WO2018/166023
PCT Pub. Date: Sep. 20, 2018

(65) Prior Publication Data
US 2020/0012410 A1 Jan. 9, 2020

(30) Foreign Application Priority Data
Mar. 13, 2017 (CN) .......................... 201710147081.1

(51) Int. Cl.
*G06F 3/0484* (2013.01)
*G06F 3/0488* (2013.01)
(Continued)

(52) U.S. Cl.
CPC ........ *G06F 3/04817* (2013.01); *G06F 3/0488* (2013.01); *G06F 3/04842* (2013.01); *H04M 1/72448* (2021.01)

(58) Field of Classification Search
CPC .... G06F 3/0488; G06F 3/0482; G06F 3/0416; G06F 3/04817; G06F 3/04842;
(Continued)

(56) References Cited

U.S. PATENT DOCUMENTS

2008/0141149 A1 6/2008 Yee et al.
2012/0032979 A1* 2/2012 Blow .................. G06F 3/04817
345/647

(Continued)

FOREIGN PATENT DOCUMENTS

CN 102609164 A 7/2012
CN 102799356 A 11/2012
(Continued)

*Primary Examiner* — Maryam M Ipakchi
(74) *Attorney, Agent, or Firm* — Maier & Maier, PLLC

(57) ABSTRACT

Embodiments relate to the communications field, and provide an icon display method and a terminal device. A solution includes a terminal device that determines a grasp point location, where a grasp point location is one of a preset graspable part of the terminal device; the terminal device determines a relative location of each of at least one icon displayed on the terminal device; the terminal device determines a current operation region based on the grasp point location; the terminal device determines a sensing region of each icon based on the current operation region, the grasp point location, and the relative location of each of the at least one icon, so that the sensing region of each icon partially or completely falls within the current operation region.

11 Claims, 45 Drawing Sheets

(51) Int. Cl.
*G06F 3/0481* (2013.01)
*H04M 1/72448* (2021.01)
(58) Field of Classification Search
CPC .. G06F 3/0481; G06F 3/04886; G06F 3/0484; G06F 2203/04803; G06F 3/048; G06F 3/04897
See application file for complete search history.

(56) References Cited

U.S. PATENT DOCUMENTS

| | | | |
|---|---|---|---|
| 2014/0181739 A1* | 6/2014 | Yoo | G06F 3/14 |
| | | | 715/800 |
| 2015/0193112 A1* | 7/2015 | Tagaya | G06F 3/04842 |
| | | | 715/765 |
| 2016/0132139 A1* | 5/2016 | Du | G06F 3/03547 |
| | | | 345/173 |
| 2016/0210012 A1* | 7/2016 | Han | G06F 3/0481 |
| 2016/0349985 A1* | 12/2016 | Ibaraki | G06F 3/04845 |

FOREIGN PATENT DOCUMENTS

| | | |
|---|---|---|
| CN | 103207750 A | 7/2013 |
| CN | 103309604 A | 9/2013 |
| CN | 104731514 A | 6/2015 |
| CN | 104808936 A | 7/2015 |
| CN | 104866188 A | 8/2015 |
| CN | 106293307 A | 1/2017 |
| KR | 20110025394 A | 3/2011 |

* cited by examiner

ICON DISPLAY METHOD AND TERMINAL DEVICE

This application is a National Stage of International Application No. PCT/CN2017/080298, filed on Apr. 12, 2017, which claims priority to Chinese Patent Application No. 201710147081.1, filed on Mar. 13, 2017, both of which are hereby incorporated by reference in their entireties.

FIELD

Embodiments relate to the communications field, and in particular, to an icon display method and a terminal device.

BACKGROUND

With continuous development of technologies in the communications field, an intelligence degree of a current mobile phone is increasingly high, leading to an increasingly large size of a touchscreen of the mobile phone. Generally, a user may choose to operate the mobile phone with two hands or operate the mobile phone with one hand based on an operation habit and an operation environment. However, in some specific environments, for example, when taking a vehicle such as a bus or a subway, the user usually needs to grasp a handrail with one hand, and therefore can only choose to operate the mobile phone with one hand. When the user operates a mobile phone with a relatively large touchscreen with one hand, a partial region of an interface displayed on the touchscreen falls outside a one-hand operation range of the user, and consequently the user cannot operate an icon in the region with one hand.

In the prior art, when operating the mobile phone with the relatively large touchscreen with one hand, the user may scale down the overall interface (for example, a home screen) displayed on the touchscreen of the mobile phone, so that an original interface is divided into two parts, one part is a region (that is, a scaled interface) in which an icon in the original interface is displayed, and the other part is an idle region in which the icon in the original interface is not displayed. The idle region is usually a black screen region in which the mobile phone can exit from the foregoing process of scaling down the interface after the user performs a tap operation.

The following problem exists: In the prior art, after the interface displayed on the touchscreen of the mobile phone is overall scaled down, because an overall-scaled-down interface may still fall outside the one-hand operation range of the user due to an excessively large touchscreen of the mobile phone, the user cannot operate, with one hand, some icons in the overall-scaled-down interface. In addition, because in addition to the scaled interface, the idle region is further displayed on the touchscreen of the mobile phone, the user may accidentally touch the idle region in a one-hand operation process of the user.

SUMMARY

Exemplary embodiments provide an icon display method and a terminal device, so that an icon displayed on the terminal device can partially or completely fall within a region that can be operated by a user with one hand.

To achieve the foregoing objective, the following technical solutions are used.

According to a first aspect, an icon display method is provided. The icon display method includes: determining, by a terminal device, a grasp point location, where the grasp point location is one of preset graspable parts of the terminal device; determining, by the terminal device, a relative location of each of at least one icon displayed on the terminal device, where the relative location of each icon is a location of each icon relative to the grasp point location; determining, by the terminal device, a current operation region based on the grasp point location, where the current operation region is a region that is displayed for a user to operate the terminal device with one hand; determining, by the terminal device, a sensing region of each icon based on the current operation region, the grasp point location, and the relative location of each of the at least one icon, so that the sensing region of each icon partially or completely falls within the current operation region, where the sensing region of each icon is a region in which the icon is operated; and displaying, by the terminal device, each of the at least one icon based on the sensing region of each icon.

It can be noted that, in the icon display method provided in this application, the terminal device may scale, based on the grasp point location of the user for the terminal device, a sensing region of an icon displayed on the terminal device, so that the sensing region of each icon displayed on the terminal device partially or completely falls within the current operation region. In this way, the user can operate, with one hand, all icons displayed on the terminal device. In addition, in the method provided in this application, no idle region is displayed on the terminal device, so that there is a relatively low probability that the user accidentally touches a region displayed on the terminal device. In addition, in the method provided in this application, the terminal device scales the icon (that is, the sensing region of the icon) displayed on the terminal device rather than an entire interface displayed on the terminal device. Therefore, after the method is performed, the icon can be better displayed on the terminal device.

In a possible implementation, the icon display method provided may be triggered by an operation of the user, and the corresponding terminal device may perform the method after receiving an operation instruction corresponding to the operation. For example, before the determining, by a terminal device, of a grasp point location, the method may further include: receiving, by the terminal device, a first operation instruction; and matching, by the terminal device, the first operation instruction with a first preset instruction, so that the terminal device enters a dynamic display mode, where each of the at least one icon has a same or different sensing region in the dynamic display mode. A mode in which the terminal device can scale a sensing region of an icon displayed on the terminal device is referred to as the dynamic display mode. Generally, before the terminal device enters the dynamic display mode, displayed icons may have same sensing regions. After the terminal device enters the dynamic display mode, the displayed icons may have different sensing regions. The first preset instruction may be preset by a person or ordinary skill in the art.

In a possible implementation, before the terminal device performs the icon display method provided in this application, the terminal device may further receive an operation instruction from the user, so that the terminal device determines an actual grasp point location. For example, before the determining, by a terminal device, a grasp point location, the icon display method may further include: receiving, by the terminal device, a second operation instruction, where the second operation instruction is used to indicate the grasp point location. The method for determining the grasp point location by the terminal device may further include: matching, by the terminal device, the second operation instruction with a second preset instruction, to determine the grasp point location. The second preset instruction may be preset by a person or ordinary skill in the art. For example, before the icon display method provided in this application is performed, a person of ordinary skill in the art may preset four second preset instructions, and the four second preset instructions respectively correspond to four different grasp point locations. Subsequently, after receiving the second operation instruction, the terminal device may determine, through matching, whether the second operation instruction is the same as any one of the four second preset instructions, to determine the grasp point location.

In a possible implementation, when the user operates the terminal device with one hand, the terminal device (for example, a touchscreen of the terminal device) may be in different interface statuses, for example, in a portrait state or a landscape state. When the terminal device is in the portrait state and the landscape state, a same icon displayed on the touchscreen may be at different locations, and a location of the icon may be preset. However, the location of the icon displayed on the touchscreen affects dynamic display of the icon in the method. Therefore, the terminal device may perform the method with reference to the interface status of the terminal device. For example, after the receiving, by the terminal device, a first operation instruction, the icon display method may further include: determining, by the terminal device, an interface status; and the method for determining, by the terminal device, of the relative location of each of the at least one icon displayed on the terminal device may include: determining, by the terminal device based on the interface status, the relative location of each of the at least one icon displayed on the terminal device.

In a possible implementation, in the icon display method provided, before the terminal device determines the current operation region based on the grasp point location, the current operation region may be preset in the terminal device. For example, before the determining, by a terminal device, of a grasp point location, the icon display method may further include: receiving, by the terminal device, a third operation instruction; and setting, by the terminal device, the current operation region according to the third operation instruction. The current operation region is in a one-to-one correspondence with the grasp point location.

In a possible implementation, the terminal device may be operated by different users with one hand, and the different users may operate different maximum regions with one hand on the terminal device. Therefore, a current user may be unable to operate an icon outside the current operation region displayed on the terminal device. Therefore, after the displaying, by the terminal device, of each of the at least one icon, the icon display method may further include: receiving, by the terminal device, a fourth operation instruction, where the fourth operation instruction is used to instruct to adjust the sensing region of each of the at least one icon; obtaining, by the terminal device, a ratio according to the fourth operation instruction; adjusting, by the terminal device, the sensing region of each icon based on the ratio, to obtain an adjusted sensing region of each icon; and displaying, by the terminal device, each of the at least one icon based on the adjusted sensing region of each icon.

It can be noted that, in the icon display method provided in this application, the sensing region of each icon may be adjusted according to a requirement of the user, so that the user can operate, with one hand, all the icons that are displayed on the terminal device and whose sensing regions are adjusted, and can obtain better user experience.

According to a second aspect, a terminal device is provided. The terminal device includes a determining module and a display module. The determining module is configured to: determine a grasp point location, where the grasp point location is one of preset graspable parts of the terminal device; determine a relative location of each of at least one icon displayed in a display interface of the terminal device, where the relative location of each icon is a location of each icon relative to the grasp point location; determine a current operation region based on the grasp point location, where the current operation region is a region that is operated by a user with one hand in the display interface; and determine a sensing region of each icon based on the current operation region, the grasp point location, and the relative location of each of the at least one icon, so that the sensing region of each icon partially or completely falls within the current operation region, where a region indicated by the sensing region of each icon is a region in which the icon is operated. The display module is configured to display each of the at least one icon based on the sensing region that is of each icon and that is determined by the determining module.

In a possible implementation, the terminal device may further include a receiving module. The receiving module is configured to receive a first operation instruction before the determining module determines the grasp point location. The determining module is further configured to match the first operation instruction received by the receiving module with a first preset instruction, so that the terminal device enters a dynamic display mode, where each of the at least one icon has a same or different sensing region in the dynamic display mode.

In a possible implementation, the receiving module is further configured to receive a second operation instruction before the determining module determines the grasp point location, where the second operation instruction is used to indicate the grasp point location. The determining module is configured to match the second operation instruction with a second preset instruction, to determine the grasp point location.

In a possible implementation, the determining module may be further configured to determine an interface status after the receiving module receives the first operation instruction, where the interface status is used to indicate that an interface status of the terminal device is a portrait state or an interface status of the terminal device is a landscape state. The determining module may be configured to determine, based on the interface status, the relative location of each of the at least one icon displayed on the terminal device.

In a possible implementation, the receiving module may be further configured to receive a third operation instruction before the determining module determines the grasp point location. The terminal device may further include a setting module. The setting module may be configured to set the current operation region according to the third operation instruction.

In a possible implementation, the receiving module may be further configured to receive a fourth operation instruction after the display module displays each of the at least one icon, where the fourth operation instruction may be used to instruct to adjust the sensing region of each of the at least one icon. The terminal device may further include an adjustment module. The adjustment module may be configured to: obtain a ratio according to the fourth operation instruction received by the receiving module; and adjust the sensing region of each icon based on the ratio, to obtain an adjusted sensing region of each icon. The display module may be further configured to display each of the at least one icon based on the adjusted sensing region that is of each icon and that is obtained by the adjustment module.

According to a third aspect, a terminal device is provided. The terminal device may include a processor, a memory, a display, an input device, and a bus. The memory is configured to store a computer instruction; the processor, the memory, the display, and the input device are connected by using the bus; and when the terminal device runs, the processor executes the computer instruction stored in the memory, so that the terminal device performs the icon display method according to the first aspect and the various optional manners of the first aspect.

According to a fourth aspect, a computer storage medium is provided. The computer storage medium stores a computer instruction, and when the processor of the terminal device in the third aspect executes the computer instruction, the processor performs the icon display method according to the first aspect and the various optional manners of the first aspect.

It can be noted that the processor in the third aspect of this application may be obtained by integrating function modules such as the determining module, the setting module, and the adjustment module in the second aspect, and the processor may implement functions of the function modules in the second aspect. For detailed descriptions of the modules and analyses of effects in the second aspect and the third aspect, refer to corresponding descriptions and technical effects in the first aspect and the various possible implementations of the first aspect. Details are not described herein again for the sake of brevity.

DESCRIPTION OF EMBODIMENTS

Embodiments provide an icon display method and a terminal device, and may be applied to a process in which the terminal device displays an icon, and further applied to a process in which the terminal device scales a sensing region of each icon and dynamically displays each icon.

The following describes in detail the technical solutions in the embodiments with reference to the accompanying drawings in the embodiments.

The icon display method provided in the embodiments is applicable to a terminal device on which a touchscreen is disposed. The terminal device may be a terminal device such as a mobile phone, a tablet computer, a notebook computer, an ultra-mobile personal computer (UMPC), a netbook, or a personal digital assistant (PDA).

In an embodiment, an example in which the terminal device is a mobile phone is used in the embodiments to describe the icon display method provided. The following describes in detail components of a mobile phone 10 with reference to an accompanying drawing.

Figure 1:
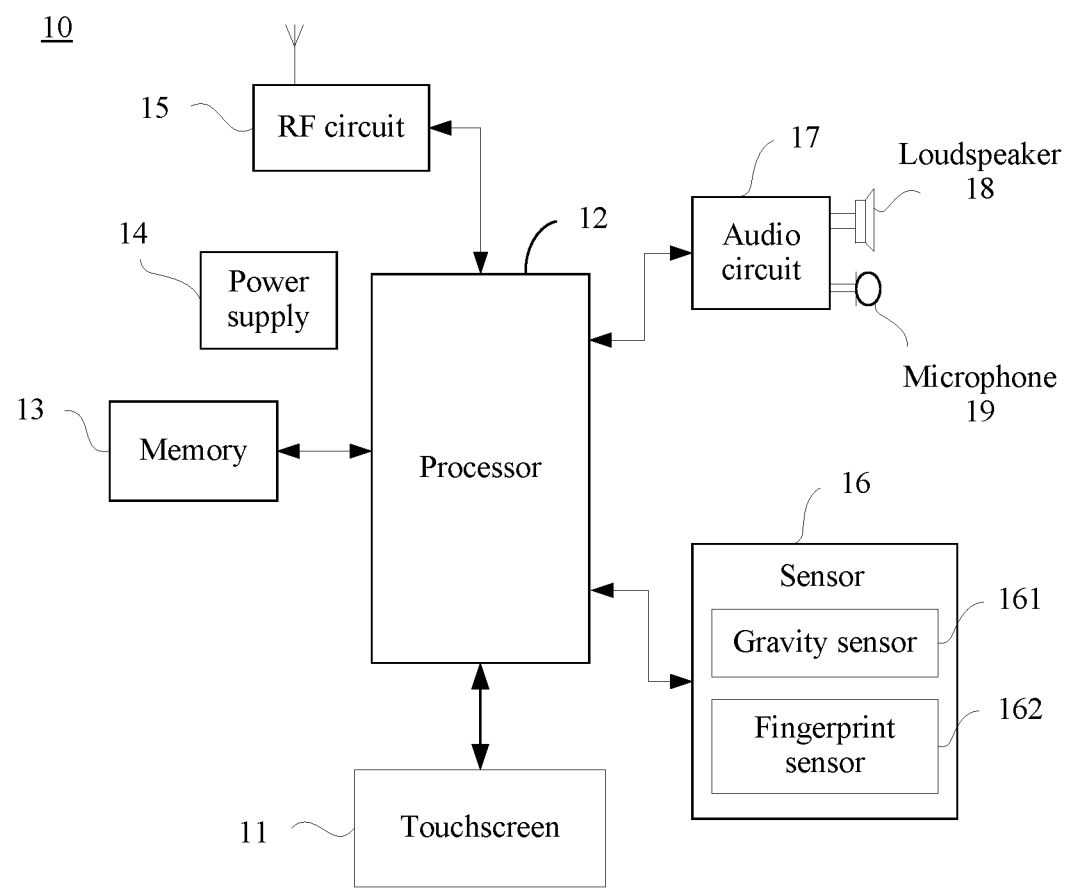
FIG. 1 is a schematic diagram of a hardware structure of a terminal device according to an embodiment.

As shown in FIG. 1, the mobile phone 10 may include components such as a touchscreen 11, a processor 12, a memory 13, a power supply 14, a radio frequency (RF) circuit 15, a sensor 16, an audio circuit 17, a loudspeaker 18, and a microphone 19. These components may be connected by using a bus, or may be directly connected. A person of ordinary skill in the art may understand that a structure of the mobile phone shown in FIG. 1 constitutes no limitation on the mobile phone, and the mobile phone may include more components than those shown in the figure, or combine some components, or have different component deployments.

The touchscreen 11 may be referred to as a touch display panel and is configured to implement input and output functions of the mobile phone 10. The touchscreen 11 may collect an operation instruction (for example, an operation instruction generated by a user on the touchscreen 11 or near the touchscreen 11 by using any proper object or accessory such as a finger or a stylus) of a user on or near the touchscreen 11, and drive a corresponding connected apparatus according to a preset program. The touchscreen 11 may be further configured to display information entered by the user or information provided for the user (for example, application program icons of "Gallery" and "Camera") and various menus of the mobile phone (for example, a "Delete" button in "Gallery"). For example, the touchscreen 11 may be implemented by using a number of types such as a resistive type, a capacitive type, an infrared light sensor, and an ultrasonic wave. This is not limited in this embodiment or other embodiments described herein. An operation of the user near the touchscreen 11 may be referred to as floating touch, and a touchscreen on which the floating touch can be performed may be implemented by using a capacitive type, an infrared light sensor, an ultrasonic wave, and the like.

For example, in this embodiment, the touchscreen 11 may be configured to receive the operation instruction of the user, for example, an operation instruction of the user for an icon displayed on the touchscreen 11 or an operation instruction of the user for a specific region on the touchscreen 11; and may be configured to transmit the operation instruction to the processor 12 after the touchscreen 11 receives the operation instruction, so that the processor 12 performs an operation indicated by the operation instruction. For example, after receiving an operation instruction used to instruct the terminal device to modify a sensing region of an icon, the touchscreen 11 transmits the operation instruction to the processor 12, so that the processor 12 scales the sensing region of the icon, and the touchscreen 11 can display the icon based on a scaled sensing region of the icon.

It can be noted that the touchscreen of the mobile phone provided in this embodiment may be divided into a number of different sensing regions, such as a heat sensing region or a pressure sensing region. Therefore, each icon displayed on the touchscreen of the mobile phone may fall within one sensing region, and the sensing region is a region in which the icon can be operated by the user. A sensing region of an icon may be larger than a region in which the icon is located, or the sensing region of the icon may be the same as the region in which the icon is located. Only an example in which the sensing region of each icon is the same as a region in which the icon is located is used below to describe the icon display method provided in the embodiments.

The processor 12 is a control center of the mobile phone 10, is connected to all parts of the entire mobile phone by using various interfaces and lines, and performs various functions of the mobile phone 10 and data processing by running or executing a software program and/or a module that are/is stored in the memory 13 and by invoking data stored in the memory 13, to overall monitor the mobile phone 10. During implementation, in an embodiment, the processor 12 may include one or more processing units, and an application processor and a modem processor may be integrated into the processor 12. The application processor processes an operating system, a home screen, an application program, and the like. The modem processor processes wireless communication. It may be understood that the modem processor may not be integrated into the processor 12.

For example, in this embodiment, the processor 12 may obtain the operation instruction received by the touchscreen 11, and perform the operation indicated by the operation instruction. For example, after obtaining an operation instruction that is used to instruct to determine a current operation region and that is received by the touchscreen 11, the processor 12 may determine the current operation region.

It can be noted that the icon in this embodiment is an operable element displayed on the touchscreen of the mobile phone. For example, after the processor of the mobile phone receives an operation instruction of the user for the operable element, the processor of the mobile phone may respond to the operation instruction, for example, the processor of the mobile phone changes an interface displayed on the touchscreen.

For example, when the touchscreen of the mobile phone is in a home screen, the icon may be an application program icon displayed on the touchscreen, such as a "Camera" icon, a "Gallery" icon, and a "Messaging" icon. In this case, if the mobile phone receives an operation instruction of the user for "Gallery" by using the touchscreen, the processor of the mobile phone may enable the touchscreen to display a photo in "Gallery". In addition, when the touchscreen of the mobile phone is in an application interface in an application program running process, the icon may be a button icon displayed on the touchscreen, such as an "Edit" button icon and a "Delete" button icon in "Gallery". Alternatively, when the touchscreen of the mobile phone is in an application interface in an application program running process, the icon may be an input box displayed on the touchscreen, such as an SMS message text box in "Messaging". When the touchscreen of the mobile phone is in a drop-down interface, the icon may be a button icon displayed on the touchscreen, such as a "Wi-Fi" icon, a "Silent" icon, a "Bluetooth" icon, or an "Orientation Lock" icon. Only the application program icon that is displayed when the touchscreen of the mobile phone is in the home screen is used as an example below to describe the icon display method provided in the embodiments.

The memory 13 may be configured to store data, a software program, and a module; and may be a volatile memory such as a random access memory (RAM), may be a nonvolatile memory such as a read-only memory (ROM), a flash memory a hard disk (HDD), or a solid-state drive (SSD), or may be a combination of the foregoing types of memories. For example, the memory 13 may store a computer instruction. The computer instruction is used to enable the processor 12 to perform, by executing the computer instruction, the icon display method provided in the embodiments.

The power supply 14 may be a battery, and is logically connected to the processor 12 by using a power management system, to implement functions such as charging management, discharging management, and power consumption management by using the power management system.

The RF circuit 15 may be configured to receive and send information, or receive and send a signal in a call process. Particularly, the RF circuit 15 sends received information to the processor 12 for processing, and sends a signal generated by the processor 12. The RF circuit usually includes but is not limited to an antenna, at least one amplifier, a transceiver, a coupler, a low noise amplifier (LNA), a duplexer, and the like. In addition, the RF circuit 15 may further communicate with a network and another device through wireless communication.

The sensor 16 may include a gravity sensor 161, a fingerprint sensor 162, and the like.

The gravity sensor 161 may detect values of accelerations of the mobile phone in all directions (generally, three axes), may detect a value and a direction of gravity when the gravity sensor 16 is stationary, and may be used for an application for identifying a mobile phone gesture (for example, switching between landscape and portrait screens, a related game, or magnetometer gesture calibration), a vibration identification-related function (for example, a pedometer, a strike, or a shake direction), and the like. For example, the gravity sensor 161 may receive a gravity operation instruction in operation instructions, so that the processor 12 performs an operation indicated by the operation instruction. The fingerprint sensor 162 has a fingerprint recognition function. The fingerprint sensor 162 may be installed on the back of the mobile phone 10, or may be installed on a home button of the mobile phone 10, or may be implemented by controlling the touchscreen 11 by using a logic circuit. For example, the fingerprint sensor 162 may receive a fingerprint operation instruction in the operation instructions, so that the processor 12 performs an operation indicated by the operation instruction. It can be noted that the mobile phone 10 may further include other sensors such as a pressure sensor, a light sensor, a gyroscope, a barometer, a hygrometer, a thermometer, and an infrared sensor. Details are not described herein for the sake of brevity.

The audio circuit 17, the loudspeaker 18, and the microphone 19 may provide an audio interface between the user and the mobile phone 10. The audio circuit 17 may transmit, to the loudspeaker 18, an electrical signal converted from received audio data, and the loudspeaker 18 converts the electrical signal into a sound signal for outputting. In addition, the microphone 19 converts a collected sound signal into an electrical signal, and the audio circuit 17 converts the electrical signal into audio data after receiving the electrical signal, and then outputs the audio data to the RF circuit 15 to send the audio data to, for example, another mobile phone, or outputs the audio data to the processor 12 for further processing.

Although not shown in the figure, the mobile phone 10 may further include function modules such as a wireless fidelity (Wi-Fi) module, a Bluetooth module, and a camera. The function modules are not described herein one by one.

It can be noted that components such as the touchscreen 11, the sensor 16, and the microphone 19 may be collectively referred to as an input device. The input device may receive an operation of the user, an environment change parameter, or the like, so that the processor of the mobile phone may receive a corresponding operation instruction. In addition, the touchscreen may be further used as a display in addition to the input device.

For example, the operation instruction in this embodiment may be a touchscreen operation instruction, a fingerprint operation instruction, a gravity operation instruction, a button operation instruction, or the like. The touchscreen operation instruction corresponds to an operation such as a press operation, a touch and hold operation, a slide operation, a tap operation, or a floating operation (an operation of the user near the touchscreen) of the user on the touchscreen of the mobile phone. The fingerprint operation instruction corresponds to an operation such as fingerprint sliding, fingerprint touching and holding, fingerprint taping, and double fingerprint taping of the user on the fingerprint sensor of the mobile phone. The gravity operation instruction corresponds to an operation such as shaking the mobile phone by the user in a specific direction, or shaking the mobile phone by the user for a specific quantity of times. The button operation instruction corresponds to an operation such as a tap operation, a double-tap operation, a touch and hold operation, or a combined-button operation of the user on a button such as a power button, a volume button, or a home button of the mobile phone.

To resolve a problem that the touchscreen of the mobile phone is relatively large, and consequently the user cannot operate, with one hand, all icons displayed on the touchscreen, in the solution provided in this embodiment, the sensing region of each icon displayed on the touchscreen of the mobile phone may be scaled, and each icon is dynamically displayed, so that the sensing region of each icon partially or completely falls within the current operation region. The current operation region is a region that can be operated by the user on the touchscreen of the mobile phone when the user operates the mobile phone with one hand. In a dynamic display mode of the mobile phone, the touchscreen of the mobile phone may display an icon with a scaled sensing region.

Figure 2:
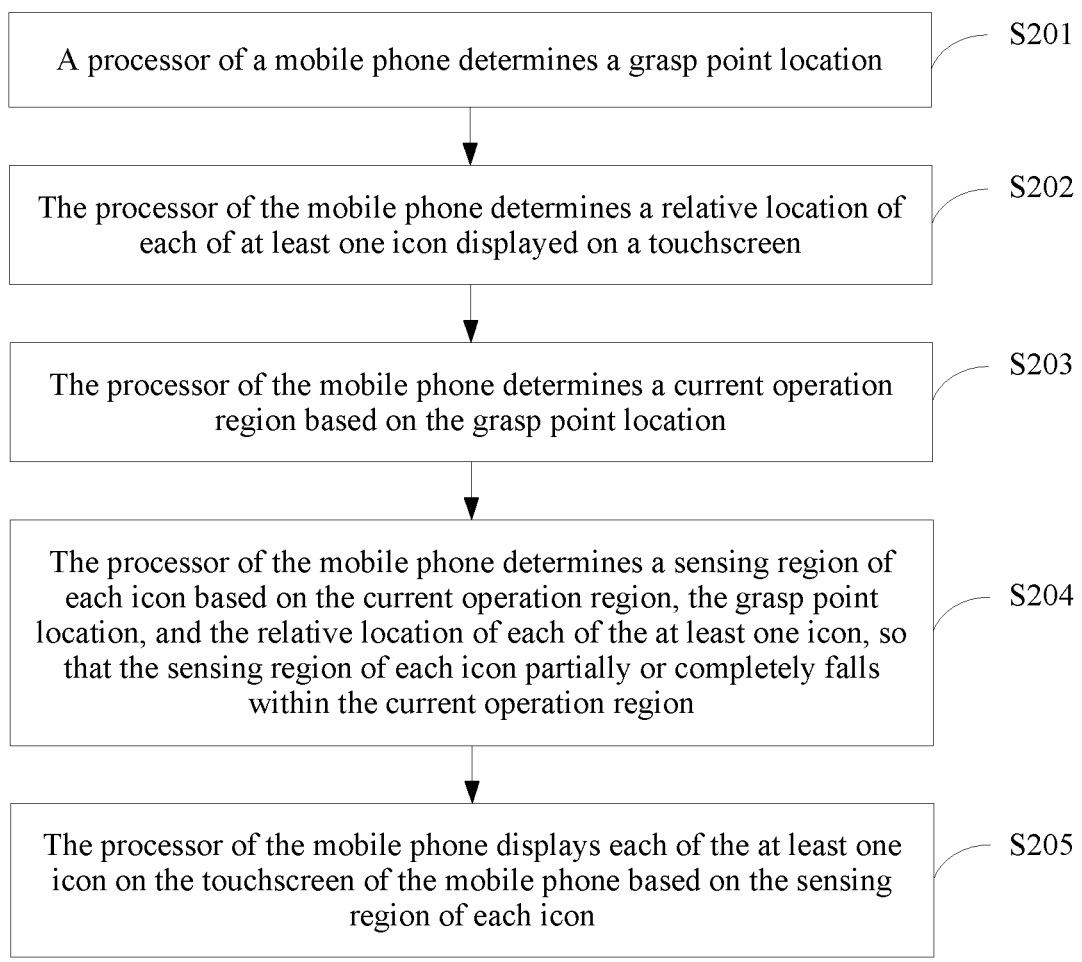
FIG. 2 is a schematic flowchart of an icon display method according to an embodiment.

To make the objectives, technical solutions, and advantages of the embodiments clearer, the icon display method provided in the embodiments is described below in detail with reference to the specific components in the mobile phone 10 shown in FIG. 1 and by using a flowchart of an icon display method shown in FIG. 2. Shown steps may alternatively be performed by any terminal device other than the mobile phone shown in FIG. 1. In addition, although a logical sequence of the icon display method provided in the embodiments is shown in the method flowchart, in some cases, the shown or described steps may be performed in a sequence different from the sequence herein.

In step S201, a processor of a mobile phone determines a grasp point location.

Figure 3:
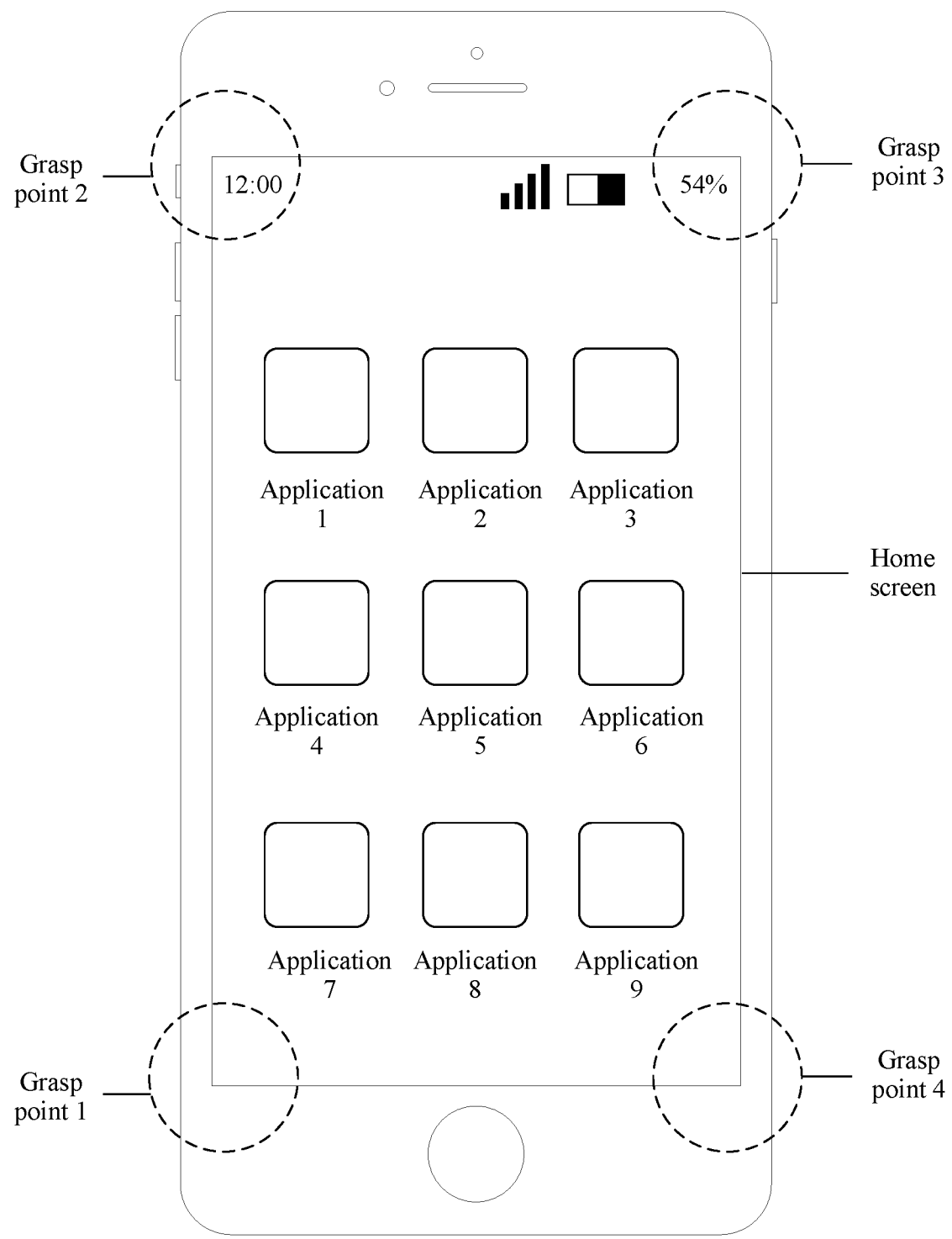
FIG. 3 is a schematic diagram of displaying icons on a touchscreen of a mobile phone according to an embodiment.

The grasp point location is one of preset graspable parts of the mobile phone, and the graspable parts of the mobile phone may be locations of four vertices of a touchscreen of the mobile phone. For example, FIG. 3 is a schematic diagram of displaying icons on a touchscreen of a mobile phone according to an embodiment. A grasp point location of the mobile phone shown in FIG. 3 may be any grasp point location in a grasp point 1, a grasp point 2, a grasp point 3, or a grasp point 4. In addition, nine application program icons (applications 1 to 9) are displayed on the touchscreen of the mobile phone shown in FIG. 3. For example, the application 1 may be a "Gallery" icon. In addition, an interface displayed on the touchscreen of the mobile phone in FIG. 3 is a home screen.

In step S202, the processor of the mobile phone determines a relative location of each of at least one icon displayed on a touchscreen.

The relative location of each icon is a location of each icon relative to the grasp point location.

It can be noted that, before the method provided in this embodiment is performed, the processor of the mobile phone may display each icon on the touchscreen of the mobile phone based on a preset location of each icon. For example, locations of the application program icons displayed on the touchscreen of the mobile phone shown in FIG. 3 may be preset by a person of ordinary in the art in a process of manufacturing the mobile phone. When a user grasps the mobile phone at different parts, in other words, at different grasp points, a same icon is at different relative locations. However, when an icon is displayed on the touchscreen of the mobile phone, a relative location of the icon affects whether the user can operate the icon. For example, if the processor of the mobile phone determines that the user grasps the mobile phone through the grasp point 1 shown in FIG. 3, the processor may determine that a relative location of any application program icon of the applications 1 to 9 in FIG. 3 is a location relative to the grasp point 1, for example, a distance from the any application program icon to the grasp point 1. Generally, the user operates, with one hand, an icon with a relatively small relative location, namely, an icon that is relatively close to the grasp point location; and the user cannot operate, with one hand, an icon with a relatively large relative location, namely, an icon that is relatively far from the grasp point location.

In step S203, the processor of the mobile phone determines a current operation region based on the grasp point location.

Figure 4:
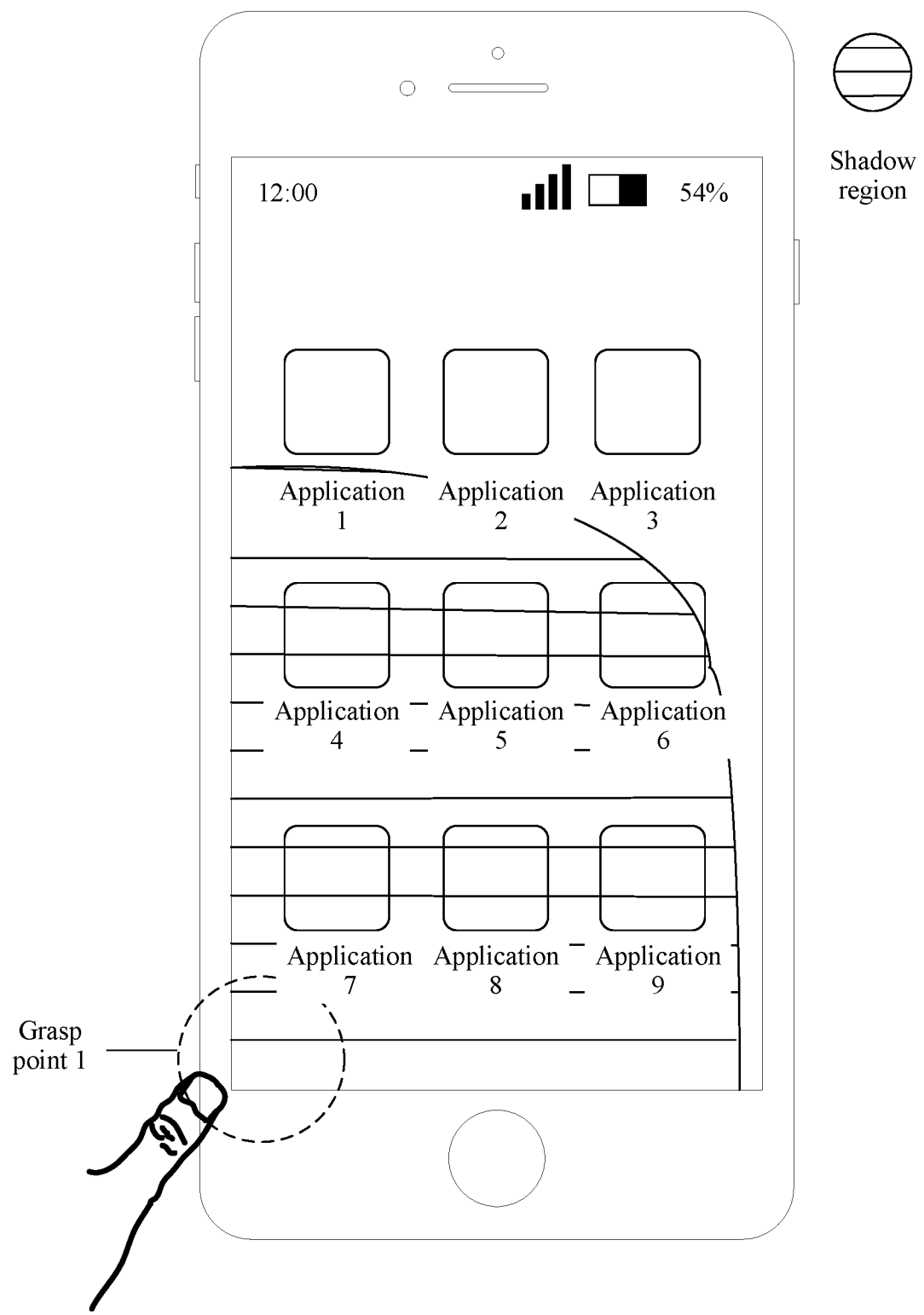
FIG. 4 is another schematic diagram of displaying icons on a touchscreen of a mobile phone according to an embodiment.

The current operation region may be a region that is operated by the user with one hand on the touchscreen of the mobile phone. For example, when the user operates the mobile phone with one hand, the current operation region may be a maximum region that can be operated by the user on the touchscreen of the mobile phone. For different grasp point locations, there are different current operation regions on the touchscreen of the mobile phone, in other words, the current operation region has different locations on the touchscreen of the mobile phone. For example, FIG. 4 is another schematic diagram of displaying icons on a touchscreen of a mobile phone according to an embodiment. In FIG. 4, a grasp part of a user for the mobile phone is a grasp point 1, and a current operation region may be a shadow region on the touchscreen of the mobile phone. It can be noted that, in the accompanying drawings provided in the embodiments, for example, a "hand icon" in FIG. 4 is used to schematically indicate a hand and indicate a location of a finger of the user on the mobile phone, but actually, the "hand icon" is not displayed on the screen of the mobile phone.

In step S204, the processor of the mobile phone determines a sensing region of each icon based on the current operation region, the grasp point location, and the relative location of each of the at least one icon, so that the sensing region of each icon partially or completely falls within the current operation region.

For example, the processor of the mobile phone may scale the sensing region of each icon displayed on the touchscreen of the mobile phone in a direction of the grasp point location. The processor of the mobile phone may scale down a sensing region of an icon with a relatively small relative location, in other words, scale down the icon; and scale up a sensing region of an icon with a relatively large relative location, in other words, scale up the icon. Therefore, the sensing region of each icon partially or completely falls within the current operation region. Generally, before the "scaling the sensing region of each icon displayed on the touchscreen of the mobile phone in a direction of the grasp point location", all icons displayed on the touchscreen of the mobile phone may have same sensing regions.

It can be noted that, because the user operates, with one hand in the current operation region, the icon displayed on the touchscreen of the mobile phone, each icon displayed on the touchscreen of the mobile phone partially or completely falls within the current operation region, so that the user can operate, with one hand, all the icons displayed on the touchscreen of the mobile phone.

After the "scaling the sensing region of each icon displayed on the touchscreen of the mobile phone in a direction of the grasp point location", the touchscreen of the mobile phone may display an icon with a scaled sensing region, so that the user can operate, with one hand, all the icons displayed on the touchscreen of the mobile phone. For example, the icon display method provided in this embodiment may further include S205.

In step S205, the processor of the mobile phone displays each of the at least one icon on the touchscreen of the mobile phone based on the sensing region of each icon.

Figure 5:
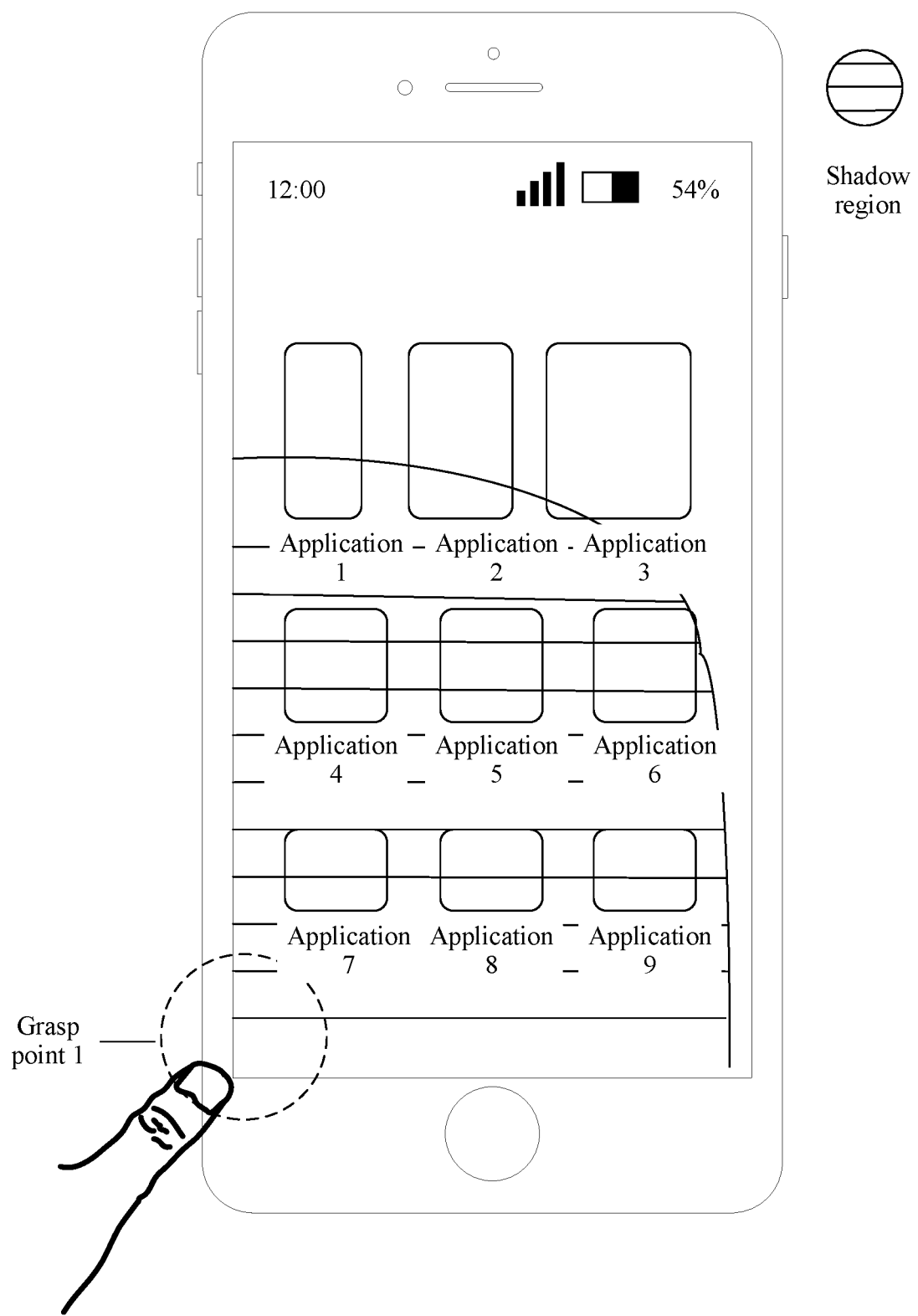
FIG. 5 is another schematic diagram of displaying icons on a touchscreen of a mobile phone according to an embodiment.

For example, FIG. 5 is another schematic diagram of displaying icons on a touchscreen of a mobile phone according to an embodiment. After scaling sensing regions of icons displayed on the touchscreen of the mobile phone shown in FIG. 4, the processor of the mobile phone can obtain icons displayed on the touchscreen of the mobile phone shown in FIG. 5. Applications 1 to 9 displayed on the touchscreen of the mobile phone shown in FIG. 5 are all intersected with a shadow region; in other words, a sensing region of each application program icon displayed on the touchscreen of the mobile phone partially or completely falls within a current operation region.

It can be noted that, in the icon display method provided in this embodiment, the processor of the mobile phone may scale, based on the grasp point location of the user for the mobile phone, a sensing region of an icon displayed on the touchscreen of the mobile phone, so that the sensing region of each icon displayed on the touchscreen of the mobile phone partially or completely falls within the current operation region. In this way, the user can operate, with one hand, all the icons displayed on the touchscreen of the mobile phone. In addition, in the method provided in this embodiment, no idle region is displayed on the touchscreen of the mobile phone, so that there is a low probability that the user accidentally touches a region displayed on the touchscreen of the mobile phone. In addition, in the method provided in this embodiment, the processor of the mobile phone scales the icon (that is, the sensing region of the icon) displayed on the touchscreen of the mobile phone rather than an entire interface displayed on the touchscreen of the mobile phone. Therefore, after the method is performed, the icon can be better displayed on the touchscreen of the mobile phone.

Both the "interface displayed on the touchscreen of the mobile phone" and the "icon displayed on the touchscreen of the mobile phone" described in this embodiment are content displayed on the touchscreen of the mobile phone, and are merely different descriptions used in different cases for ease of description.

Figure 6:
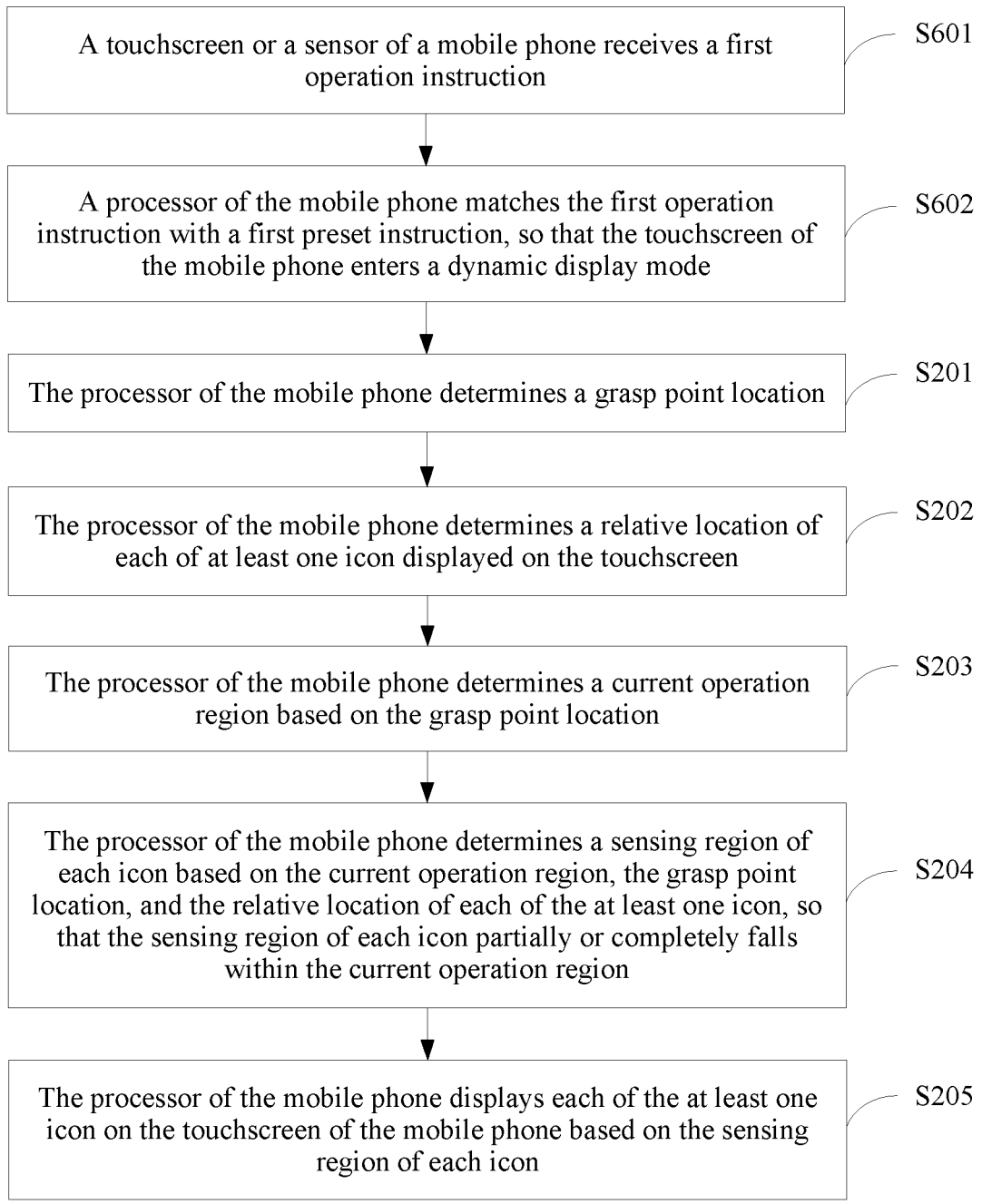
FIG. 6 is a schematic flowchart of another icon display method according to an embodiment.

Further, before the icon display method provided in this embodiment is performed, the touchscreen or a sensor such as a fingerprint sensor of the mobile phone may further receive an operation instruction of the user, so that the processor of the mobile phone starts to perform the method. FIG. 6 is a schematic flowchart of another icon display method according to an embodiment. Before S201, the method may further include S601 and S602.

In step S601, the touchscreen or a sensor of the mobile phone receives a first operation instruction.

The first operation instruction is used to instruct the touchscreen of the mobile phone to enter a dynamic display mode, and each of the at least one icon has a same or different sensing region in the dynamic display mode. Generally, before the terminal device enters the dynamic display mode, displayed icons may have same sensing regions. After the terminal device enters the dynamic display mode, the displayed icons may have different sensing regions.

The following describes in detail the operation instruction in this embodiment in different application scenarios.

In a first application scenario, the operation instruction in this embodiment is a touchscreen operation instruction. The user may operate the touchscreen of the mobile phone by using different gestures. The gestures may include a pressure recognition gesture, a touch and hold gesture, an area change gesture, a multi-touch gesture, a slide gesture, a double-press gesture, a tap gesture, a double-tap gesture, a tangential gesture, and the like. For example, when the user uses the pressure recognition gesture for operation, the processor of the mobile phone obtains the operation instruction as follows: the processor of the mobile phone obtains an operation that the user presses the touchscreen, and obtains a value of pressure produced by pressing the touchscreen. When the user uses the touch and hold gesture for operation, the processor of the mobile phone obtains the operation instruction as follows: the processor of the mobile phone obtains an operation that the user touches and holds the touchscreen, and obtains a time during which the screen is pressed. When the user uses the area change gesture, the processor of the mobile phone obtains the operation instruction as follows: the processor of the mobile phone obtains an operation that the user touches the touchscreen, and obtains a touch area in which the touchscreen is pressed. When the user uses the multi-touch gesture, the processor of the mobile phone obtains the operation instruction as follows: the processor of the mobile phone obtains an operation that the user presses the touchscreen, and obtains a quantity of contacts. When the user uses the slide gesture, the processor of the mobile phone obtains the operation instruction as follows: the processor of the mobile phone obtains a slide operation performed by the user on the touchscreen, and obtains a slide distance or a slide track. When the user uses a double-press gesture operation instruction, the processor of the mobile phone obtains the operation instruction as follows: the processor of the mobile phone obtains two press operations performed by the user on the touchscreen without leaving the touchscreen, and obtains values of pressure produced by pressing the touchscreen twice. When the user uses a tap gesture or double-tap gesture operation instruction, the processor of the mobile phone obtains the operation instruction as follows: the processor of the mobile phone obtains a tap operation performed by the user on the touchscreen, and obtains a quantity of times of tapping a same location on the touchscreen. When the user uses the tangential gesture, the processor of the mobile phone obtains the operation instruction as follows: the processor of the mobile phone obtains a touch operation performed by the user on the touchscreen, and obtains at least one of the following trends of a finger of the user: upward, downward, leftward, rightward, and rotation.

In a second application scenario, the operation instruction is a fingerprint operation instruction. The user may operate the fingerprint sensor of the mobile phone by using different gestures. The gestures may include a touch and hold gesture, a tap gesture, a double-tap gesture, a tangential gesture, and the like. For example, when the user uses the touch and hold gesture for operation, the processor of the mobile phone obtains the operation instruction as follows: the processor of the mobile phone obtains a touch and hold operation performed by the user on the fingerprint sensor, and obtains a fingerprint of the user and a time during which the fingerprint sensor is pressed. When the user uses a tap gesture or double-tap gesture operation instruction, the processor of the mobile phone obtains the operation instruction as follows: the processor of the mobile phone obtains a tap operation performed by the user on the fingerprint sensor, and obtains a fingerprint of the user and a quantity of times the user taps the fingerprint sensor. When the user uses the tangential gesture, the processor of the mobile phone obtains the operation instruction as follows: the processor of the mobile phone obtains an operation that the user touches the fingerprint sensor, and obtains a fingerprint of the user and at least one of the following trends of a finger of the user: upward, downward, leftward, and rightward.

In a third application scenario, the operation instruction is a gravity operation instruction. The user may operate the mobile phone by using different gestures. The gesture may be a shake gesture. For example, when the user uses the shake gesture for operation, the processor of the mobile phone obtains the operation instruction as follows: the processor of the mobile phone obtains a quantity of times the user shakes the mobile phone, a direction in which the user shakes the mobile phone, and an angle at which the user shakes the mobile phone. For example, the shake direction may include upward, downward, leftward, rightward, and rotation.

In a fourth application scenario, the operation instruction is a button operation instruction. The processor of the mobile phone obtains the operation instruction as follows: the processor of the mobile phone obtains quantities of times the user presses buttons such as a power button, a volume button, and a home button of the mobile phone, a sequence in which the user presses the buttons such as the power button, the volume button, and the home button of the mobile phone, and the like.

Figure 7A:
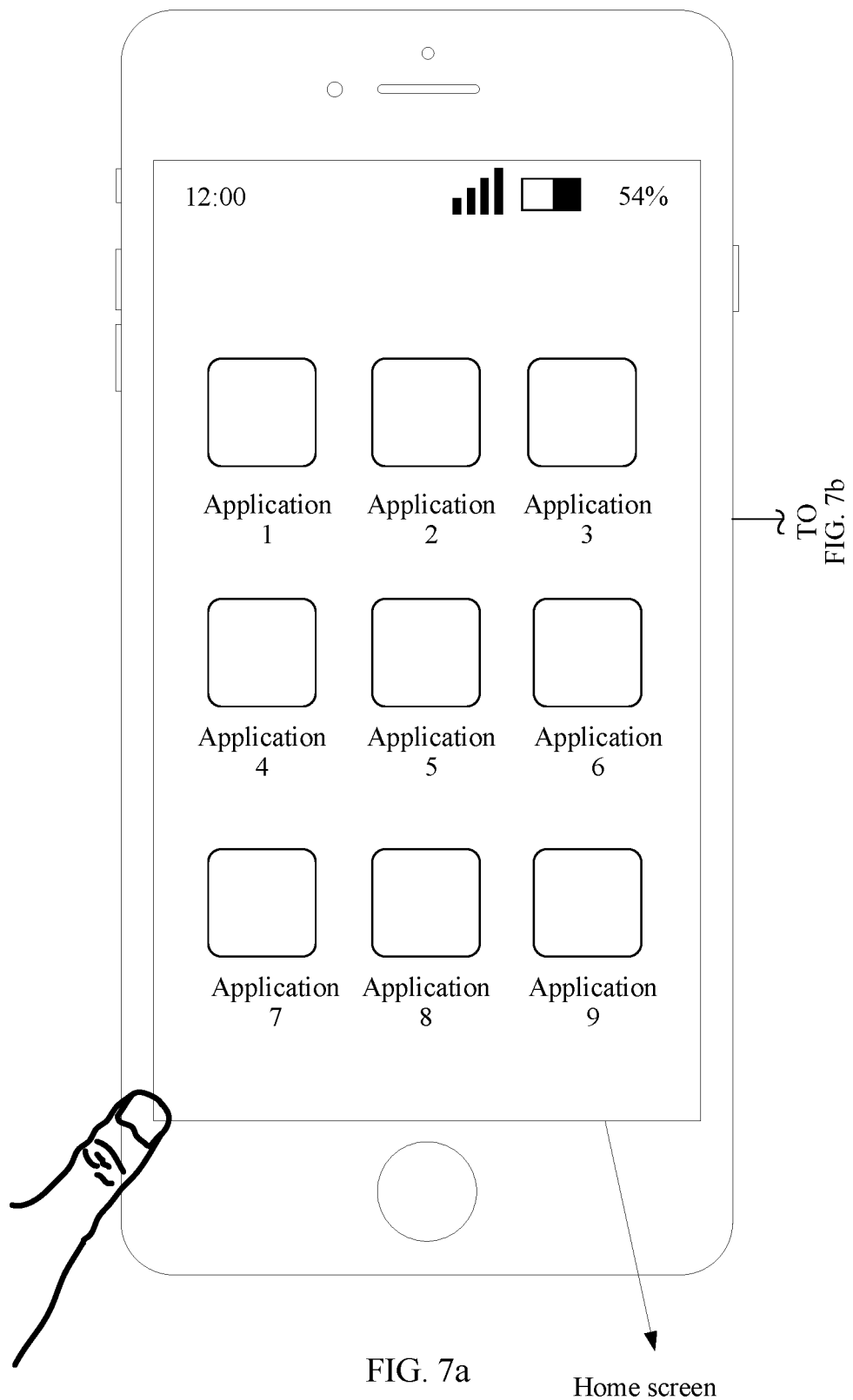
FIG. 7a is a schematic change diagram of an interface displayed on a touchscreen of a mobile phone according to an embodiment.
Figure 7B:
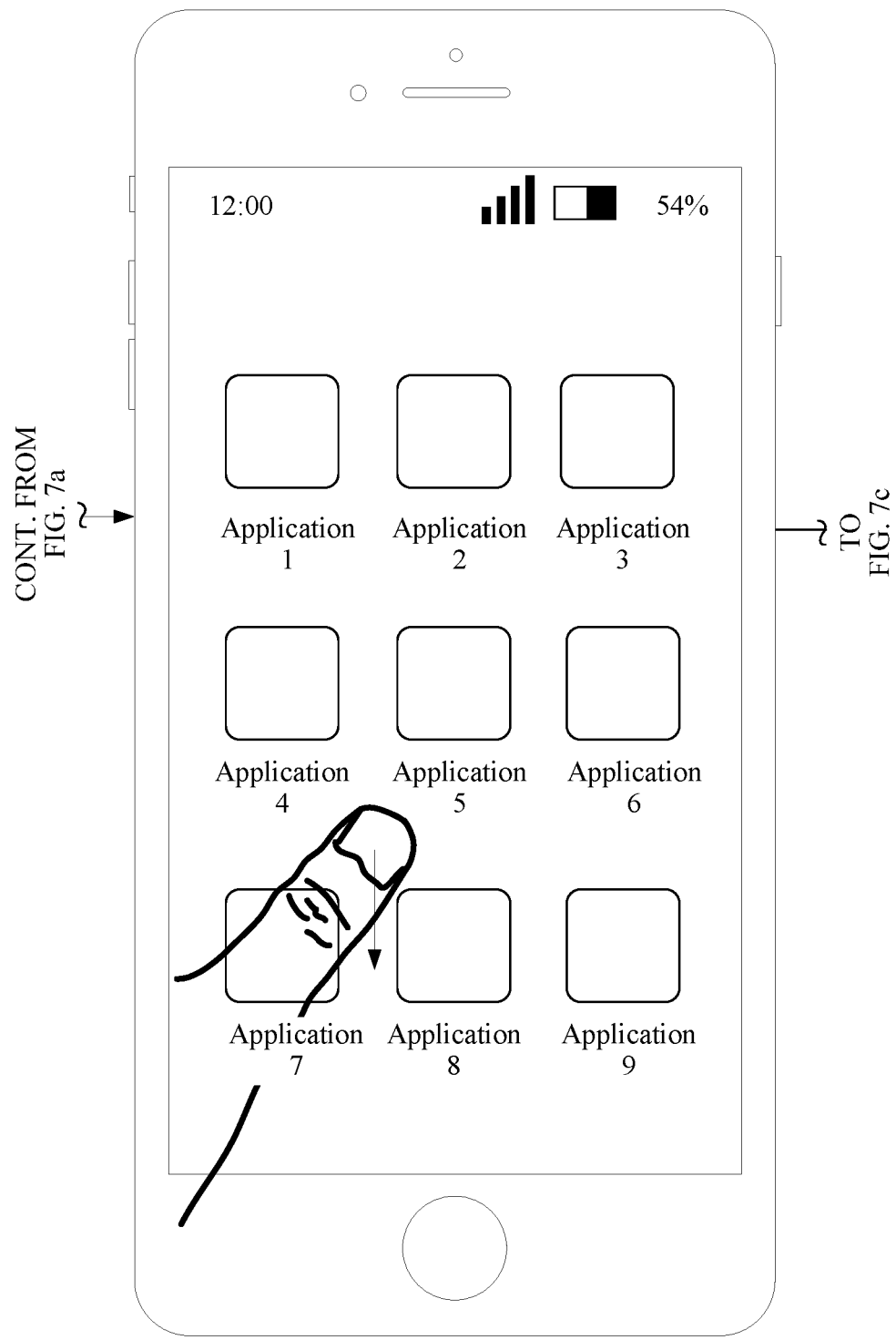
FIG. 7b is a schematic change diagram of an interface displayed on a touchscreen of a mobile phone according to an embodiment.
Figure 7C:
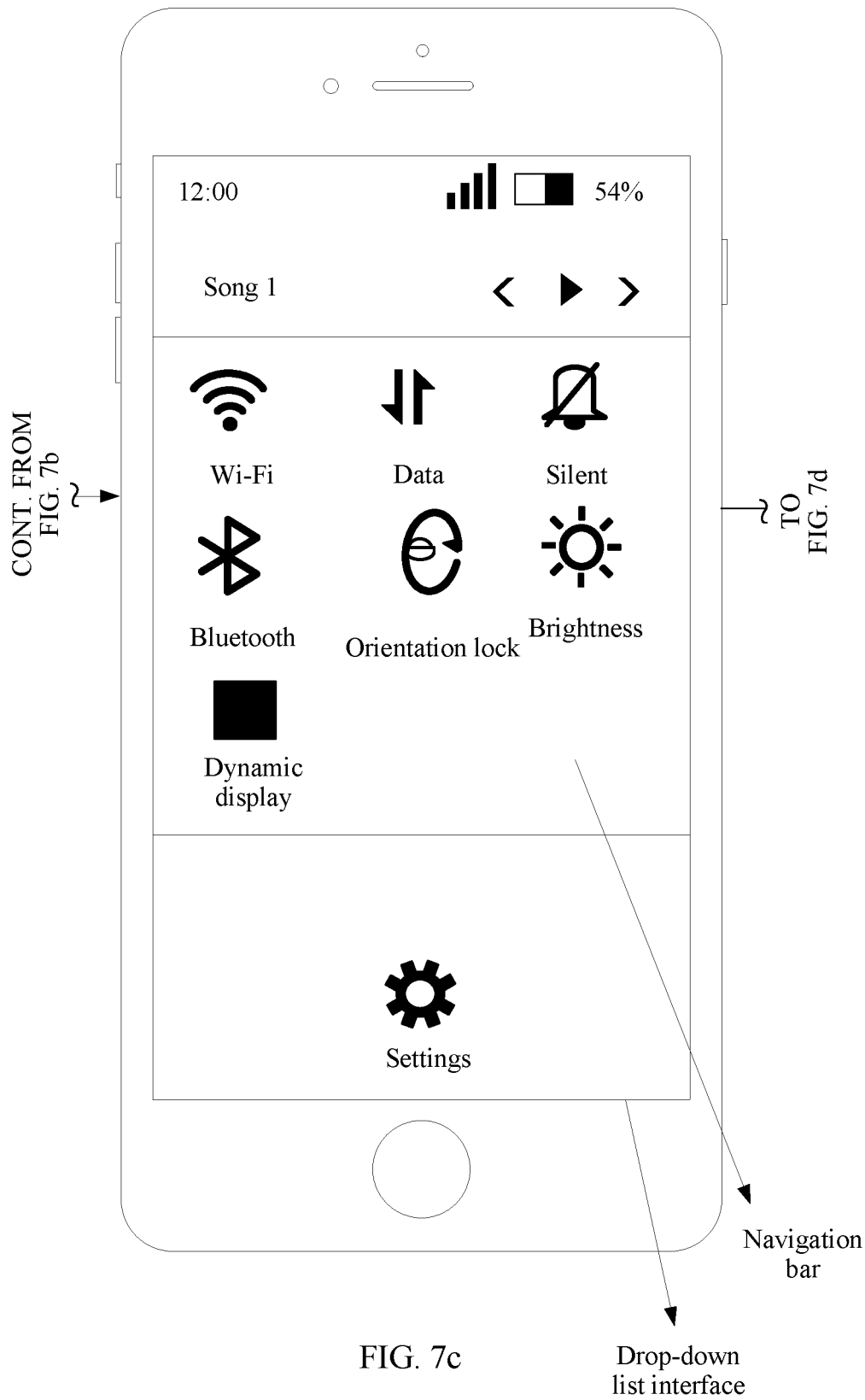
FIG. 7c is a schematic change diagram of an interface displayed on a touchscreen of a mobile phone according to an embodiment.
Figure 7D:
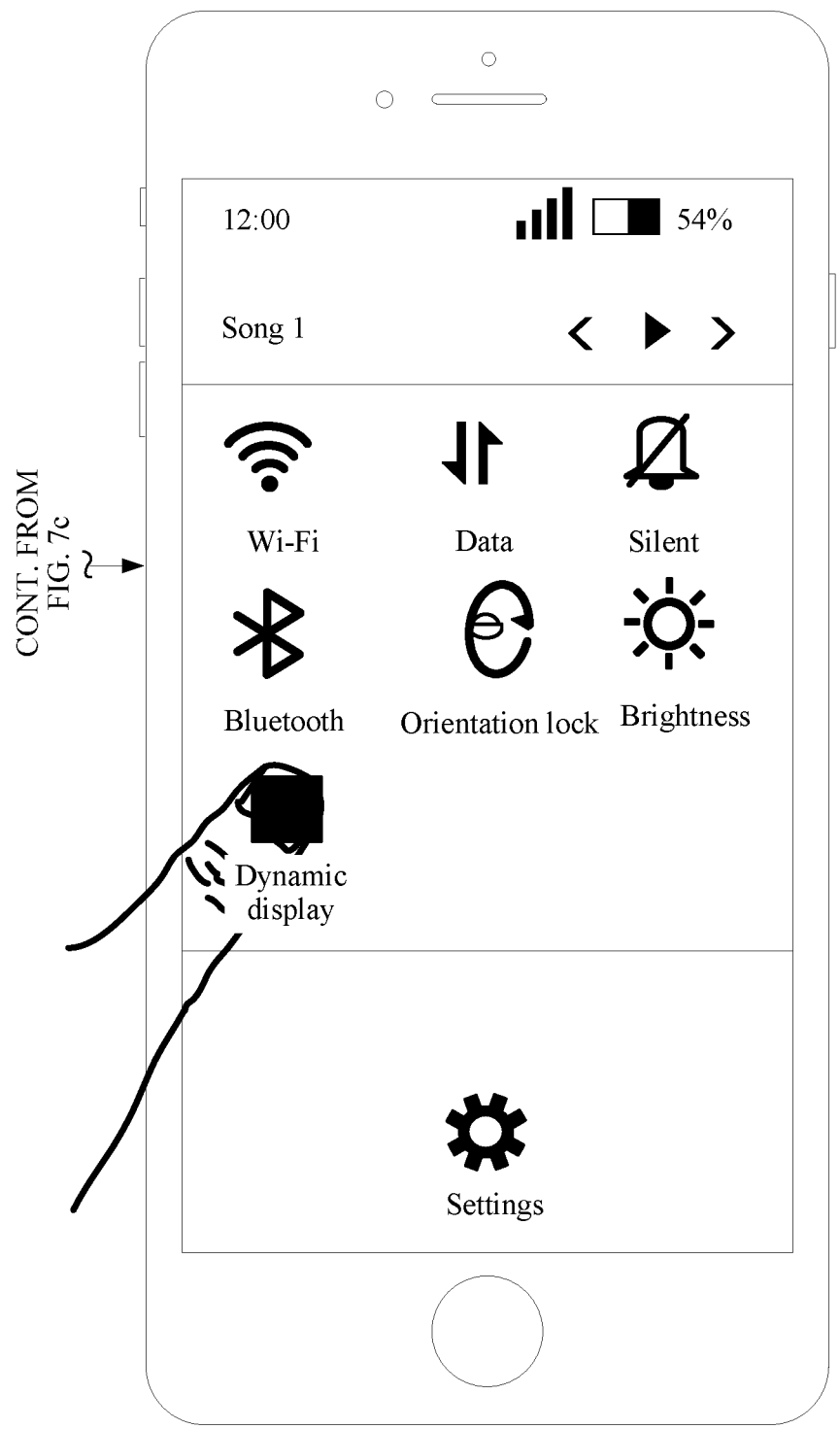
FIG. 7d is a schematic change diagram of an interface displayed on a touchscreen of a mobile phone according to an embodiment.

In an implementation, when the first operation instruction provided in this embodiment is a touchscreen operation instruction, the first operation instruction may correspond to a specific location (for example, a specific region or a specific icon) operated by the user on the touchscreen. For example, FIG. 7a, FIG. 7b, FIG. 7c, and FIG. 7d are a schematic change diagrams of an interface displayed on a touchscreen of a mobile phone according to an embodiment. In FIG. 7a, FIG. 7b, FIG. 7c, and FIG. 7d, FIG. 7a shows that a location at which a user grasps the mobile phone is a grasp point 1, and the touchscreen of the mobile phone is in a home screen. FIG. 7b shows a downward slide operation of the user on the touchscreen of the mobile phone. Subsequently, after receiving the slide operation, a processor of the mobile phone displays, on the touchscreen of the mobile phone, a drop-down list interface shown in FIG. 7c. A "navigation bar" is displayed on the drop-down interface shown in FIG. 7c. The "navigation bar" includes a "Wi-Fi" icon, a "Data" icon, a "Silent" icon, a "Bluetooth" icon, an "Orientation Lock" icon, and a "Dynamic Display" icon. The "Dynamic Display" icon may be added by a person of ordinary skill in the art. Therefore, as shown in FIG. 7d, the user operates the "Dynamic Display" icon in the "navigation bar" shown in FIG. 7c by using a tap gesture, to trigger the processor of the mobile phone to perform the icon display method provided in this embodiment. It can be noted that a person of ordinary skill in the art may easily add a button icon to the "navigation bar" displayed on the touchscreen of the mobile phone. This is not described in detail herein in this embodiment.

In step S602, the processor of the mobile phone matches the first operation instruction with a first preset instruction, so that the touchscreen of the mobile phone enters a dynamic display mode.

Before the icon display method provided in this embodiment is performed, a person of ordinary skill in the art may preset the first preset instruction. The first preset instruction corresponds to a preset user operation, and the operation may trigger the processor of the mobile phone to perform the method provided in this embodiment. For example, when the first preset instruction corresponds to a case in which the touchscreen of the mobile phone is in the drop-down interface shown in FIG. 7c, the user operates the "Dynamic Display" icon in the "navigation bar" by using the tap gesture. For example, "the processor of the mobile phone matches the first operation instruction with a first preset instruction" may include: receiving, by the processor of the mobile phone, the first operation instruction of the user, where the first operation instruction corresponds to an actual user operation; and determining, by the processor of the mobile phone, whether the first operation instruction is the same as the first preset instruction. If the first operation instruction is the same as the first preset instruction, the processor of the mobile phone enables the touchscreen of the mobile phone to enter the dynamic display mode, and scales the sensing region of the icon displayed on the touchscreen of the mobile phone. The first preset instruction may be stored in a memory of the mobile phone.

It can be noted that, in this embodiment, a specific operation instruction received by the processor of the mobile phone from the user is not limited; in other words, a specific form of a user operation corresponding to the operation instruction is not limited. A specific operation to be used by the user may be preconfigured in the mobile phone or notified to the user in advance by using prompt information, so that when the mobile phone needs to obtain an operation instruction from the user, the user can perform a corresponding operation on the touchscreen based on a configuration or the prompt information. The user may operate the mobile phone based on the user operation that corresponds to the first preset instruction and that is preconfigured in the mobile phone, so that the processor of the mobile phone receives the first operation instruction that is the same as the first preset instruction, to trigger the processor of the mobile phone to perform the icon display method provided in this embodiment.

Figure 8:
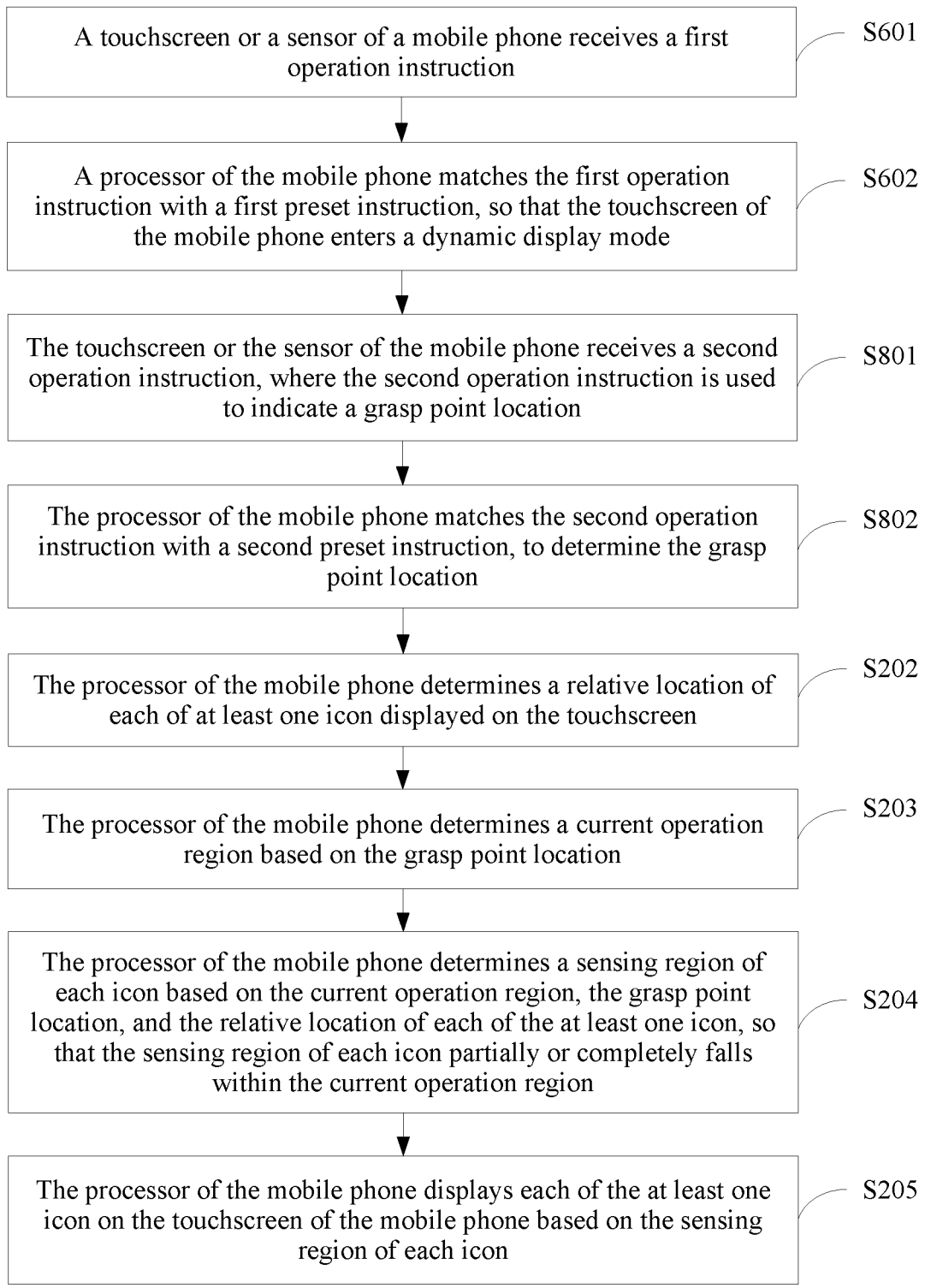
FIG. 8 is a schematic flowchart of another icon display method according to an embodiment.

Further, before the processor of the mobile phone performs the icon display method provided in this embodiment, the touchscreen or the sensor such as the fingerprint sensor of the mobile phone may further receive the operation instruction from the user, so that the processor of the mobile phone determines an actual grasp point location. For example, before S201, the icon display method provided in this embodiment may further include S801. Correspondingly, S201 may be replaced with S802. For example, as shown in FIG. 8, the method shown in FIG. 6 may further include S801 between S602 and S201, and S201 in FIG. 6 may be replaced with S802.

In step S801, the touchscreen or the sensor of the mobile phone receives a second operation instruction, where the second operation instruction is used to indicate the grasp point location.

Figure 9A:
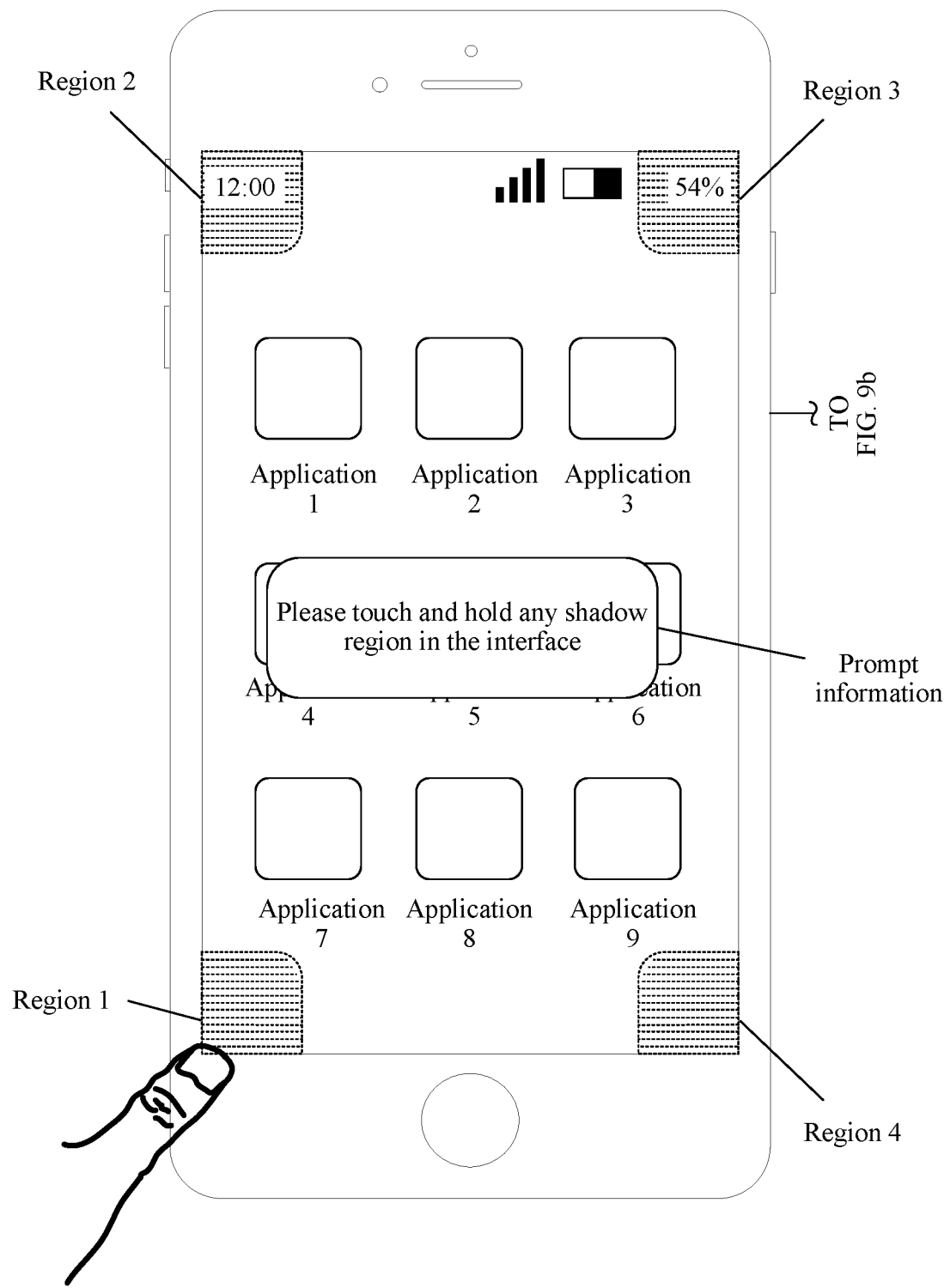
FIG. 9a is another schematic change diagram of an interface displayed on a touchscreen of a mobile phone according to an embodiment.
Figure 9B:
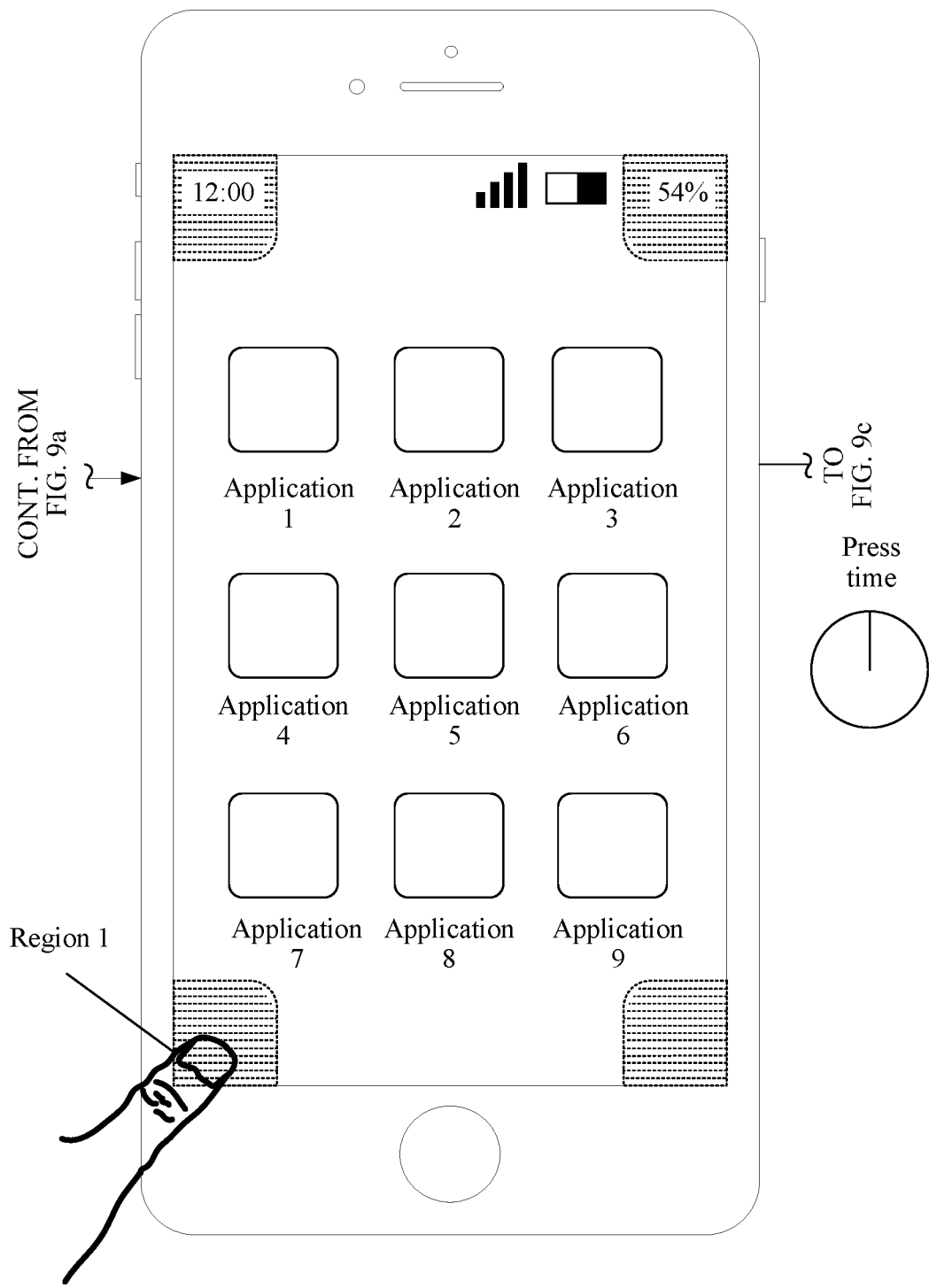
FIG. 9b is another schematic change diagram of an interface displayed on a touchscreen of a mobile phone according to an embodiment.
Figure 9C:
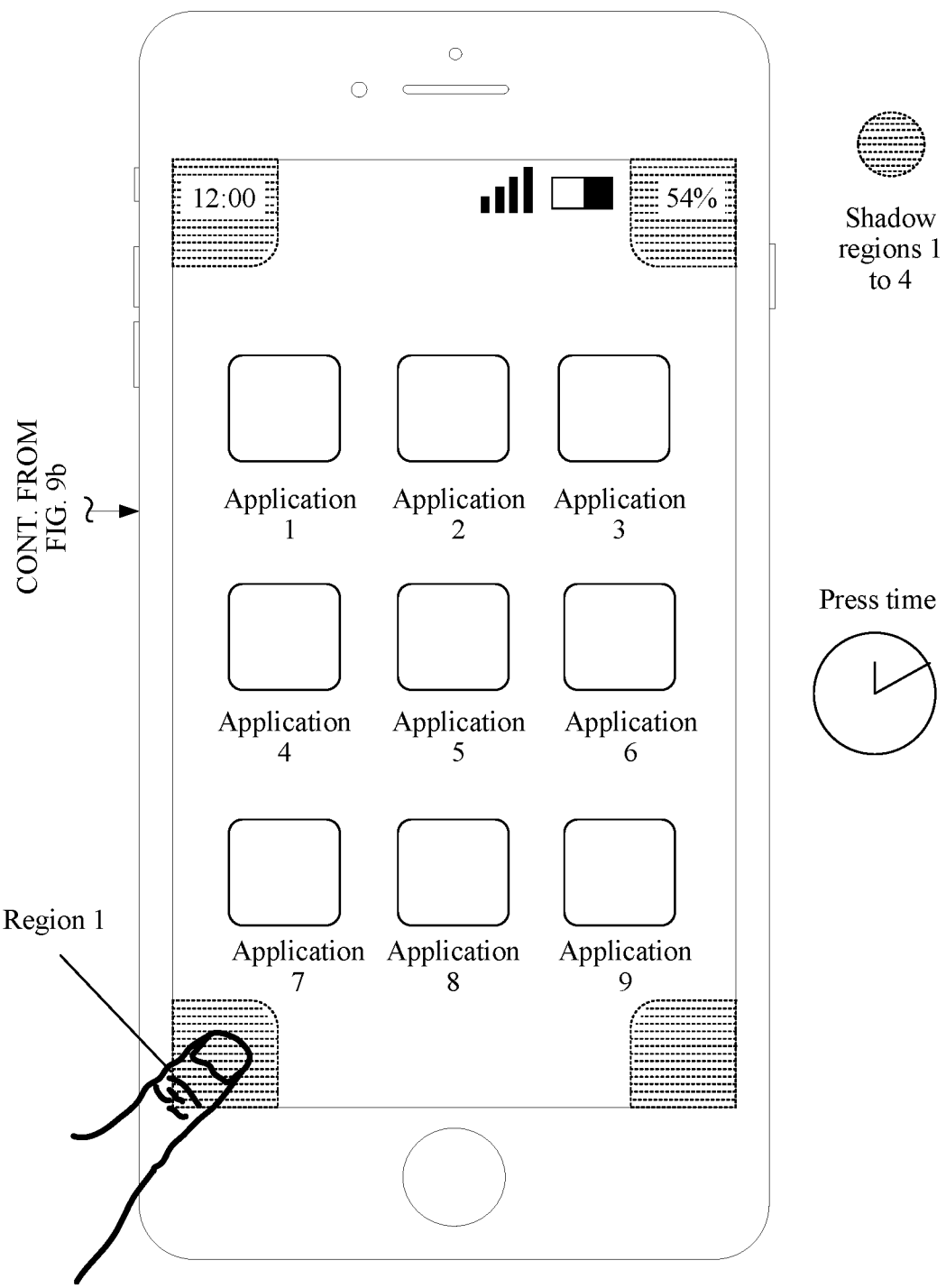
FIG. 9c is another schematic change diagram of an interface displayed on a touchscreen of a mobile phone according to an embodiment.

When the second operation instruction provided in this embodiment is a touchscreen operation instruction, the second operation instruction may correspond to a specific location (for example, a specific region or a specific icon) operated by the user on the touchscreen of the mobile phone. For example, FIG. 9a, FIG. 9b, and FIG. 9c are schematic change diagrams of an interface displayed on a touchscreen of a mobile phone according to an embodiment. In FIG. 9a, FIG. 9b, and FIG. 9c, FIG. 9a shows that the touchscreen of the mobile phone displays shadow regions: a region 1 to a region 4, and displays prompt information: "Please touch and hold any shadow region in the interface". The regions 1 to 4 in FIG. 9a respectively correspond to grasp points 1 to 4. FIG. 9b and FIG. 9c show that a user operates the region 1 displayed on the touchscreen of the mobile phone by using a touch and hold gesture. Subsequently, a second operation instruction received by a processor of the mobile phone may be that the user presses the region 1 displayed on the touchscreen of the mobile phone by using the touch and hold gesture, and press duration reaches preset duration. The preset duration may be preset. It can be noted that, during actual application, before the processor of the mobile phone receives the second operation instruction, the touchscreen of the mobile phone may display the prompt information and the shadow regions shown in FIG. 9a, or may not display the prompt information and the shadow regions. This is not limited herein in this embodiment.

Figure 10A:
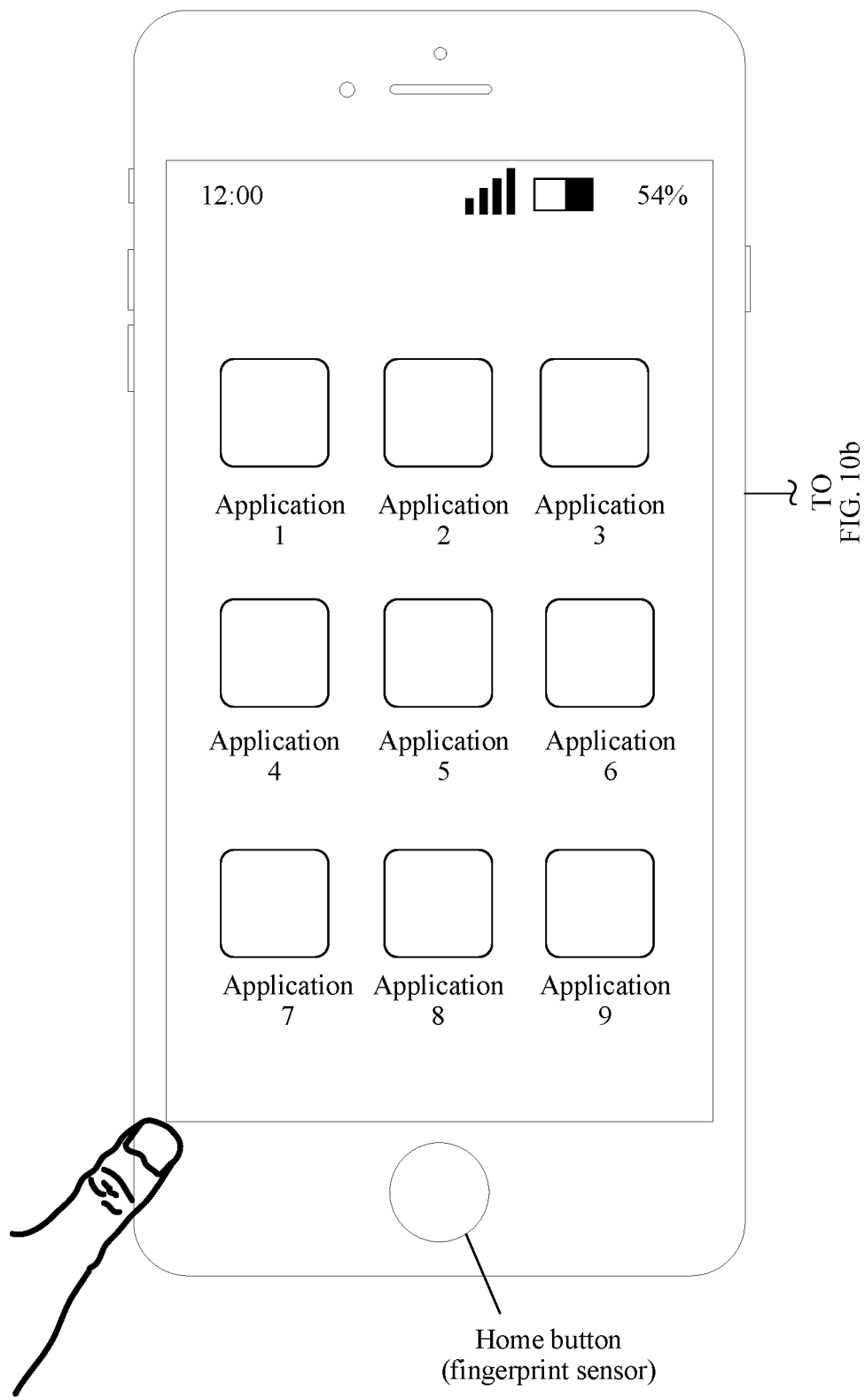
FIG. 10a is another schematic change diagram of an interface displayed on a touchscreen of a mobile phone according to an embodiment.
Figure 10B:
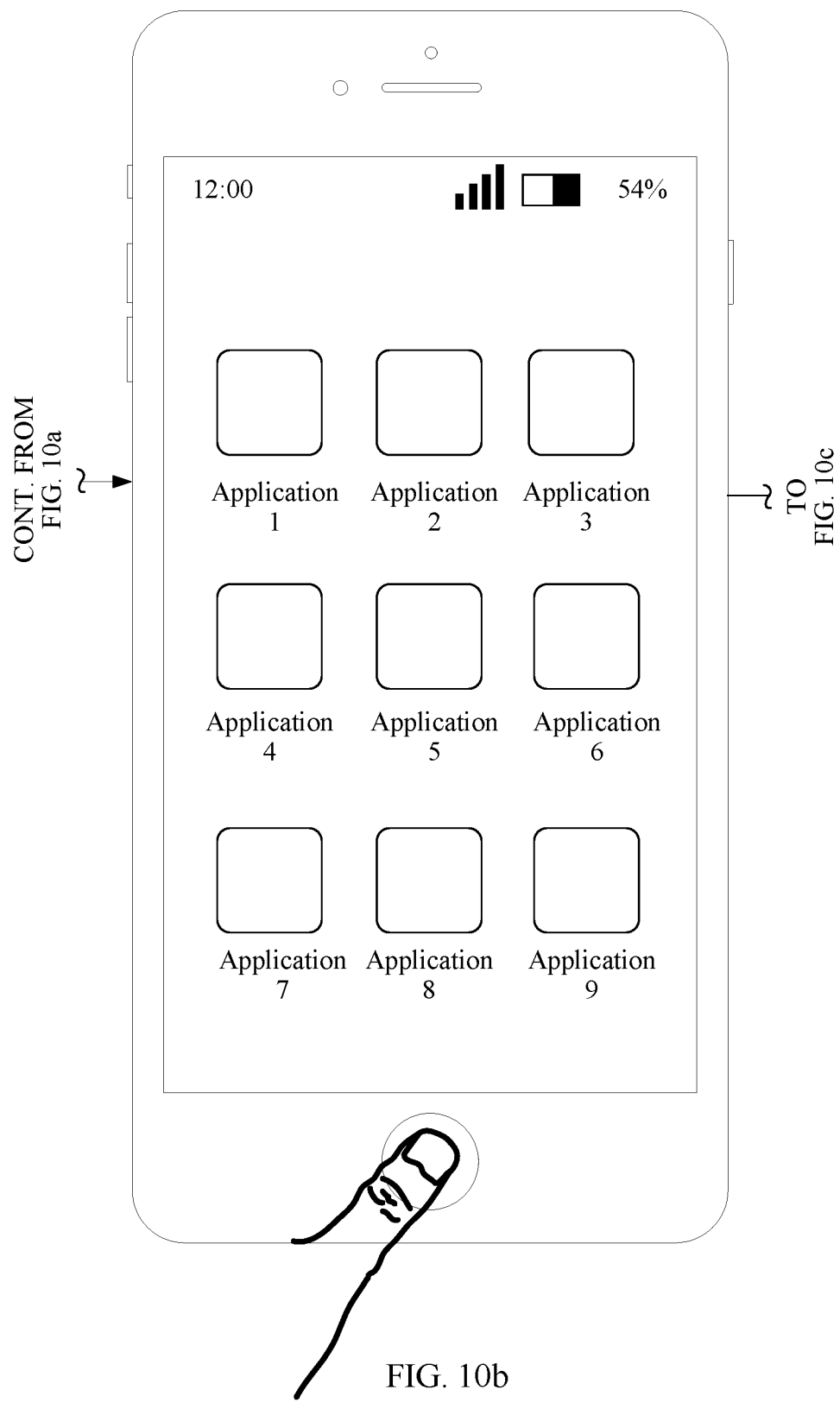
FIG. 10b is another schematic change diagram of an interface displayed on a touchscreen of a mobile phone according to an embodiment.
Figure 10C:
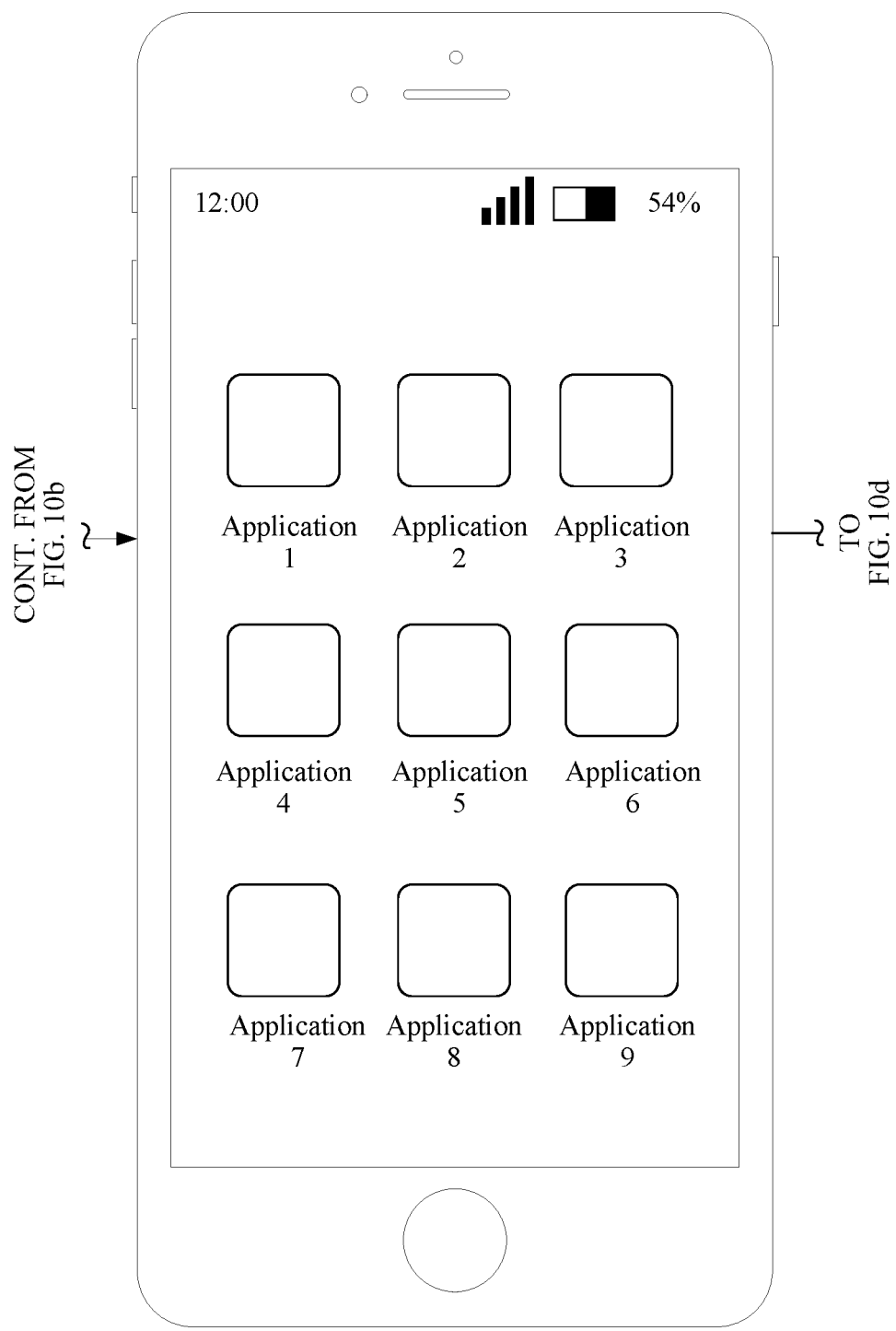
FIG. 10c is another schematic change diagram of an interface displayed on a touchscreen of a mobile phone according to an embodiment.
Figure 10D:
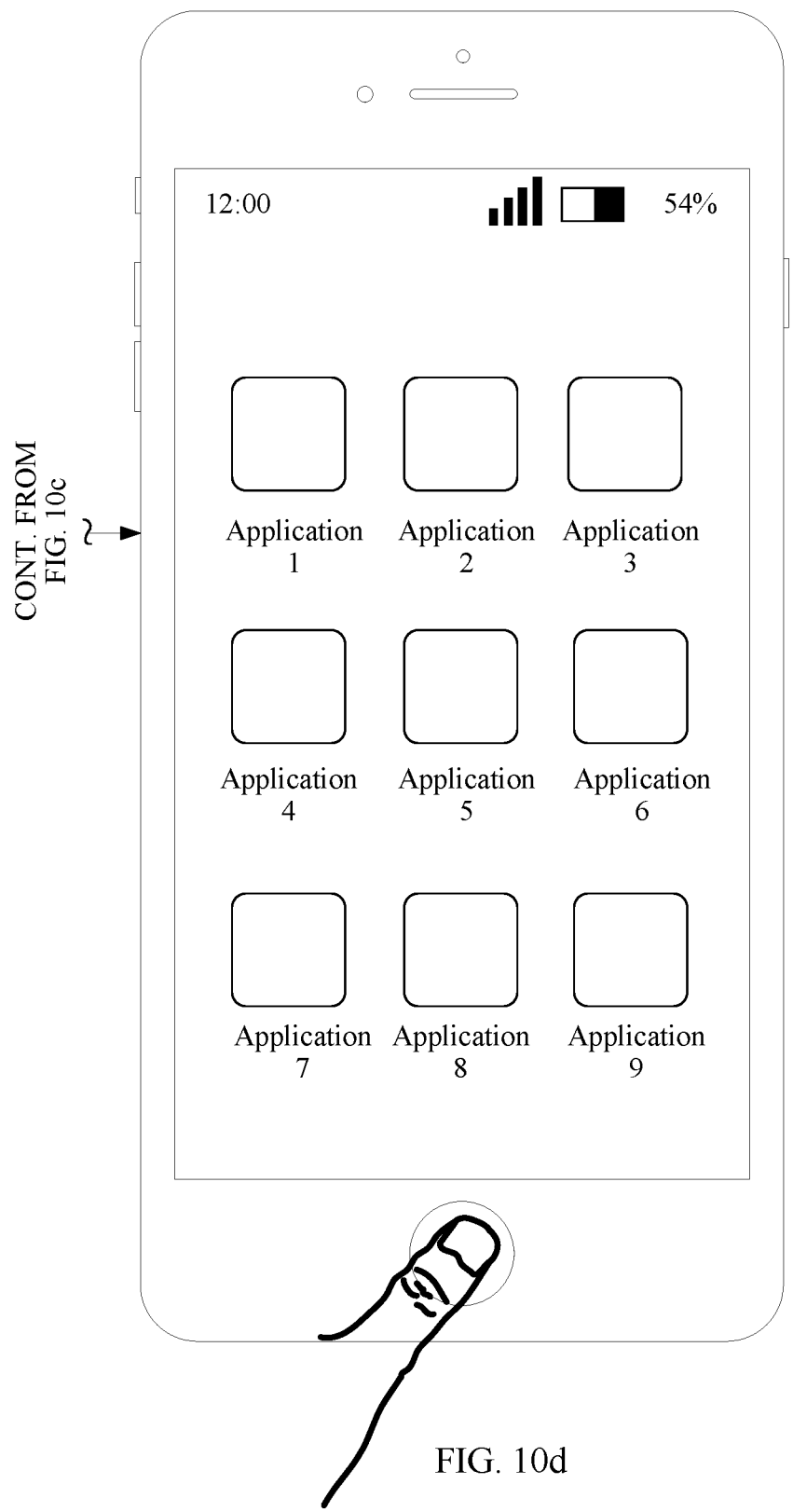
FIG. 10d is another schematic change diagram of an interface displayed on a touchscreen of a mobile phone according to an embodiment.

When the second operation instruction provided in this embodiment is a fingerprint operation instruction, the second operation instruction may correspond to a case in which the user operates the fingerprint sensor of the mobile phone by using different gestures. For example, FIG. 10a, FIG. 10b, FIG. 10c, and FIG. 10d are schematic change diagrams of an interface displayed on a touchscreen of a mobile phone according to an embodiment. In FIG. 10a, FIG. 10b, FIG. 10c, and FIG. 10d, FIG. 10a shows that a fingerprint sensor of the mobile phone is a home button of the mobile phone. FIG. 10b to FIG. 10d show that a user operates the fingerprint sensor with a left hand thumb by using a double-tap gesture. Subsequently, a second operation instruction received by a processor of the mobile phone may be a left hand thumb fingerprint of the user, that the user performs a tap operation on the fingerprint sensor with the left hand thumb, and that the tap operation is performed twice. In this embodiment, herein, when a part at which the user grasps the mobile phone with a left hand is a grasp point 1, the left hand thumb may operate the fingerprint sensor by using the double-tap gesture; when a part at which the user grasps the mobile phone with a left hand is a grasp point 2, the left hand thumb may operate the fingerprint sensor by using a tap gesture; when a part at which the user grasps the mobile phone with a right hand is a grasp point 3, a right hand thumb may operate the fingerprint sensor by using a tap gesture; or when a part at which the user grasps the mobile phone with a right hand is a grasp point 4, a right hand thumb may operate the fingerprint sensor by using the double-tap gesture.

Figure 11A:
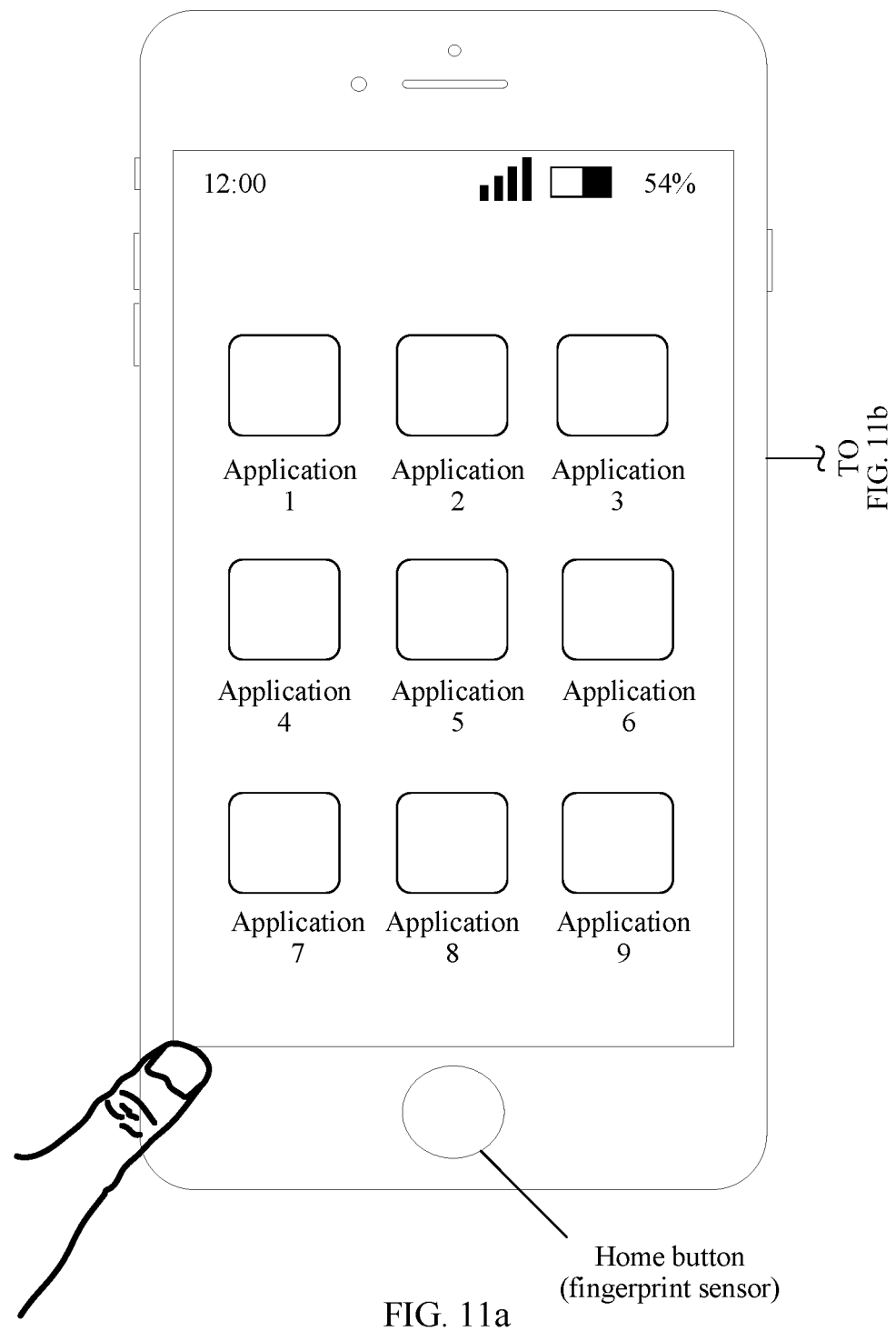
FIG. 11a is another schematic change diagram of an interface displayed on a touchscreen of a mobile phone according to an embodiment.
Figure 11B:
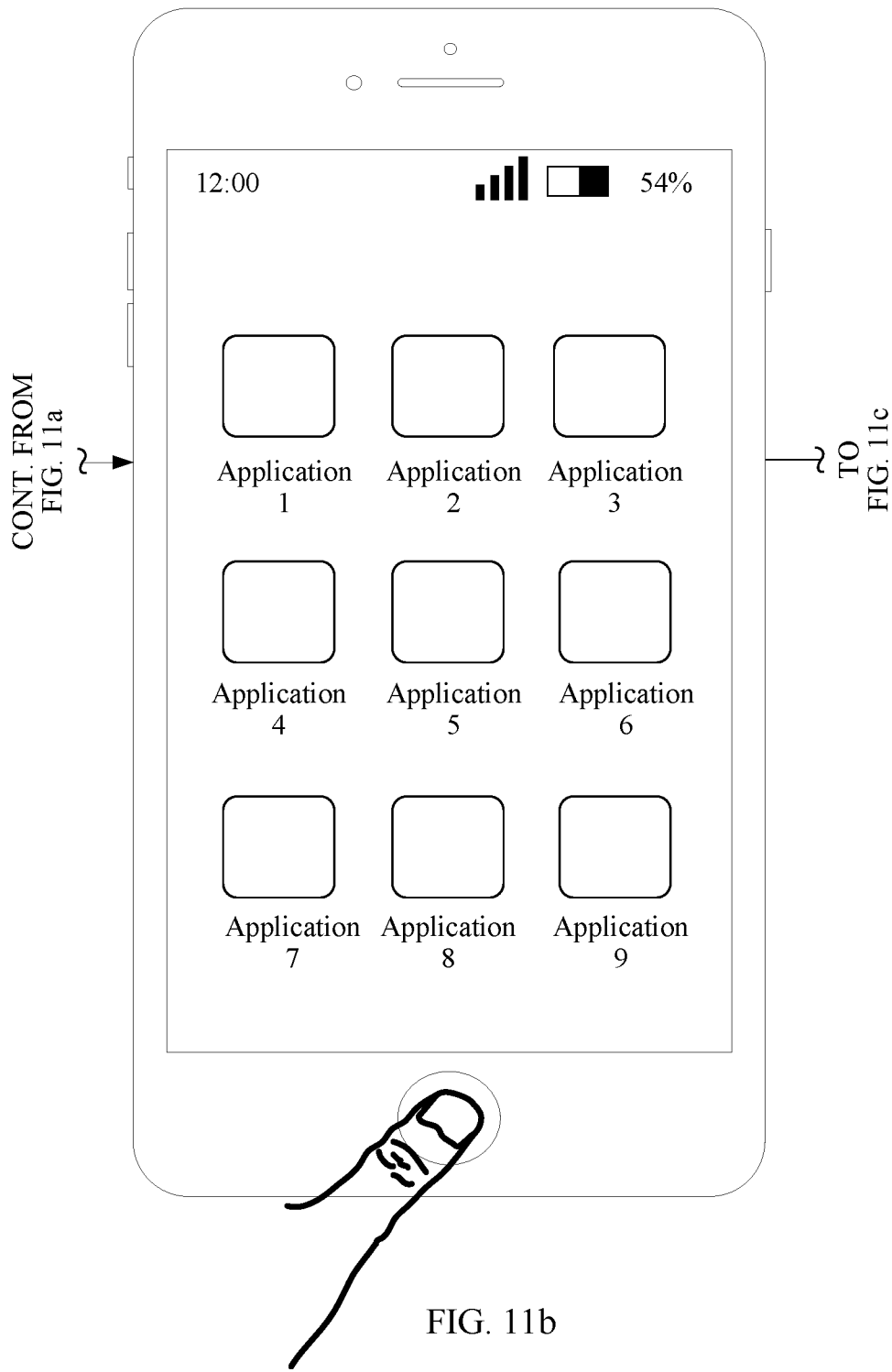
FIG. 11b is another schematic change diagram of an interface displayed on a touchscreen of a mobile phone according to an embodiment.
Figure 11C:
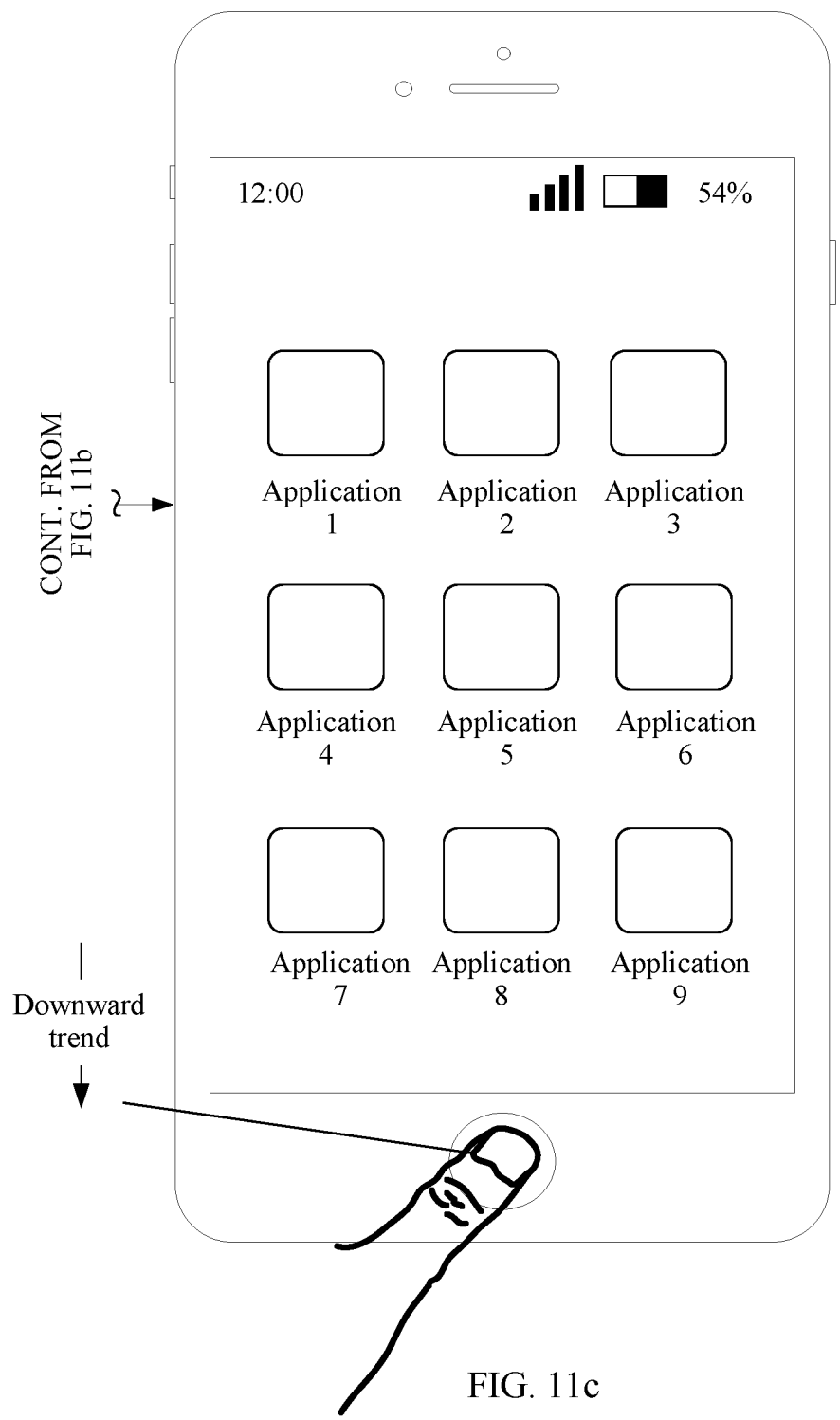
FIG. 11c is another schematic change diagram of an interface displayed on a touchscreen of a mobile phone according to an embodiment.

Alternatively, FIG. 11a, FIG. 11b, and FIG. 11c are schematic change diagrams of an interface displayed on a touchscreen of a mobile phone according to an embodiment. In FIG. 11a, FIG. 11b, and FIG. 11c, FIG. 11a shows that a fingerprint sensor of the mobile phone is a home button of the mobile phone. FIG. 11b and FIG. 11c show that a user operates the fingerprint sensor of the mobile phone with a left hand thumb by using a tangential gesture of a downward trend. Subsequently, a second operation instruction received by a processor of the mobile phone may be a left hand thumb fingerprint of the user and that the tangential gesture of the left hand thumb for the fingerprint sensor has the downward trend. In this embodiment, herein, when a part at which the user grasps the mobile phone with a left hand is a grasp point 1, the left hand thumb may operate the fingerprint sensor by using the tangential gesture of the downward trend; when a part at which the user grasps the mobile phone with a left hand is a grasp point 2, the left hand thumb may operate the fingerprint sensor by using a tangential gesture of an upward trend; when a part at which the user grasps the mobile phone with a right hand is a grasp point 3, a left hand thumb may operate the fingerprint sensor by using a tangential gesture of an upward trend; or when a part at which the user grasps the mobile phone with a right hand is a grasp point 4, a left hand thumb may operate the fingerprint sensor by using the tangential gesture of the downward trend. A specific form in which the user operates the fingerprint sensor and that corresponds to the second operation instruction is not limited herein in this embodiment.

Figure 12A:
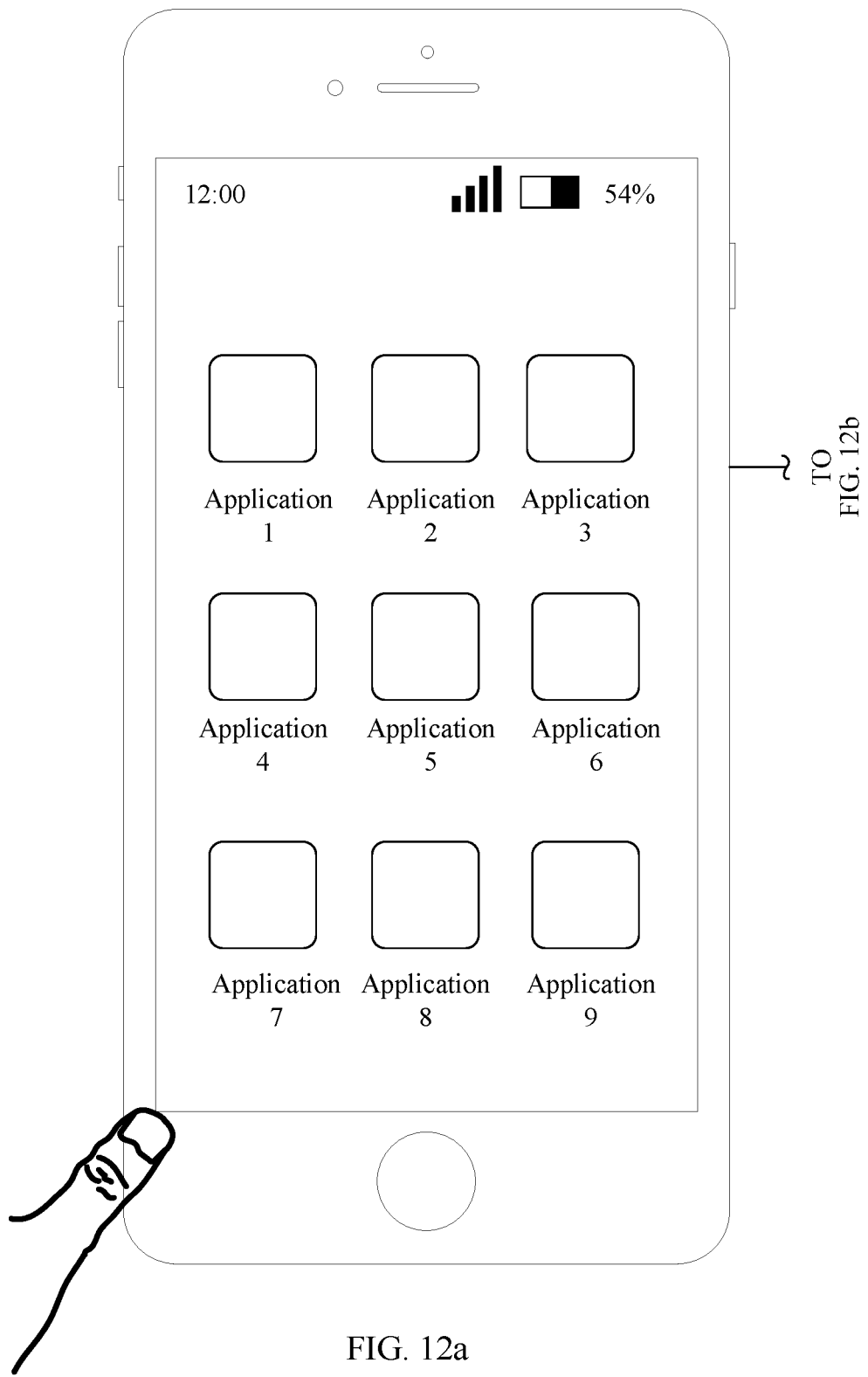
FIG. 12a is another schematic change diagram of an interface displayed on a touchscreen of a mobile phone according to an embodiment.
Figure 12B:
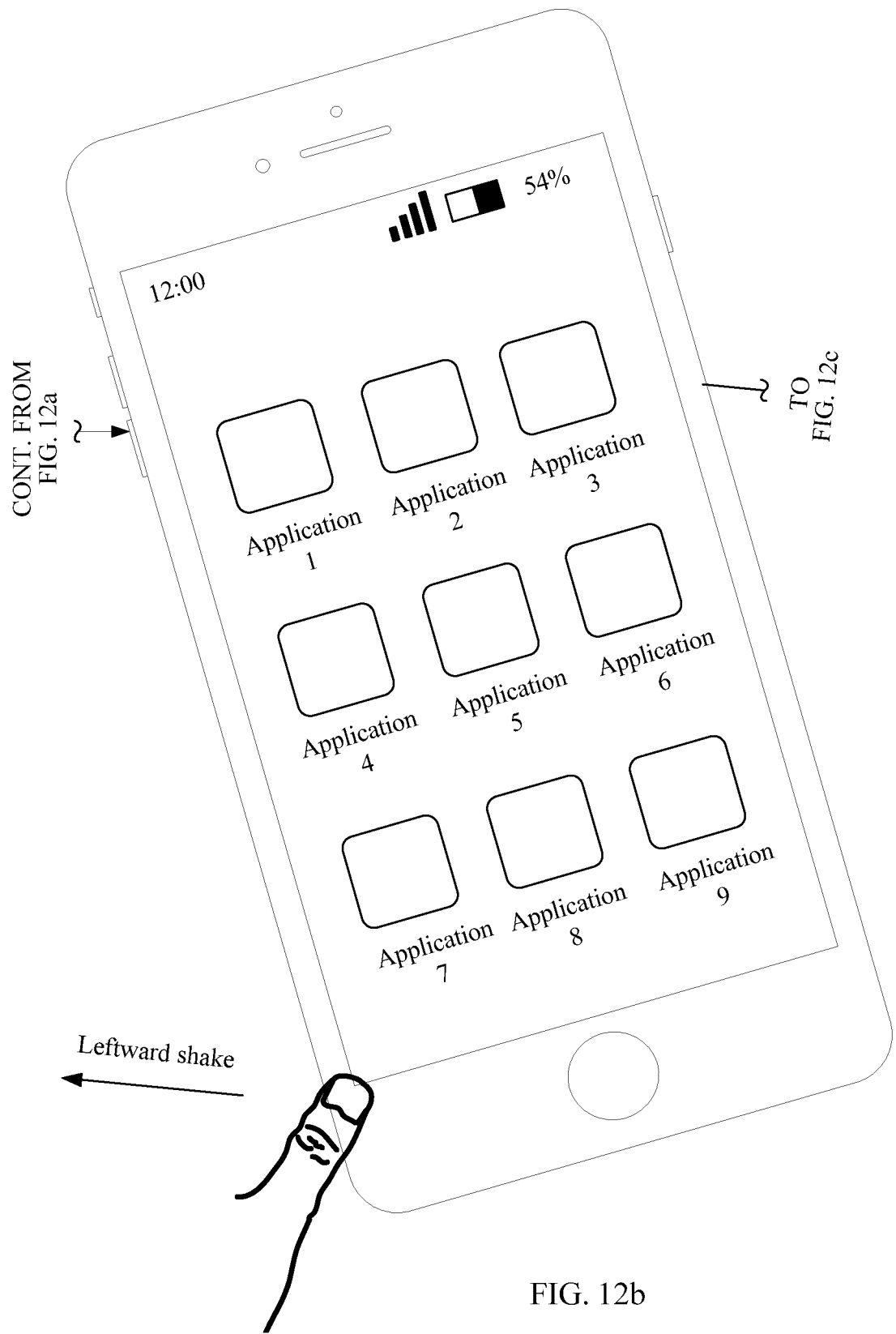
FIG. 12b is another schematic change diagram of an interface displayed on a touchscreen of a mobile phone according to an embodiment.
Figure 12C:
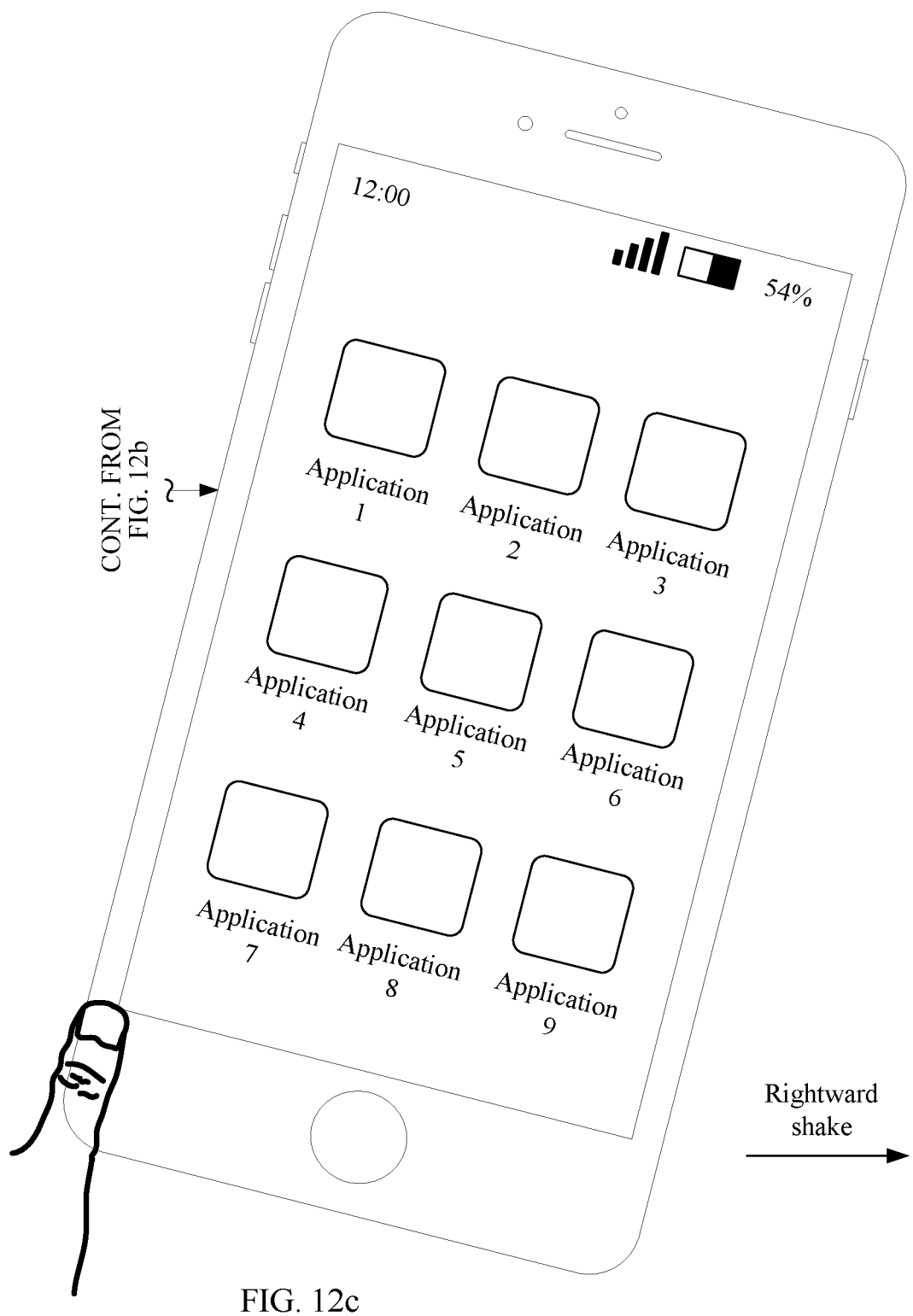
FIG. 12c is another schematic change diagram of an interface displayed on a touchscreen of a mobile phone according to an embodiment.

When the second operation instruction provided in this embodiment is a gravity operation instruction, the second operation instruction may correspond to a case in which the user operates the mobile phone by using a shake gesture. For example, FIG. 12a, FIG. 12b, and FIG. 12c are schematic change diagrams of an interface displayed on a touchscreen of a mobile phone according to an embodiment. In FIG. 12a, FIG. 12b, and FIG. 12c, FIG. 12a shows that a user grasps the mobile phone with a left hand before the user operates the mobile phone by using a shake gesture. FIG. 12a and FIG. 12b show that the user operates the mobile phone by using a leftward shake gesture and a rightward shake gesture. Subsequently, a second operation instruction received by a processor of the mobile phone may be shake angles of locations of grasp points 1 to 4 and that a location of the grasp point 1 is at a smallest shake angle. When the user operates the mobile phone by using the leftward shake gesture and the rightward shake gesture, if a part at which the user grasps the mobile phone is the grasp point 1, the location of the grasp point 1 is at the smallest shake angle; if a part at which the user grasps the mobile phone is the grasp point 2, a location of the grasp point 2 is at the smallest shake angle; if a part at which the user grasps the mobile phone is the grasp point 3, a location of the grasp point 3 is at the smallest shake angle; or if a part at which the user grasps the mobile phone is the grasp point 4, a location of the grasp point 4 is at the smallest shake angle.

Generally, when the user operates the mobile phone with one hand, a part at which the user grasps the mobile phone with the left hand may be a lower left corner of the mobile phone, for example, the grasp point 1 shown in FIG. 3; and a part at which the user grasps the mobile phone with the right hand may be a lower right corner of the mobile phone, for example, the grasp point 4 shown in FIG. 3.

Before the icon display method provided in this embodiment is performed, a second preset instruction may be preset in the mobile phone (for example, the memory of the mobile phone), to support execution of S802 in the method in this embodiment.

In step S802, the processor of the mobile phone matches the second operation instruction with a second preset instruction, to determine the grasp point location.

For example, before the icon display method provided in this embodiment is performed, a person of ordinary skill in the art may preset four second preset instructions, and the four second preset instructions respectively correspond to four different grasp point locations, for example, grasp points 1 to 4. In addition, the four second preset instructions respectively correspond to four preset user operations. For example, "the processor of the mobile phone matches the second operation instruction with a second preset instruction, to determine the grasp point location" may include: receiving, by the processor of the mobile phone, the second operation instruction of the user, where the second operation instruction corresponds to an actual user operation; and determining, by the processor of the mobile phone, whether the second operation instruction is the same as any one of the four second preset instructions. If the second operation instruction is the same as the any second preset instruction, the processor of the mobile phone determines a grasp point location corresponding to the any second preset instruction. For example, the any one of the four second preset instructions may be that the user operates, by using a touch and hold gesture within a specific time, the region 1 displayed on the touchscreen of the mobile phone shown in FIG. 9a, FIG. 9b, and FIG. 9c, in other words, the second preset instruction corresponds to the grasp point 1. Subsequently, if the second operation instruction corresponds to a case in which the user operates, by using the touch and hold gesture, the region 1 displayed on the touchscreen of the mobile phone, and an operation time reaches the specific time, the processor of the mobile phone determines that the second operation instruction is the same as the any second preset instruction, and the actual grasp point location is the grasp point 1.

Figure 13:
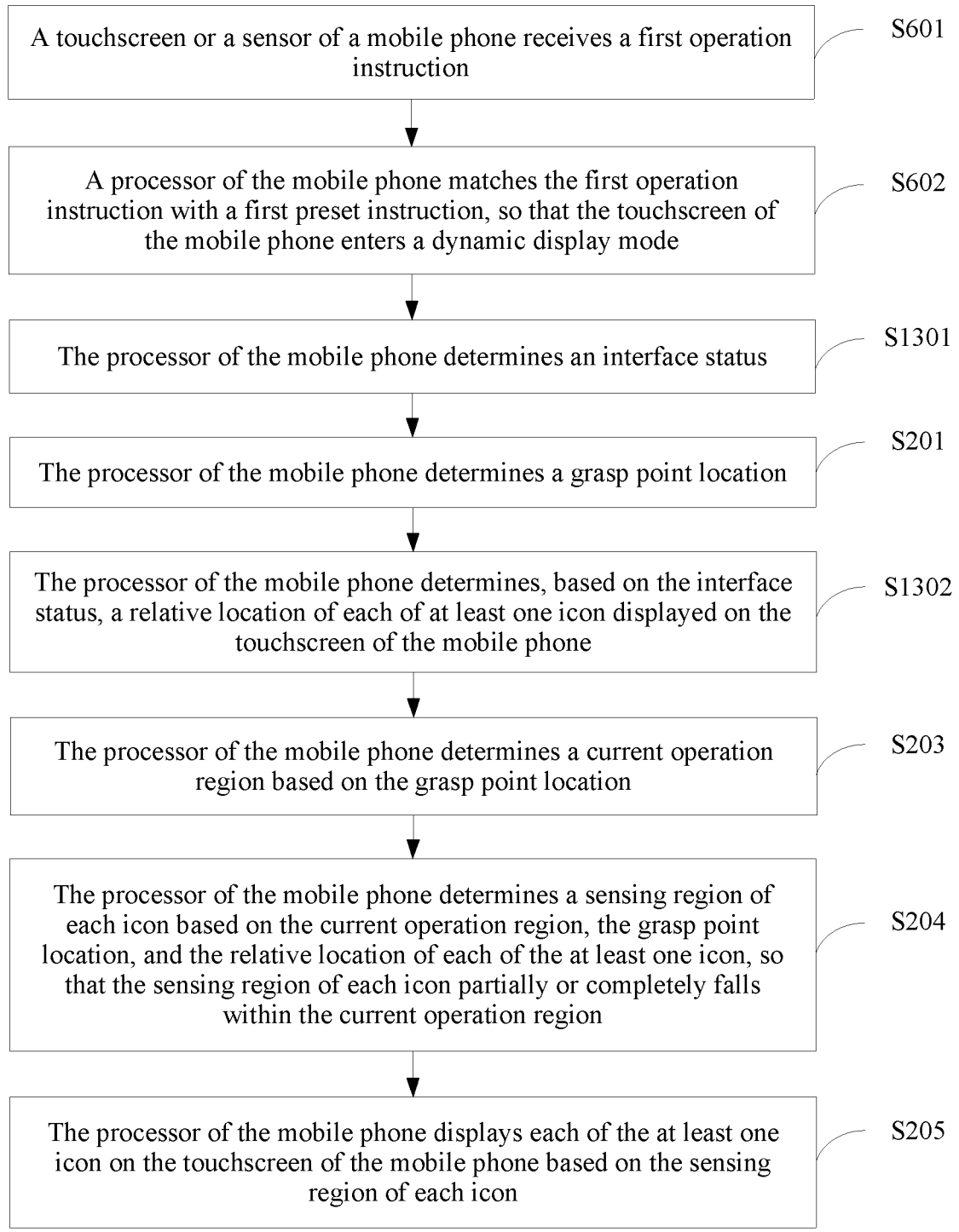
FIG. 13 is a schematic flowchart of another icon display method according to an embodiment.

Further, when the user operates the mobile phone with one hand, the mobile phone (the touchscreen of the mobile phone) may be in different interface statuses, for example, in a portrait state or a landscape state. When the mobile phone is in the portrait state and the landscape state, a same icon displayed on the touchscreen may be at different locations, and a location of the icon may be preset. However, the location of the icon displayed on the touchscreen affects dynamic display of the icon in the icon display method provided in this embodiment. Therefore, the processor of the mobile phone may perform the method with reference to the interface status of the mobile phone. After S601, the icon display method provided in this embodiment may further include S1301. Correspondingly, S202 may be replaced with S1302. For example, as shown in FIG. 13, the method shown in FIG. 6 may further include S1301 between S602 and S201, and S202 in FIG. 6 may be replaced with S1302.

In step S1301, the processor of the mobile phone determines an interface status.

Figure 14A:
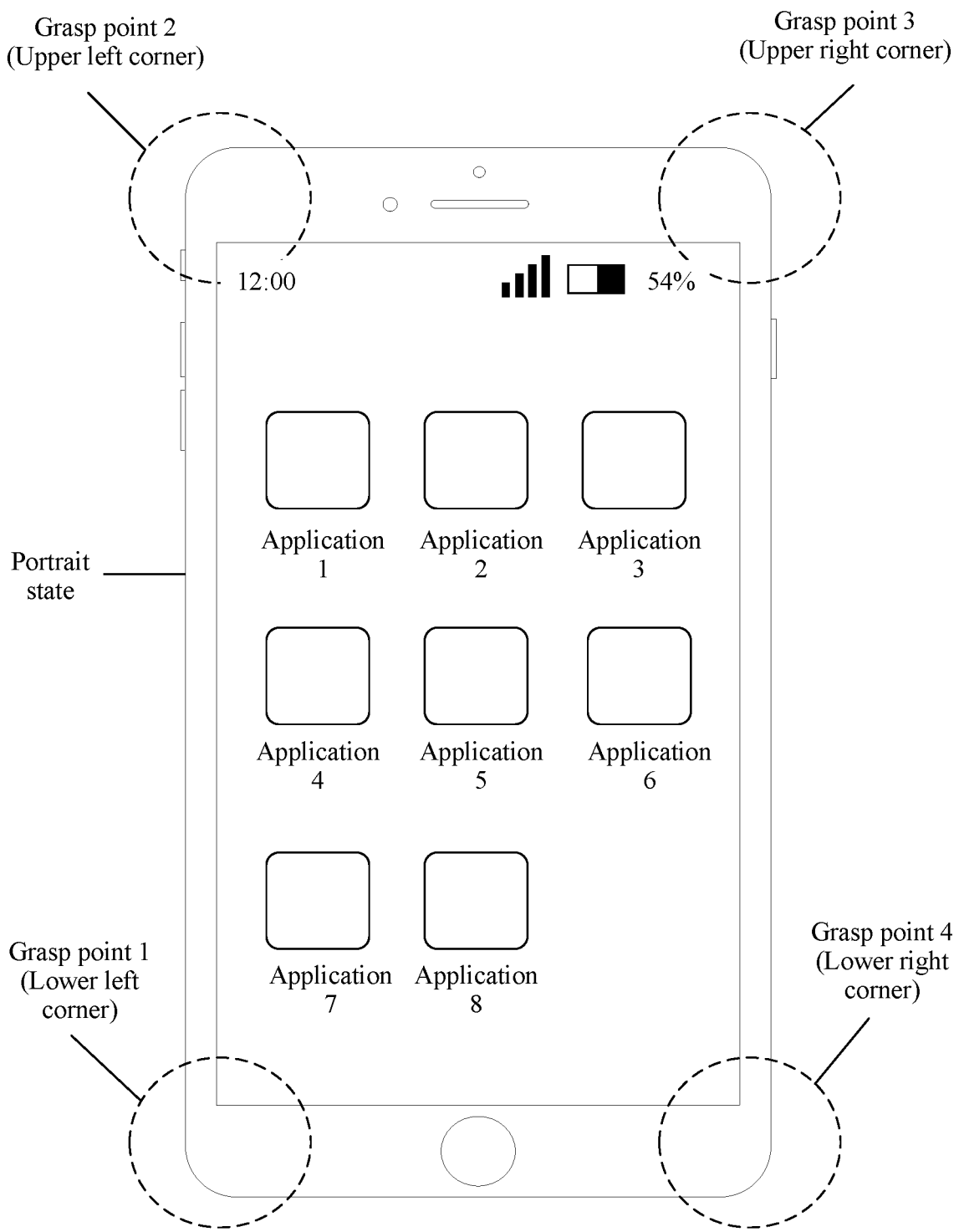
FIG. 14a is another schematic change diagram of an interface displayed on a touchscreen of a mobile phone according to an embodiment.
Figure 14B:
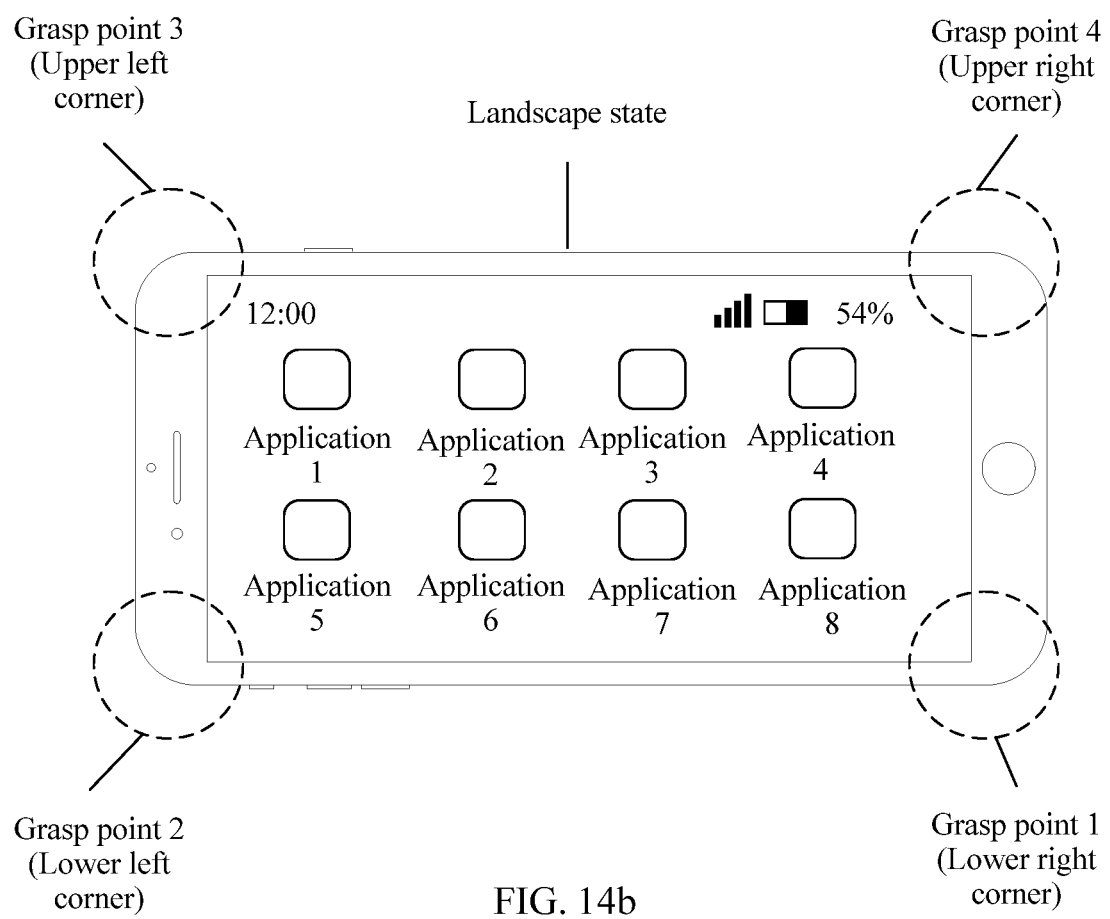
FIG. 14b is another schematic change diagram of an interface displayed on a touchscreen of a mobile phone according to an embodiment.

When the user operates the mobile phone with one hand, a grasp posture of the user for the mobile phone may be grasping the mobile phone with the left hand or the right hand. When the user grasps the mobile phone with the left hand, a grasp part for the mobile phone may be an upper left corner or a lower left corner of the mobile phone. When the user grasps the mobile phone with the right hand, a grasp part for the mobile phone may be an upper right corner or a lower right corner of the mobile phone. It can be noted that, if the mobile phone is in different interface statuses, the user may grasp the mobile phone at different parts by using a same holding posture. For example, FIG. 14a and FIG. 14b are another schematic change diagram of an interface displayed on a touchscreen of a mobile phone according to an embodiment. The mobile phone shown in FIG. 14a is in a portrait state, a lower left corner of the mobile phone is a grasp point 1 of the mobile phone, an upper left corner is a grasp point 2 of the mobile phone, an upper right corner is a grasp point 3 of the mobile phone, and a lower right corner is a grasp point 4 of the mobile phone. In addition, the processor of the mobile phone displays application program icons (applications 1 to 8) on the touchscreen of the mobile phone based on a preset location of each icon (denoted as a portrait location of the icon). The mobile phone shown in FIG. 14b is in a landscape state, a lower left corner of the mobile phone is the grasp point 2 of the mobile phone, an upper left corner is the grasp point 3 of the mobile phone, an upper right corner is the grasp point 4 of the mobile phone, and a lower right corner is the grasp point 1 of the mobile phone. In addition, the processor of the mobile phone displays the application program icons (the applications 1 to 8) on the touchscreen of the mobile phone based on a preset location of each icon (denoted as a landscape location of the icon). A landscape location and a portrait location of a same icon displayed on the touchscreen of the mobile phone are different. For example, a location of the application 1 displayed on the touchscreen of the mobile phone shown in FIG. 14a is different from a location of the application 1 displayed on the touchscreen of the mobile phone shown in FIG. 14b.

In step S1302, the processor of the mobile phone determines, based on the interface status, the relative location of each of the at least one icon displayed on the touchscreen of the mobile phone.

The landscape location and the portrait location of the same icon displayed on the touchscreen of the mobile phone are different. Therefore, when the mobile phone is in different interface statuses, even if the user grasps the mobile phone at a same part, the icon may be at different relative locations. For example, a location of the application 1 displayed on the touchscreen of the mobile phone shown in FIG. 14a relative to the grasp point 1 is different from a location of the application 1 displayed on the touchscreen of the mobile phone shown in FIG. 14b relative to the grasp point 1.

In the icon display method provided herein in this embodiment, in the dynamic display mode, the processor of the mobile phone may determine, based on the grasp point location and the interface status of the mobile phone, the relative location of each icon displayed on the touchscreen of the mobile phone, so that the relative location of each icon is more accurate. Therefore, the processor of the mobile phone determines more accurate sensing region of each icon based on the relative location of each icon. This helps the sensing region of each icon displayed on the touchscreen of the mobile phone partially or completely fall within the current operation region.

Figure 15:
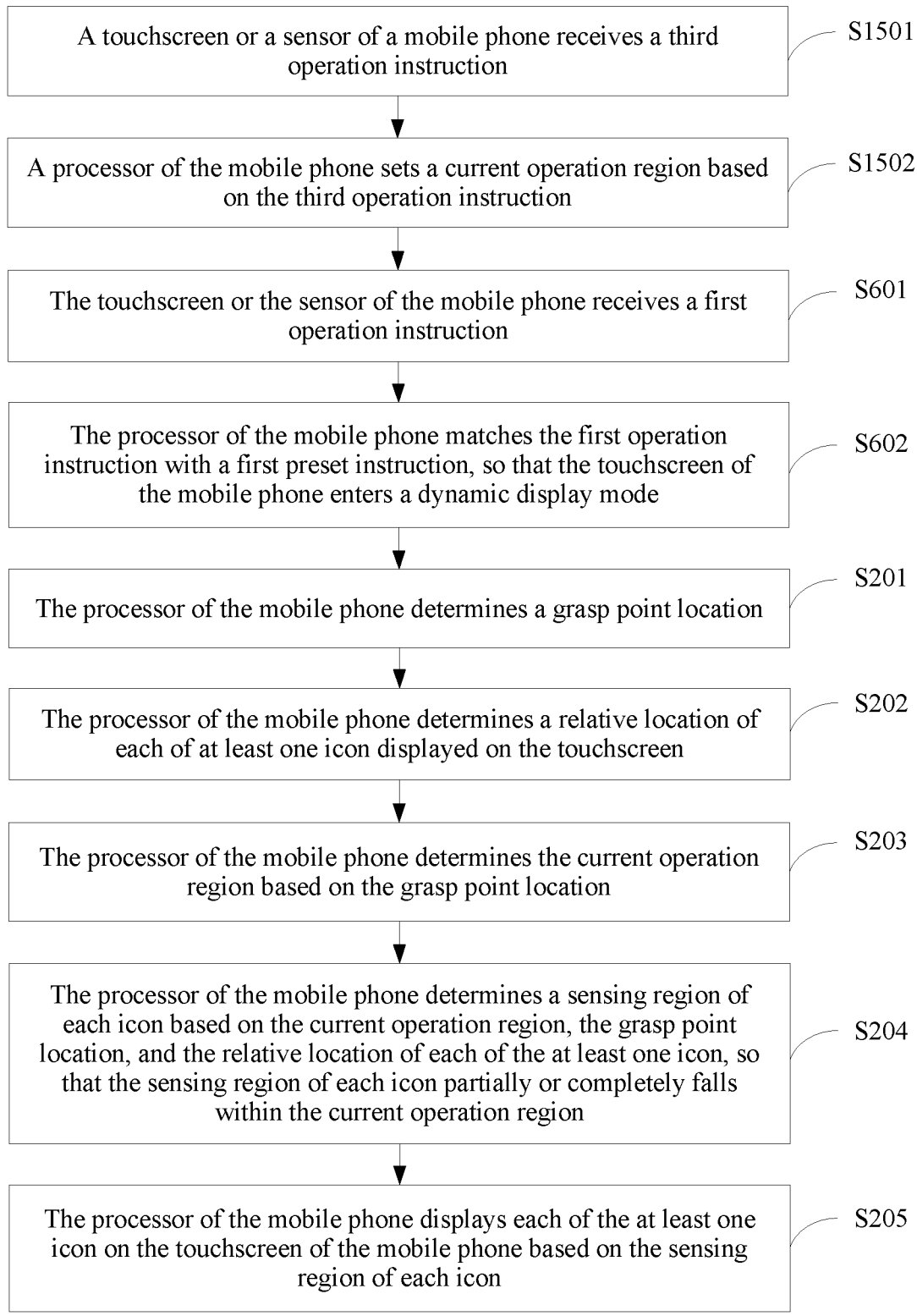
FIG. 15 is a schematic flowchart of another icon display method according to an embodiment.

Further, in the icon display method provided in this embodiment, before the processor of the mobile phone determines the current operation region based on the grasp point location, the current operation region may be preset in the mobile phone. Therefore, before S202 or S1302, the method may further include S1501 and S1502. For example, before S601, the method further includes S1501 and S1502. For example, as shown in FIG. 15, before S601, the method shown in FIG. 6 further includes S1501 and S1502.

In step S1501, the touchscreen or the sensor of the mobile phone receives a third operation instruction.

The third operation instruction is used to instruct the processor of the mobile phone to set the current operation region. For example, FIG. 16a, FIG. 16b, FIG. 16c, and FIG. 16d are another schematic change diagram of an interface displayed on a touchscreen of a mobile phone according to an embodiment. In FIG. 16a, FIG. 16b, FIG. 16c, and FIG. 16d, FIG. 16a to FIG. 16c show that when a part at which a user grasps the mobile phone is a grasp point 1, the user operates the touchscreen of the mobile phone by using a slide gesture, and a slide track is an arc from a location 1 to a location 2 shown in FIG. 16c. Subsequently, a processor of the mobile phone may receive an operation that the user operates the touchscreen of the mobile phone by using the slide gesture, and obtains the slide track.

It can be noted that, when a part at which the user grasps the mobile phone is any one of grasp points 2 to 4, a user operation corresponding to the third operation instruction is similar to the user operation shown in FIG. 16a, FIG. 16b, FIG. 16c, and FIG. 16d. Details are not described herein in this embodiment.

In step S1502, the processor of the mobile phone sets the current operation region according to the third operation instruction.

The current operation region is in a one-to-one correspondence with the grasp point location.

Figure 16A:
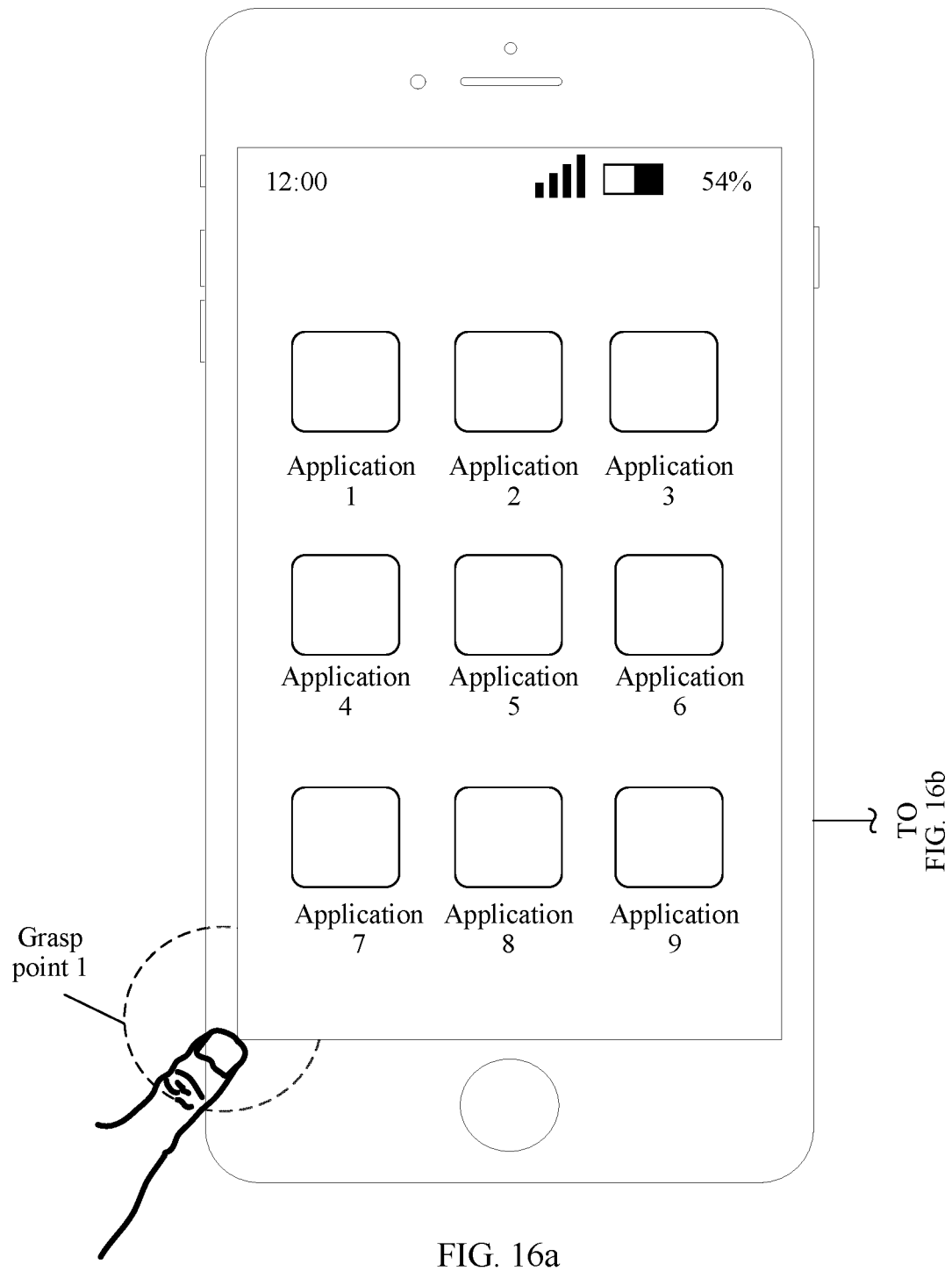
FIG. 16a is another schematic change diagram of an interface displayed on a touchscreen of a mobile phone according to an embodiment.
Figure 16B:
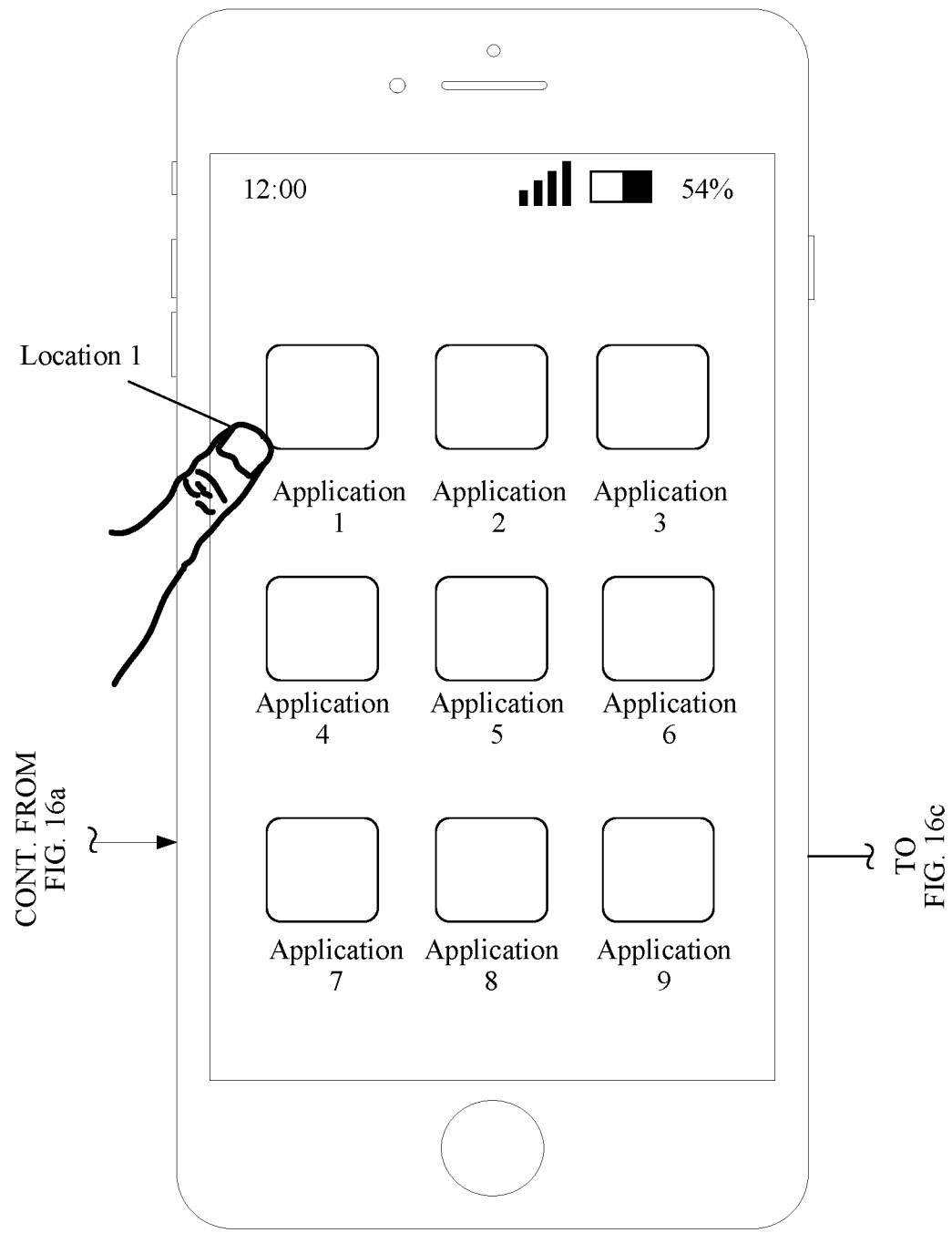
FIG. 16b is another schematic change diagram of an interface displayed on a touchscreen of a mobile phone according to an embodiment.
Figure 16C:
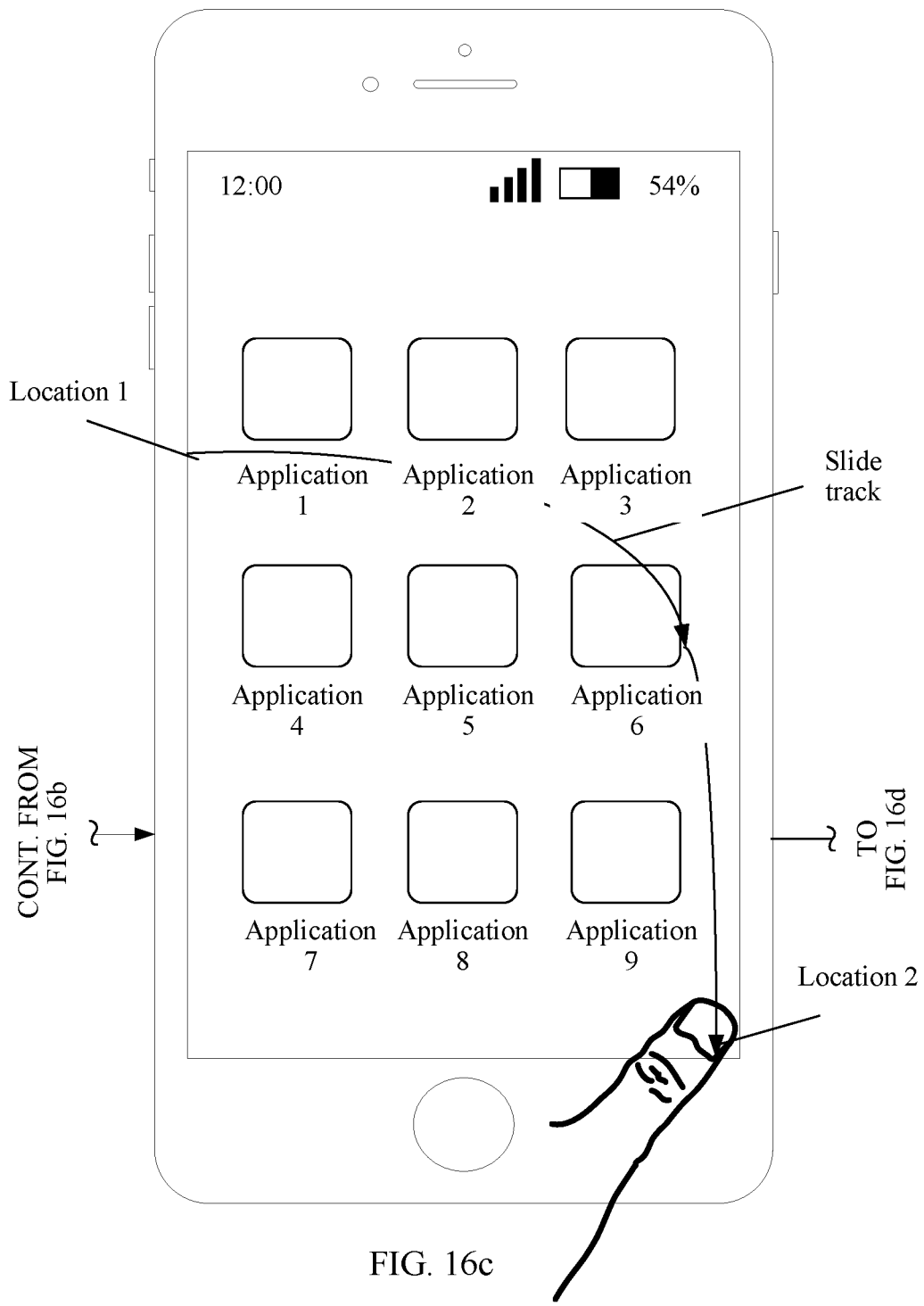
FIG. 16c is another schematic change diagram of an interface displayed on a touchscreen of a mobile phone according to an embodiment.
Figure 16D:
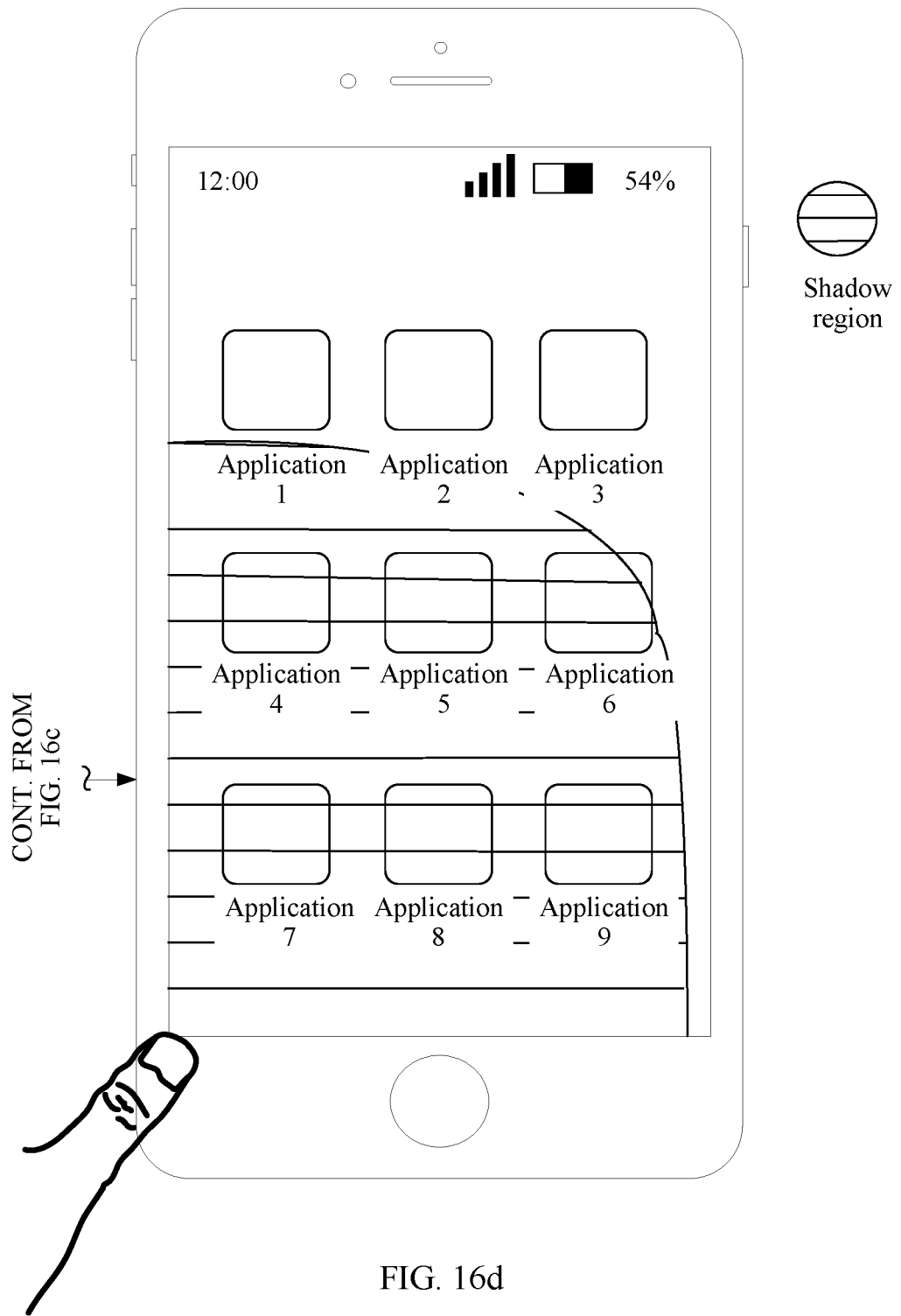
FIG. 16d is another schematic change diagram of an interface displayed on a touchscreen of a mobile phone according to an embodiment.
Figure 17A:
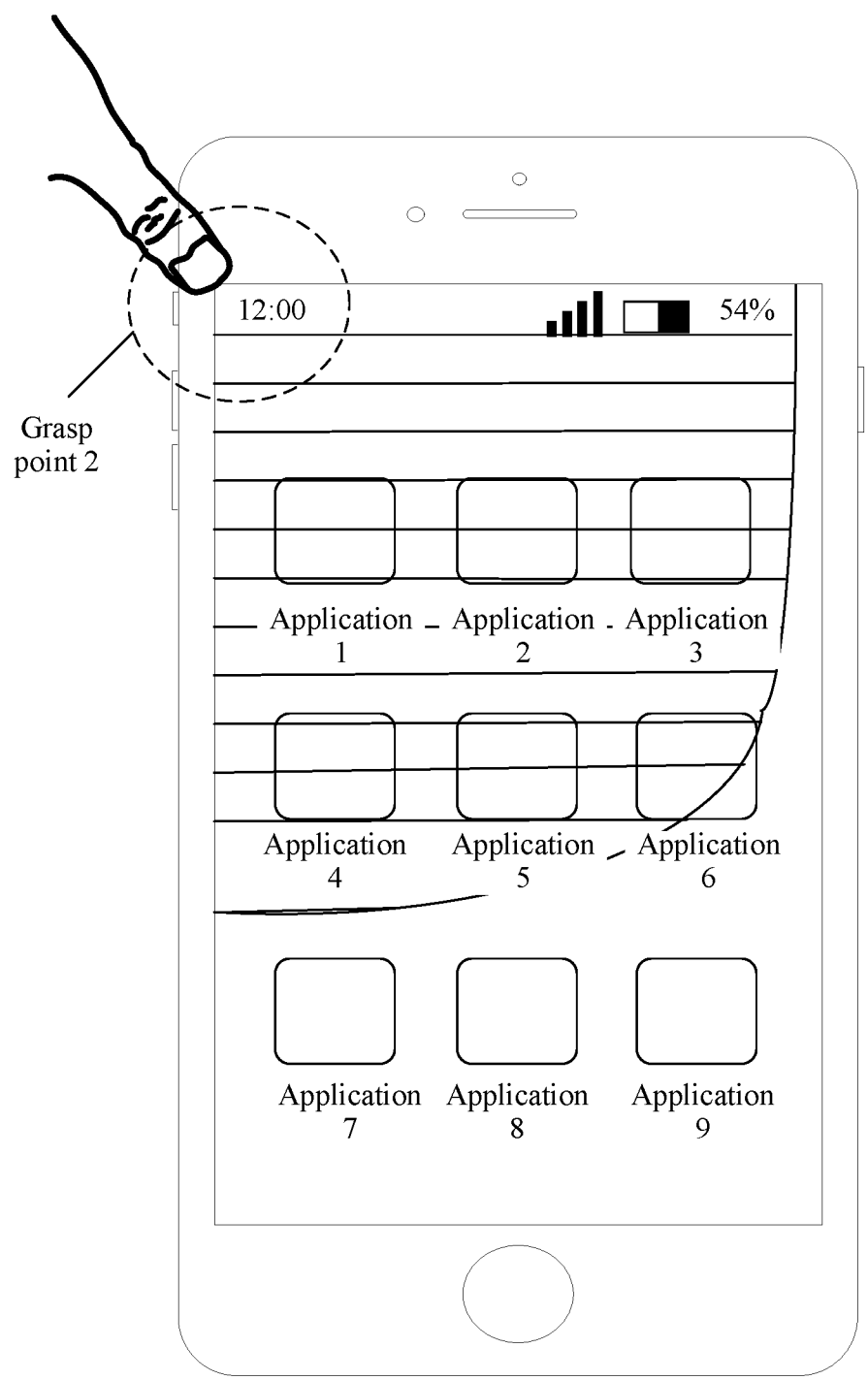
FIG. 17a is another schematic change diagram of an interface displayed on a touchscreen of a mobile phone according to an embodiment.
Figure 17B:
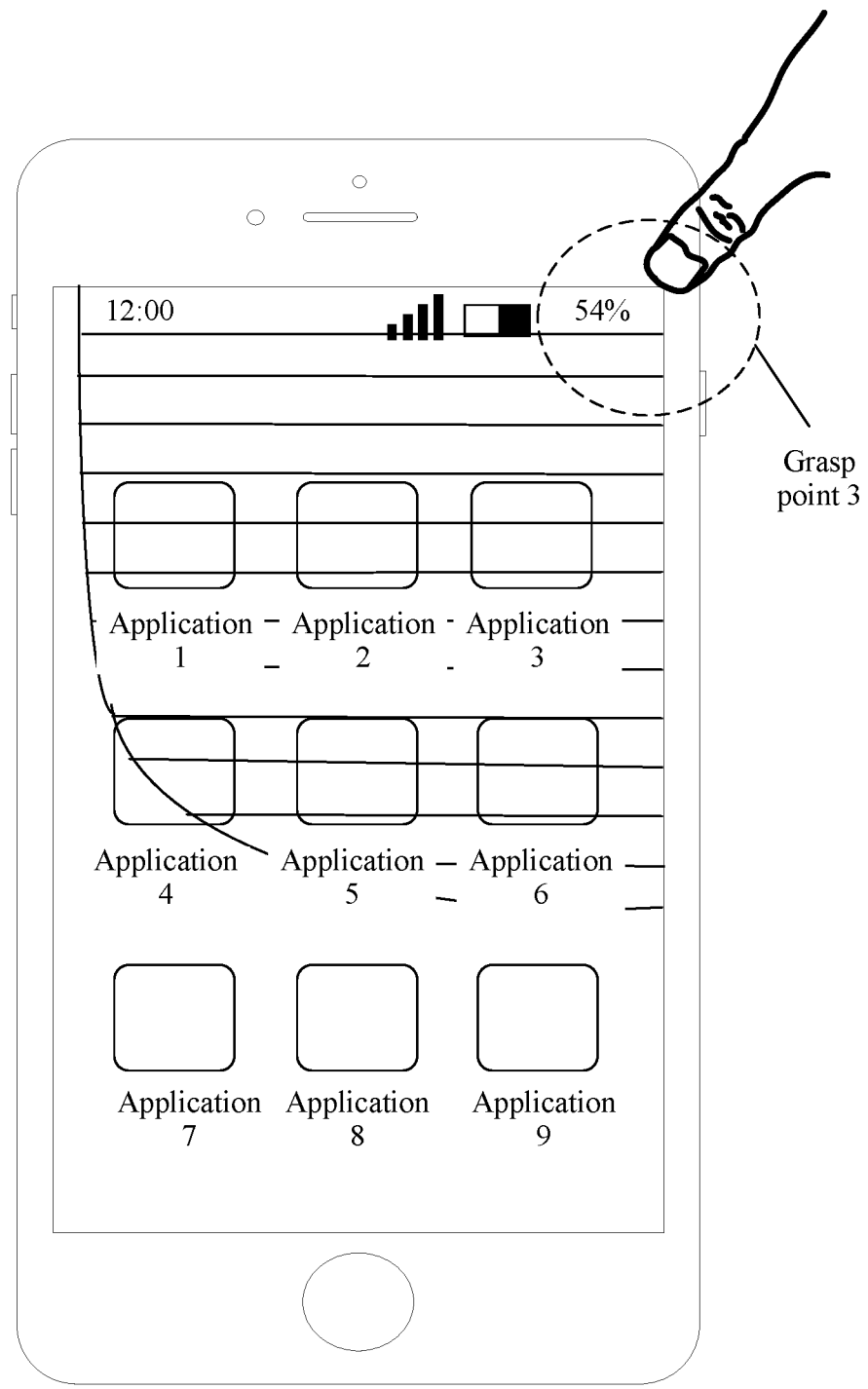
FIG. 17b is another schematic change diagram of an interface displayed on a touchscreen of a mobile phone according to an embodiment.
Figure 17C:
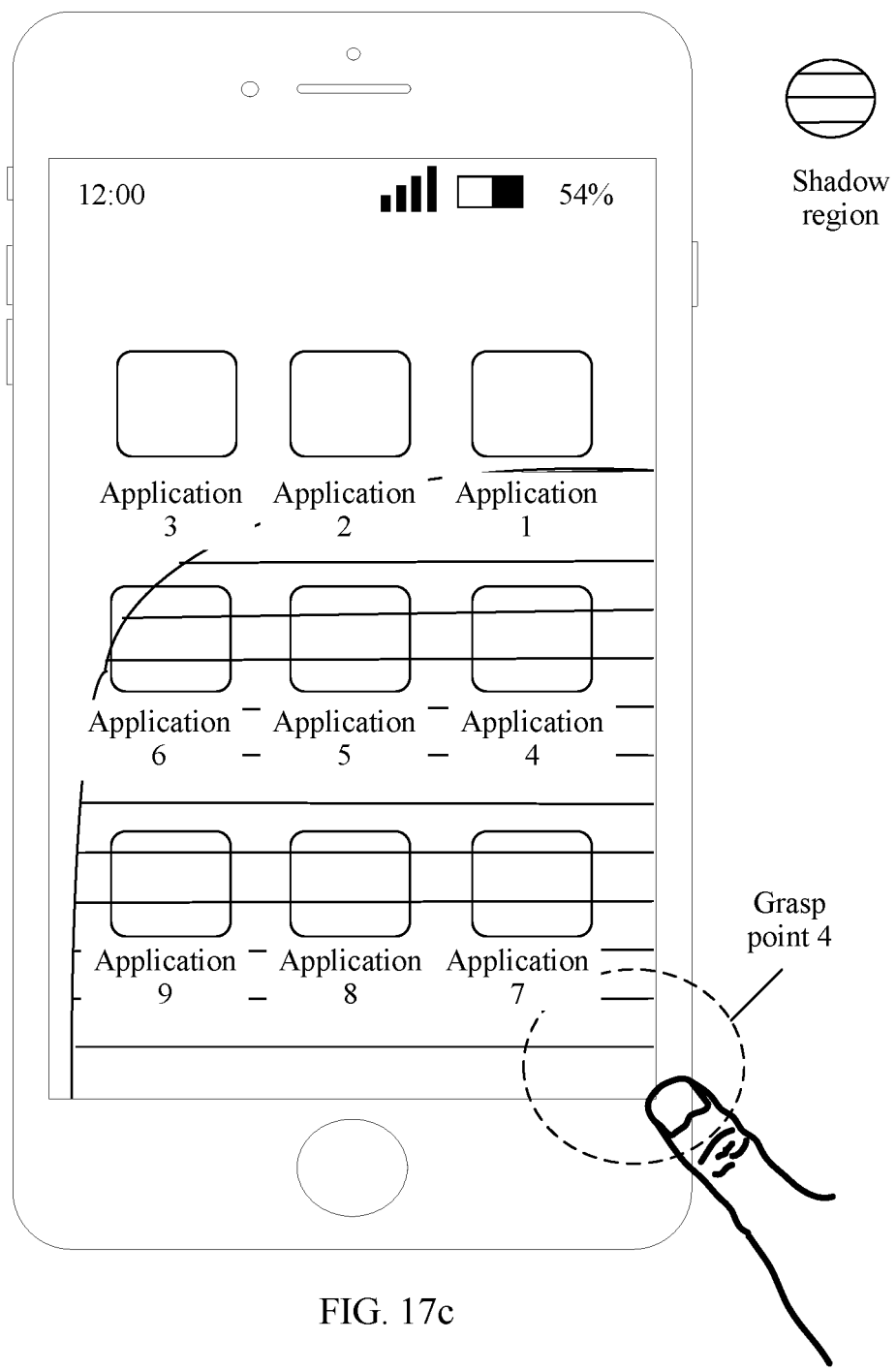
FIG. 17c is another schematic change diagram of an interface displayed on a touchscreen of a mobile phone according to an embodiment.

For example, if the third operation instruction received by the processor of the mobile phone corresponds to the user operation shown in FIG. 16a, FIG. 16b, FIG. 16c, and FIG. 16d, the processor of the mobile phone may set a shadow region on the touchscreen of the mobile phone shown in FIG. 16d as a current operation region corresponding to the grasp point 1. Similarly, the processor of the mobile phone may set a shadow region on a touchscreen of a mobile phone shown in FIG. 17a as a current shadow region corresponding to the grasp point 2. The processor of the mobile phone may set a shadow region on a touchscreen of a mobile phone shown in FIG. 17b as a current shadow region corresponding to the grasp point 3. The processor of the mobile phone may set a shadow region on a touchscreen of a mobile phone shown in FIG. 17c as a current shadow region corresponding to the grasp point 4. The third operation instruction may correspond to the user operation, and may further correspond to an operation of a person of ordinary skill in the art in a process of manufacturing the mobile phone.

It can be noted that, after receiving the third operation instruction and setting the current operation region corresponding to the third operation instruction, the processor of the mobile phone may store the current operation instruction in the memory of the mobile phone. In this way, the processor of the mobile phone may subsequently determine the current operation region based on the grasp point location corresponding to the first operation instruction.

Figure 18A:
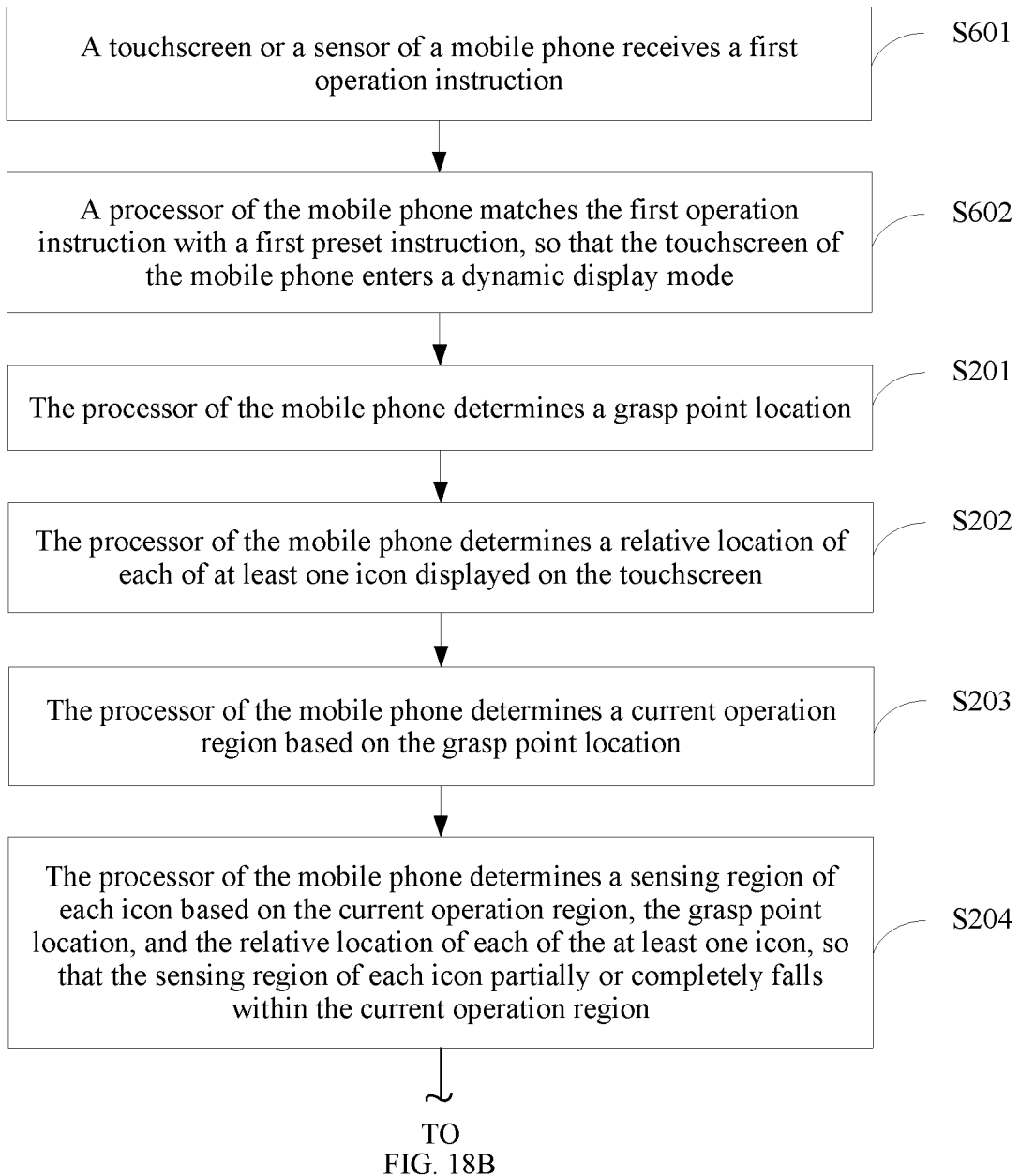
FIG. 18a is a schematic flowchart of another icon display method according to an embodiment.
Figure 18B:
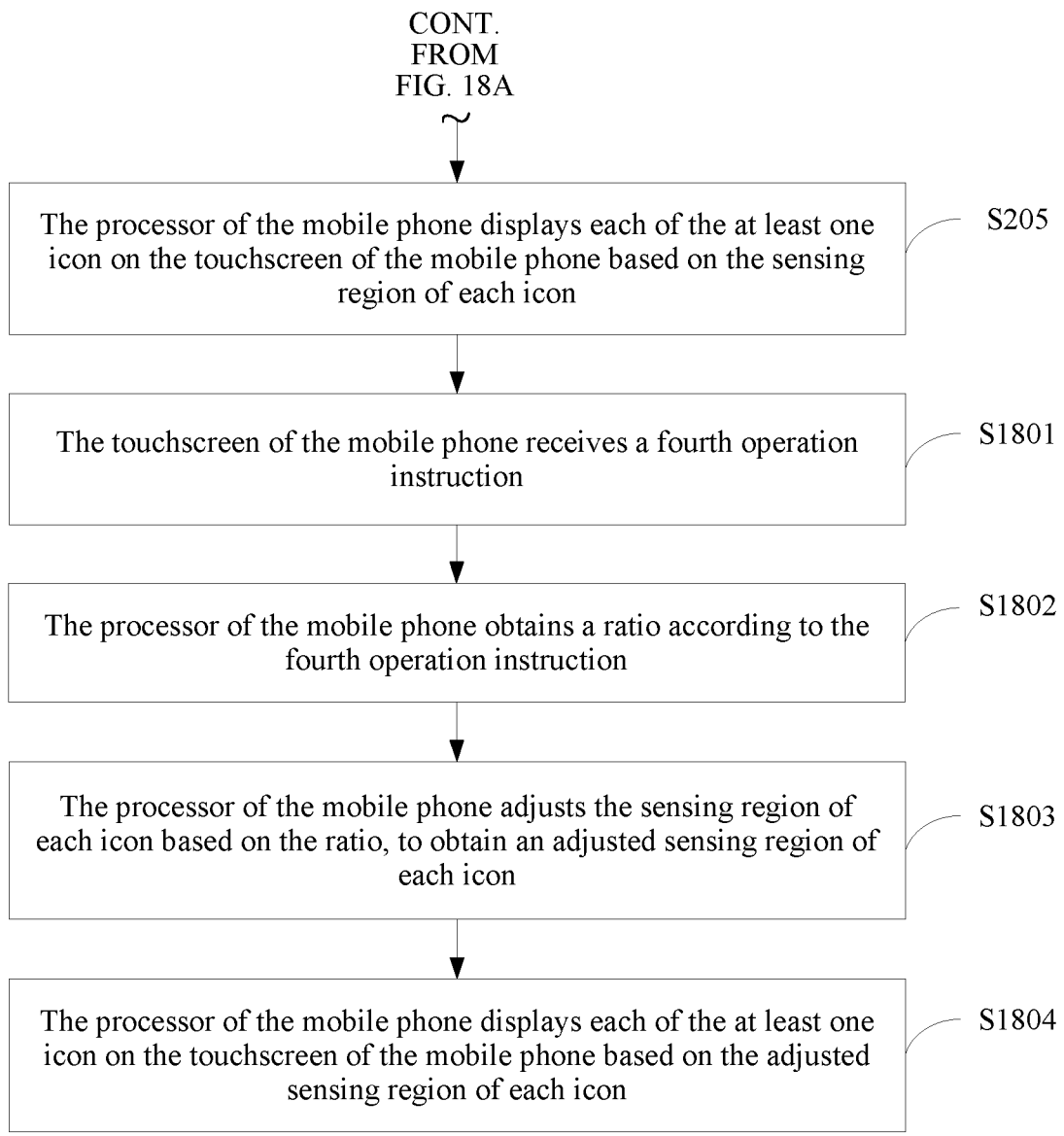
FIG. 18b is a schematic flowchart of another icon display method according to an embodiment.

Further, the mobile phone may be operated by different users with one hand, and the different users may operate different maximum regions with one hand on the touchscreen of the mobile phone. Therefore, a current user may be unable to operate an icon outside the current operation region on the touchscreen of the mobile phone. In this case, to avoid a case in which the current user cannot operate the icon outside the current operation region on the touchscreen of the mobile phone, after S205, the method may further include S1801 to S1804. For example, as shown in FIG. 18A and FIG. 18B, after S205, the method shown in FIG. 6 may further include S1801 to S1804.

In step S1801, the touchscreen of the mobile phone receives a fourth operation instruction.

The fourth operation instruction is used to instruct to adjust the sensing region of each of the at least one icon.

Figure 19A:
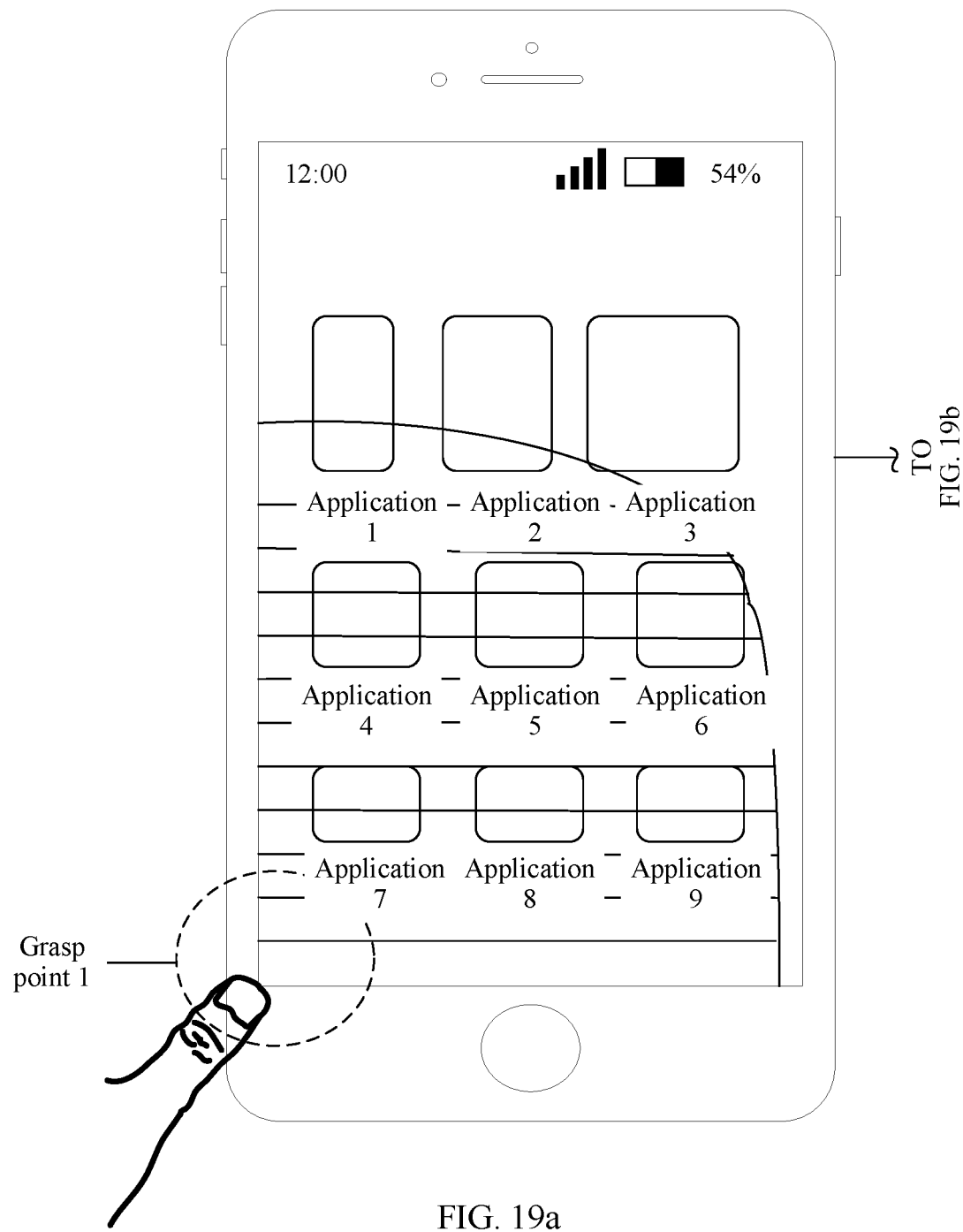
FIG. 19a is another schematic change diagram of an interface displayed on a touchscreen of a mobile phone according to an embodiment.
Figure 19B:
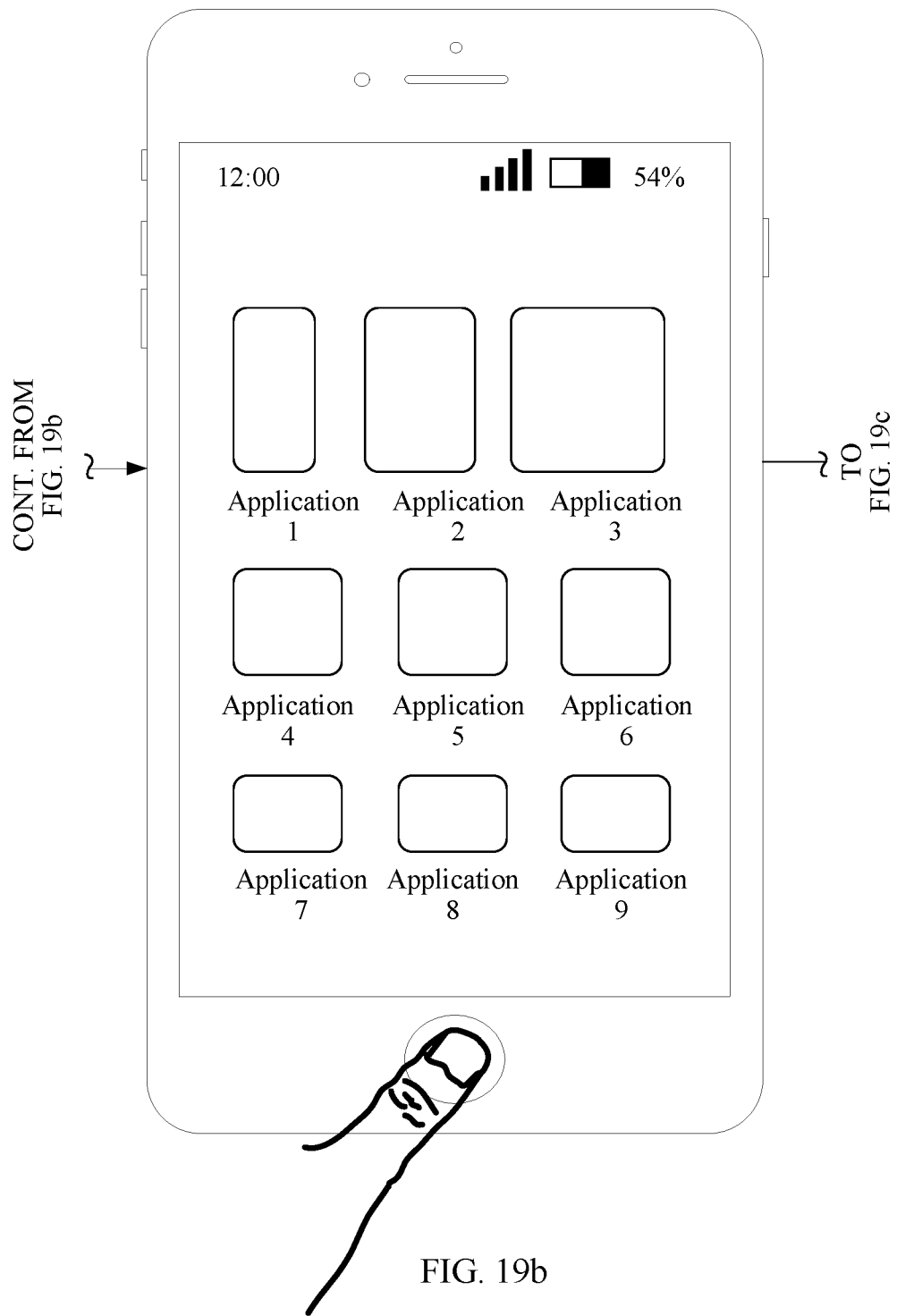
FIG. 19b is another schematic change diagram of an interface displayed on a touchscreen of a mobile phone according to an embodiment.
Figure 19C:
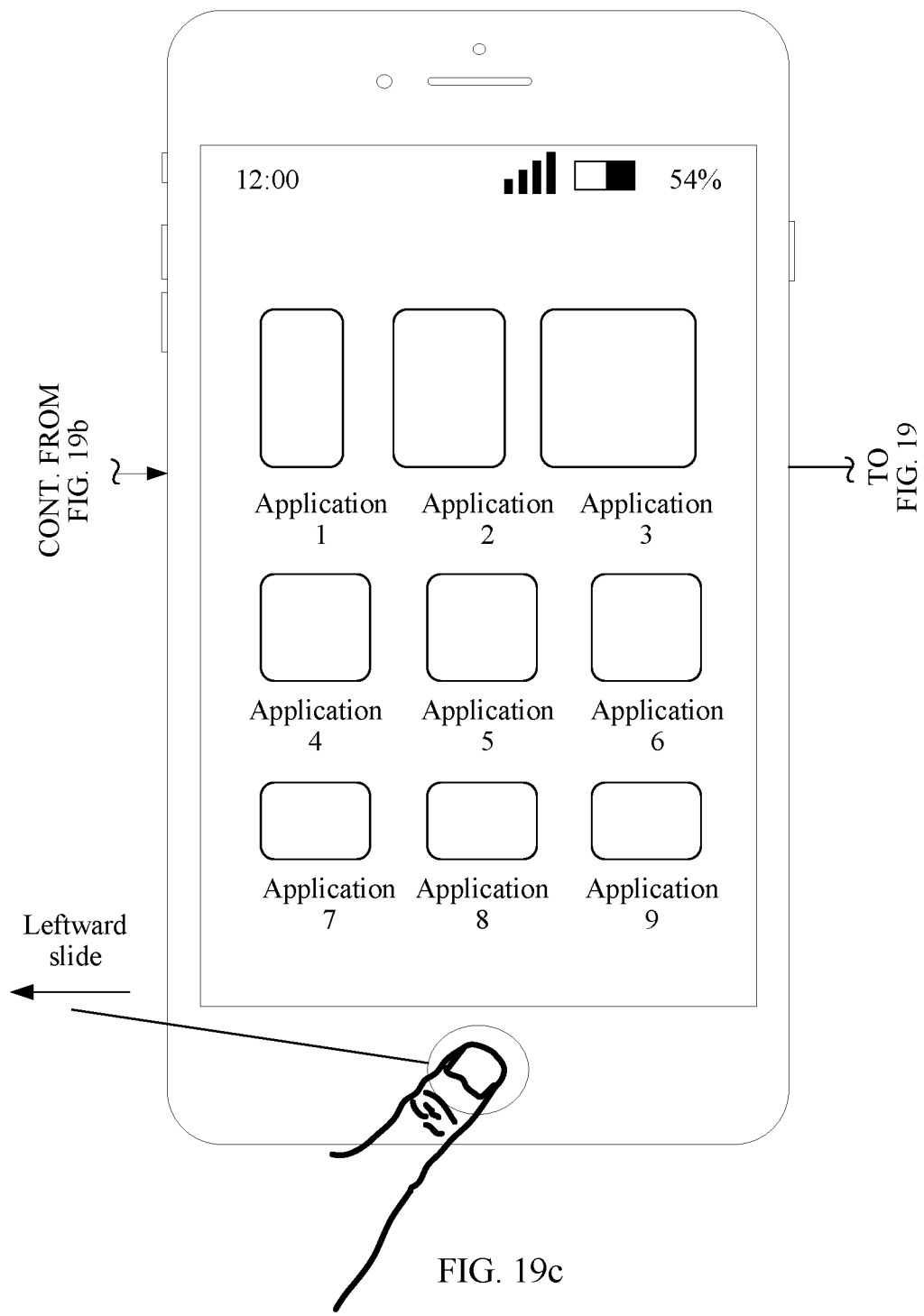
FIG. 19c is another schematic change diagram of an interface displayed on a touchscreen of a mobile phone according to an embodiment.

For example, FIG. 19a, FIG. 19b, FIG. 19c, and FIG. 19d are schematic change diagrams of an interface displayed on a touchscreen of a mobile phone according to an embodiment. In FIG. 19a, FIG. 19b, FIG. 19c, and FIG. 19d, each icon displayed on the touchscreen of the mobile phone shown in FIG. 19a partially or completely falls within a current operation region indicated by a shadow region 1, and the current operation region is preset. In this case, a user may hold a grasp point 1 of the mobile phone with a left hand. FIG. 19b and FIG. 19c show that the user operates a fingerprint sensor of the mobile phone with a left hand thumb by using a leftward slide gesture. Subsequently, a fourth operation instruction that may be received by a processor of the mobile phone may be that the user operates the fingerprint sensor of the mobile phone by using the leftward slide gesture and a slide distance and a left hand thumb fingerprint of the user are obtained. If the fourth operation instruction corresponds to a case in which the user operates the fingerprint sensor of the mobile phone with the left hand thumb by using the leftward slide gesture, the fourth operation instruction is used to instruct the processor of the mobile phone to scale down the sensing region of each of the at least one icon. If the fourth operation instruction corresponds to a case in which the user operates the fingerprint sensor of the mobile phone with a right hand thumb by using a rightward slide gesture, the fourth operation instruction is used to instruct the processor of the mobile phone to scale up the sensing region of each of the at least one icon.

In step S1802, the processor of the mobile phone obtains a ratio according to the fourth operation instruction.

For example, the ratio is a ratio at which the processor of the mobile phone scales a sensing region of the at least one icon, and the ratio may correspond to the slide distance in the fourth operation instruction. A larger slide distance in the fourth operation instruction indicates a larger ratio, and a smaller slide distance in the fourth operation instruction indicates a smaller ratio. When the icon displayed on the touchscreen of the mobile phone partially or completely falls within the preset current operation region, if the user cannot operate, with one hand, all the icons displayed on the touchscreen of the mobile phone, the ratio may be a number that is greater than 0 and less than 1, for example, the ratio may be 0.95. If the user can operate, with one hand, all the icons displayed on the touchscreen of the mobile phone and needs to scale up all the icons, the ratio may be a number that is greater than 1, for example, the ratio may be 1.1.

In step S1803, the processor of the mobile phone modifies the sensing region of each icon based on the ratio, to obtain a modified sensing region of each icon.

For example, if the ratio that is obtained by the processor of the mobile phone according to the fourth operation instruction corresponding to the user operation shown in FIG. 19b and FIG. 19c is 0.95, the processor of the mobile phone may scale down, by 0.95 times, the sensing region of each of the at least one icon displayed on the touchscreen of the mobile phone.

In step S1804, the processor of the mobile phone displays each of the at least one icon on the touchscreen of the mobile phone based on the adjusted sensing region of each icon.

Figure 19D:
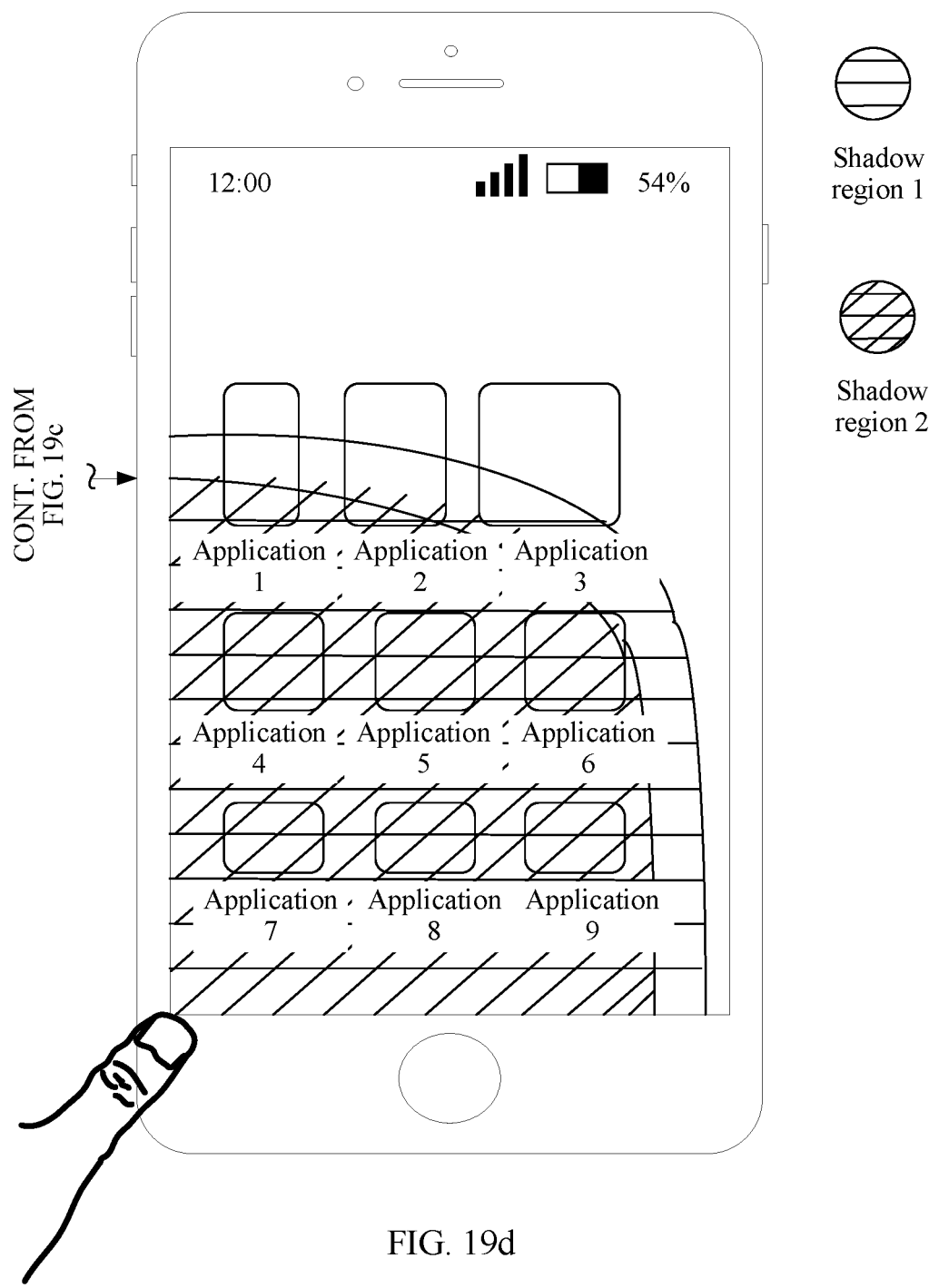
FIG. 19d is another schematic change diagram of an interface displayed on a touchscreen of a mobile phone according to an embodiment.

For example, after the processor of the mobile phone displays each of the at least one icon on the touchscreen of the mobile phone based on the adjusted sensing region of each icon, the icon displayed on the touchscreen of the mobile phone may partially or completely fall within a new operation region. If the adjusted sensing region of each icon is a scaled-down sensing region, the new operation region is less than the current operation region. If the adjusted sensing region of each icon is a scaled-up sensing region, the new operation region is greater than the current operation region. For example, as shown in FIG. 19d, the processor of the mobile phone may enable, to partially or completely fall within a shadow region 2 shown in FIG. 19d, the sensing region that is of each icon and that is scaled down by 0.95 times. The shadow region 2 may be the new operation region, and the shadow region 2 is less than a shadow region 1 shown in FIG. 19d.

Optionally, the processor of the mobile phone may store the new operation region in the memory of the mobile phone, to update the current operation region stored in the memory of the mobile phone. Alternatively, the processor of the mobile phone may not store the new operation region.

It can be noted that, in the icon display method provided in this embodiment, the current operation region may be preset in the mobile phone, so that sensing regions of all the icons displayed on the touchscreen of the mobile phone each partially or completely fall within the current operation region. In this way, the user can operate, with one hand, all the icons displayed on the touchscreen of the mobile phone. In addition, the processor of the mobile phone may further adjust the sensing region of each icon according to a requirement of the user, so that adjusted sensing regions of all the icons displayed on the touchscreen of the mobile phone each partially or completely fall within the new operation region. In this way, the user can better operate, with one hand, all the icons displayed on the touchscreen of the mobile phone, and can obtain better user experience.

The foregoing describes the solutions provided in the embodiments from a perspective of the terminal device. It may be understood that, to implement the foregoing functions, the terminal device includes corresponding hardware structures and/or software modules for performing the functions. A person of ordinary skill in the art can be easily aware that the example algorithm steps described with reference to the embodiments disclosed herein can be implemented by hardware or a combination of hardware and computer software. Whether a function is performed by hardware or by computer software by driving hardware depends on particular applications and design constraints of the technical solutions. A person of ordinary skill in the art may use different methods to implement the described functions for each particular application, but it should not be considered that the implementation goes beyond the scope.

In the embodiments, the terminal device may be divided into function modules according to the foregoing method examples. For example, each function module may be obtained through division corresponding to each function, or two or more functions may be integrated into one processing module. The integrated module may be implemented in a form of hardware, or may be implemented in a form of a software function module. It can be noted that the module division in the embodiments is an example, and is merely logical function division. There may be another division manner during actual implementation.

Figure 20:
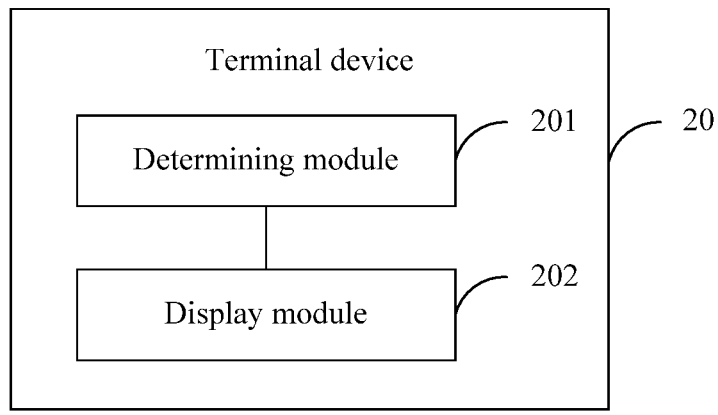
FIG. 20 is a possible schematic composition diagram of a terminal device according to an embodiment.

When each function module is obtained through division corresponding to each function, FIG. 20 is a possible schematic composition diagram of the terminal device provided in the foregoing embodiments. As shown in FIG. 20, a terminal device 20 may include a determining module 201 and a display module 202. The determining module 201 is configured to support the terminal device 20 in performing S201, S202, S203, S204, S602, S802, S1301, S1302, and S1502 in the foregoing embodiments, and/or another process used for the technology described herein. The display module 202 is configured to support the terminal device 20 in performing S205 and S1804 in the foregoing embodiments, and/or another process used for the technology described herein.

Figure 21:
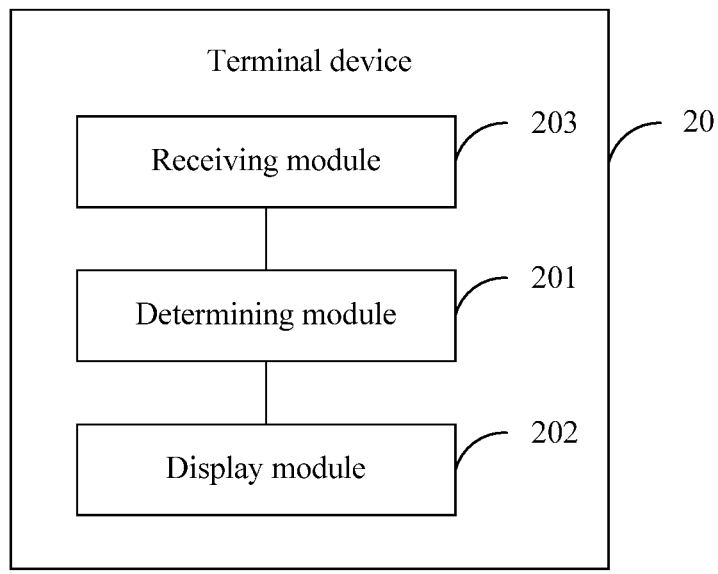
FIG. 21 is a possible schematic composition diagram of a terminal device according to an embodiment.

Further, FIG. 21 is a possible schematic composition diagram of a terminal device according to an embodiment. In FIG. 21, the terminal device 20 may further include a receiving module 203. The receiving module 203 is configured to support the terminal device 20 in performing S601, S801, S1501, and S1801 in the foregoing embodiments, and/or another process used for the technology described herein.

Figure 22:
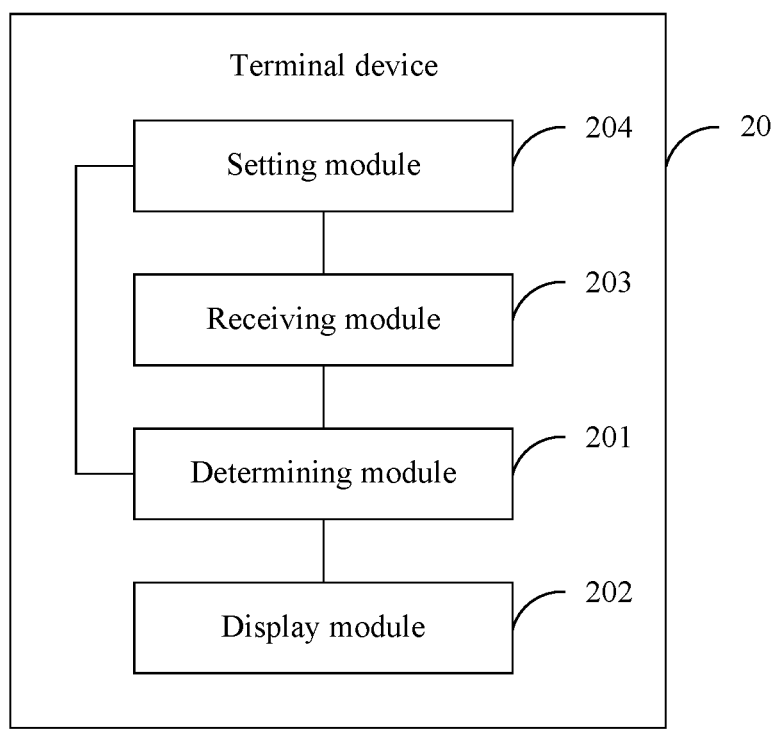
FIG. 22 is a possible schematic composition diagram of a terminal device according to an embodiment.

Further, FIG. 22 is a possible schematic composition diagram of a terminal device according to an embodiment. In FIG. 21, the terminal device 20 may further include a setting module 204. The setting module 204 is configured to support the terminal device 20 in performing S1502 in the foregoing embodiments, and/or another process used for the technology described herein.

Figure 23:
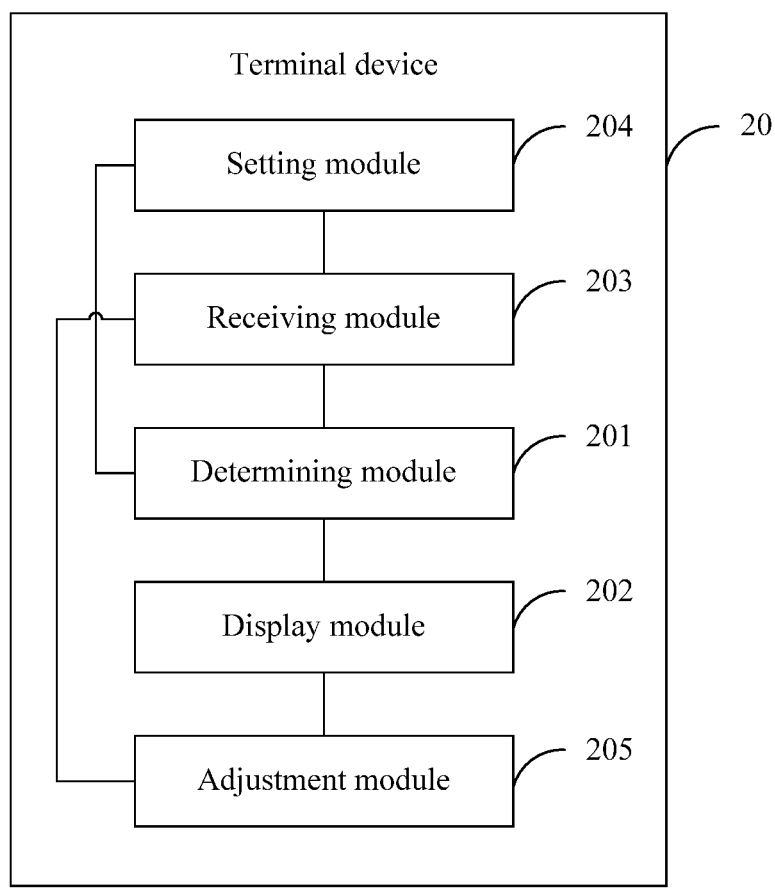
FIG. 23 is a possible schematic composition diagram of a terminal device according to an embodiment.

Further, FIG. 23 is a possible schematic composition diagram of a terminal device according to an embodiment. In FIG. 23, the terminal device 20 may further include an adjustment module 205. The adjustment module 205 is configured to support the terminal device 20 in performing S1802 and S1803 in the foregoing embodiments, and/or another process used for the technology described herein.

It can be noted that all related content of the steps in the foregoing method embodiments may be cited in function descriptions of corresponding function modules. Details are not described herein again.

The terminal device provided in the embodiments is configured to perform the foregoing icon display method, and therefore can achieve a same effect as the foregoing icon display method.

When an integrated unit is used, the determining module 201, the setting module 204, the adjustment module 205, and the like may be integrated into one processing module for implementation. The processing module may be a processor or a controller, for example, may be a CPU, a general purpose processor, a digital signal processor (DSP), an application-specific integrated circuit (ASIC), a field programmable gate array (FPGA) or another programmable logic device, a transistor logic device, a hardware component, or any combination thereof. The processing module may implement or execute various example logical blocks, modules, and circuits that are described with reference to the content disclosed in the present invention. The processing unit may be a combination implementing a computing function, for example, a combination including one or more microprocessors, or a combination of a DSP and a microprocessor. A storage module may be a memory. The receiving module 23 may be implemented by an input device. The display module 23 may be implemented by a display.

Figure 24:
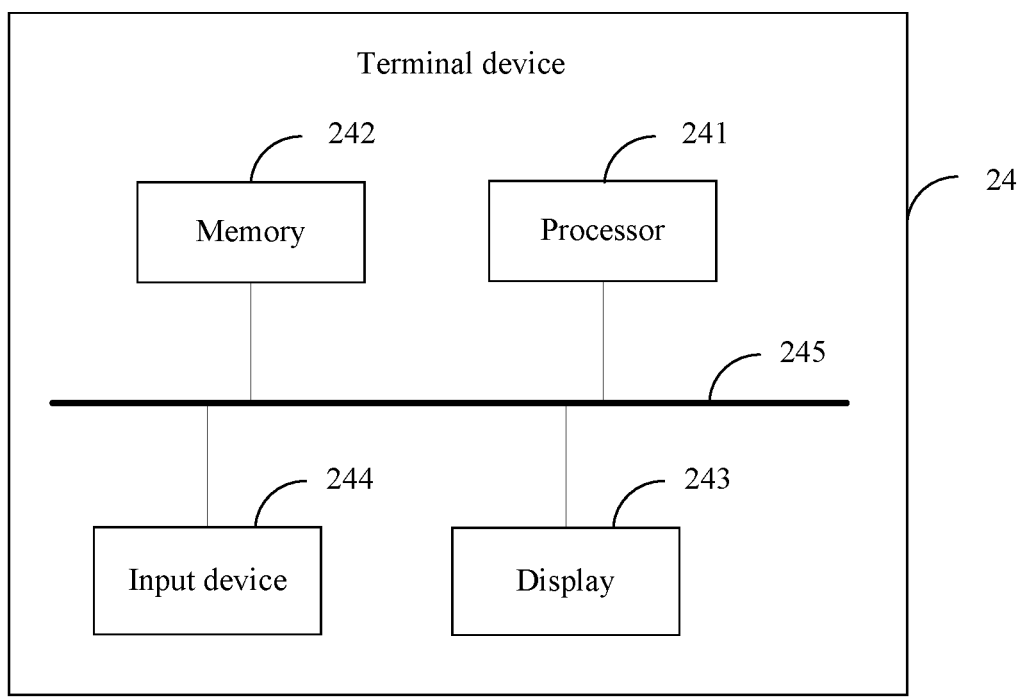
FIG. 24 is a possible schematic composition diagram of a terminal device according to an embodiment.

When the processing module is a processor and the storage module is a memory, an embodiment provides a terminal device 24 shown in FIG. 24. As shown in FIG. 24, the terminal device 24 includes a processor 241, a memory 242, a display 243, an input device 244, and a bus 245. The processor 241, the memory 242, the display 243, and the input device 244 are mutually connected by using the bus 245. The bus 245 may be a peripheral component interconnect (PCI) bus, an extended industry standard architecture (EISA) bus, or the like. The bus 245 may be classified as an address bus, a data bus, a control bus, or the like. For ease of representation, only one thick line is used to represent the bus in FIG. 24, but this does not mean that there is only one bus or only one type of bus.

For example, the input device 244 may include components such as a mouse, a physical keyboard, a trackball, a touch panel, and a joystick, and sensors such as a gravity sensor and a fingerprint sensor. For example, the input device in the foregoing mobile phone may include a touchscreen and sensors such as the gravity sensor and the fingerprint sensor. The display 243 may be an independent component, or may be integrated into one component with the input device 244. For example, the touchscreen may be further used as a display in the mobile phone.

An embodiment further provides a computer storage medium. The computer storage medium stores a computer instruction. When the processor 241 of the terminal device 24 executes the computer instruction, the terminal device 24 performs related method steps in the foregoing embodiments.

For detailed descriptions of the modules in the terminal device 24 provided in this embodiment and technical effects brought by the modules after the modules performs the related method steps in the foregoing embodiments, refer to related descriptions in the method embodiments. Details are not described herein.

Based on the foregoing descriptions of the implementations, a person of ordinary skill in the art may clearly understand that, for the purpose of convenient and brief description, only division of the foregoing function modules is used as an example for illustration. During actual application, the foregoing functions can be allocated to different function modules for implementation according to a requirement, that is, an inner structure of an apparatus is divided into different function modules to implement all or some of the functions described above. For a detailed working process of the foregoing described system, apparatus, and unit, refer to a corresponding process in the foregoing method embodiments, and details are not described herein again.

In the several embodiments provided in this application, it can be understood that the described system, apparatus, and method may be implemented in other manners. For example, the described apparatus embodiments are merely examples. For example, the module or unit division is merely logical function division and there may be another division manner during actual implementation. For example, a number of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one place, or may be distributed on a number of network units. Some or all of the units may be selected according to an actual requirement to achieve the objectives of the solutions in the embodiments.

In addition, the function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the method described in the embodiments of this application. The foregoing storage medium includes any medium that can store program code, such as a flash memory, a removable hard disk, a read-only memory, a random access memory, a magnetic disk, or an optical disc.

The foregoing descriptions are merely implementations of this application, but are not intended to limit the protection scope of this application. Any variation or replacement within the technical scope disclosed in this application shall fall within the protection scope of this application.

What is claimed is:

1. An icon display method, comprising:
   determining, by a terminal device, a grasp point location, wherein the grasp point location matches one of a plurality of preset graspable parts of the terminal so that the terminal device enters a dynamic display mode, wherein each of the at least one icon has a same or different sensing region in the dynamic display mode;
   determining, by the terminal device, a relative location of each of a plurality of icons displayed on a display interface of the terminal device, wherein the relative location of each of the plurality of icons is a location of each of the plurality of icons relative to the grasp point location;
   determining, by the terminal device, a current operation region based on the grasp point location, wherein the current operation region is a region that is less than an area of the display interface and at least one of the plurality of icons and a sensing region of the at least one of the plurality of icons, are completely outside of the current operation region;
   determining, by the terminal device, a sensing region of each of the plurality of icons based on the current operation region, the grasp point location, and the relative location of each of the plurality of icons;
   visibly scaling, by the terminal device, the sensing region of each of the plurality of icons in a direction of the grasp point location, so that the sensing region of each of the plurality of icons displayed on the display interface is adjusted so as to be partially or completely displayed and existing within the current operation region, wherein the sensing region of each icon is a region in which each the icon is operated enabling a user to operate, with one hand, each of the one or more icons within the current operation region
   wherein visibly scaling, by the terminal device, of the sensing region of each of the plurality of icons in a direction of the grasp point location comprises:
      scaling down, by the terminal device, a sensing region of one or more of the plurality of icons in a first row with a relatively small relative location compared to other ones of the plurality of icons and displaying the one or more of the plurality of icons with the relatively small relative location at a smaller size than previously displayed prior to the determination of the grasp location matching one of the plurality of preset graspable parts; and
      scaling up, by the terminal device, a sensing region of one or more of the other ones of the plurality of icons in another row further from the grasp point location with a relatively large relative location compared to the one or more of the plurality of icons with the relatively small relative location in the first row and displaying the one or more of the other ones the plurality of icons with the relatively large relative location at a larger size than previously displayed such that as a result of the scaling up at least a portion of each of the larger sized icons is at a relatively smaller distance to the grasp point location than previously displayed prior to the determination of the grasp point location matching one of the plurality of preset graspable parts.

2. The method according to claim 1, wherein before the determining, by a terminal device, of the grasp point location, the method further comprises:
   receiving, by the terminal device, a second operation instruction, wherein the second operation instruction is used to indicate the grasp point location; and
   the determining, by a terminal device, of the grasp point location comprises:
   matching, by the terminal device, the second operation instruction with a second preset instruction, to determine the grasp point location.

3. The method according to claim 1, wherein after the receiving, by the terminal device, of the first operation instruction, the method further comprises:
   determining, by the terminal device, an interface status; and
   the determining, by the terminal device, of the relative location of each of the plurality of icons displayed on the terminal device comprises:
   determining, by the terminal device based on the interface status, the relative location of each of the plurality of icons displayed on the terminal device.

4. The method according to claim 3, wherein before the determining, by a terminal device, of the grasp point location, the method further comprises:

receiving, by the terminal device, a third operation instruction; and setting, by the terminal device, the current operation region based on according to the third operation instruction.

5. The method according to claim 4, wherein after the displaying, by the terminal device, of each of the one or more one icons, the method further comprises:

receiving, by the terminal device, a fourth operation instruction, wherein the fourth operation instruction is used to instruct to adjust the sensing region of each of the at least one icon;

obtaining, by the terminal device, a ratio based on according to the fourth operation instruction;

adjusting, by the terminal device, the sensing region of each of the plurality of icons based on the ratio, to obtain an adjusted sensing region of each of the plurality of icons; and displaying, by the terminal device, each of the plurality of icons based on the adjusted sensing region of each icon.

6. A terminal device, comprising:

a determining module, the determining module configured to: determine if a grasp point location matches location one of a plurality of preset graspable parts of the terminal for one-hand operation of the terminal device; determine a relative location of each of a plurality of icons displayed on a display interface of the terminal device, wherein the relative location of each of the plurality of icons is a location of each of the plurality of icons relative to the grasp point location; determine a current operation region based on the grasp point location, wherein the current operation region is a region that is less than an area of the display interface and at least one of the plurality of icons and a sensing region of the at least one of the plurality of icons, are completely outside of the current operation region; and determine a sensing region of each of the plurality of icons based on the current operation region, the grasp point location, and the relative location of each of the plurality of icons;

an adjustment module, the adjustment module configured to: visibly scale the sensing region of the plurality of icons in a direction of the grasp point location so that the sensing region of each of the plurality of icons displayed on the display interface is adjusted so as to be partially or completely displayed and existing within the current operation region, wherein a region indicated by the sensing region of each icon is a region in which each of the plurality of icons is operated enabling a user to operate, with one hand, each of the plurality of icons within the current operation region wherein the adjustment module is further configured to:

scale down, by the terminal device, a sensing region of one or more of the plurality of icons in a first row with a relatively small relative location compared to other ones of the plurality of icons and displaying the one or more of the plurality of icons with the relatively small relative location at a smaller size than previously displayed prior to the determination of the grasp point location matching one of the plurality of preset graspable parts; and scale up, by the terminal device, a sensing region of one or more of the other ones of the plurality of icons in another row further from the grasp point location and with a relatively large relative location compared to the one or more of the plurality of icons with the relatively small relative location in the first row and displaying the one or more of the other ones the plurality of icons with the relatively large relative location at a larger size than previously displayed such that at least a portion of each of the larger sized icons is at a relatively smaller distance to the grasp point location as a result of the resizing, wherein another row of the plurality of icons are displayed at a larger size than previously displayed such that as a result of the scaling up at least a portion of each of the larger sized icons is at a relatively smaller distance to the grasp point location than previously displayed prior to the determination of the grasp point location matching one of the plurality of preset graspable parts.

7. The terminal device according to claim 6, further comprising:

a receiving module, the receiving module configured to receive a first operation instruction before the determining module determines the grasp point location, wherein the determining module is further configured to match the first operation instruction received by the receiving module with a first preset instruction, so that the terminal device enters a dynamic display mode, wherein each of the one or more icons have same or different sensing regions in the dynamic display mode.

8. The terminal device according to claim 6, wherein the receiving module is further configured to receive a second operation instruction before the determining module determines the grasp point location, wherein the second operation instruction is used to indicate the grasp point location; and the determining module is configured to match the second operation instruction with a second preset instruction, to determine the grasp point location.

9. The terminal device according to claim 6, wherein the determining module is further configured to determine an interface status after the receiving module receives the first operation instruction, wherein the interface status is used to indicate that an interface status of the terminal device is a portrait state or an interface status of the terminal device is a landscape state; and the determining module is specifically configured to determine, based on the interface status, the relative location of each of the plurality of icons displayed on the terminal device.

10. The terminal device according to claim 8, wherein the receiving module is further configured to receive a third operation instruction before the determining module determines the grasp point location; and the terminal device further comprises:

a setting module, the setting module configured to set the current operation region according to the third operation instruction.

11. The terminal device according to claim 9, wherein the receiving module is further configured to receive a fourth operation instruction after the display module displays each of the plurality of icons, wherein the fourth operation instruction is used to instruct or to adjust the sensing region of each of the plurality of icons;

the adjustment module is further configured to: obtain a ratio according to the fourth operation instruction received by the receiving module; and adjust the sensing region of each icon based on the ratio, to obtain an adjusted sensing region of each icon; and the display module is further configured to display each of the plurality of icons based on the adjusted sensing region that is of each icon and that is obtained by the adjustment module.

\* \* \* \* \*